[12] United States Patent
Watanabe et al.

(10) Patent No.: US 9,041,620 B2
(45) Date of Patent: May 26, 2015

(54) DISPLAY DEVICE, DISPLAY SYSTEM, DISPLAY CONTROL METHOD FOR SAME, ELECTRONIC DEVICE, PROGRAM, COMPUTER-READABLE RECORDING MEDIUM, AND LIGHT GUIDE ELEMENT

(75) Inventors: Hisashi Watanabe, Osaka (JP); Shigeto Yoshida, Osaka (JP); Kentarou Imamura, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 234 days.

(21) Appl. No.: 13/642,625

(22) PCT Filed: Apr. 5, 2011

(86) PCT No.: PCT/JP2011/058633
§ 371 (c)(1),
(2), (4) Date: Dec. 12, 2012

(87) PCT Pub. No.: WO2011/132528
PCT Pub. Date: Oct. 27, 2011

(65) Prior Publication Data
US 2013/0082901 A1 Apr. 4, 2013

(30) Foreign Application Priority Data
Apr. 23, 2010 (JP) .................... 2010-099620

(51) Int. Cl.
*F21V 8/00* (2006.01)
*G02F 1/1333* (2006.01)
(Continued)

(52) U.S. Cl.
CPC ............ *G02B 6/008* (2013.01); *G02F 1/13336* (2013.01); *G02F 1/133524* (2013.01); *G09G 3/3666* (2013.01); *G09G 2340/0471* (2013.01); *G09G 2360/122* (2013.01); *G09G 3/36* (2013.01)

(58) Field of Classification Search
CPC ................................... G09G 5/00; G09G 3/36
See application file for complete search history.

(56) References Cited

U.S. PATENT DOCUMENTS 5,129,028 A 7/1992 Soltan
5,280,371 A 1/1994 McCartney, Jr. et al.
(Continued)

FOREIGN PATENT DOCUMENTS

JP 6-273753 9/1994
JP 7-128652 5/1995
(Continued)

OTHER PUBLICATIONS
International Search Report for PCT/2011/058633, mailed Jun. 28, 2011.
(Continued)

*Primary Examiner* — Waseem Moorad
*Assistant Examiner* — Sujit Shah
(74) *Attorney, Agent, or Firm* — Nixon & Vanderhye, P.C.

(57) ABSTRACT

An interface (303) between adjacent ones of light guide sections (310) is inclined with respect to an incident surface (301) and an emission surface (302) of the light guide element (300A) so that an incident surface (311) of at least a part of the light guide sections (310) overlaps a part of a display region (202) in a liquid crystal panel (200A) and an emission surface (312) of said at least a part of the light guide sections (310) overlaps at least a part of a frame region (203) above which an image on the display region (202) is to be displayed. Furthermore, a relation 5°<θ<85° is met, where θ indicates an angle between a direction of a borderline between adjacent light guide sections (310) on a plan view and a direction in which pixels (201) adjacent to the frame region (203) are aligned.

8 Claims, 27 Drawing Sheets

(51) Int. Cl.
*G02F 1/1335* (2006.01)
*G09G 3/36* (2006.01)

(56) References Cited

U.S. PATENT DOCUMENTS

| | | | |
|---|---|---|---|
| 6,483,482 B1* | 11/2002 | Kim | 345/3.1 |
| 2003/0231144 A1* | 12/2003 | Cho et al. | 345/1.3 |
| 2006/0250064 A1* | 11/2006 | Park et al. | 313/112 |
| 2007/0097108 A1* | 5/2007 | Brewer | 345/204 |
| 2007/0222915 A1* | 9/2007 | Niioka et al. | 349/62 |
| 2008/0088215 A1 | 4/2008 | Park et al. | |
| 2010/0053858 A1* | 3/2010 | Kim | 361/679.01 |
| 2011/0025594 A1 | 2/2011 | Watanabe | |

FOREIGN PATENT DOCUMENTS

| | | |
|---|---|---|
| JP | 2000-56713 | 2/2000 |
| JP | 2001-5414 | 1/2001 |
| JP | 3442675 | 9/2003 |
| JP | 2006-313360 | 11/2006 |
| JP | 2007-256330 | 10/2007 |
| JP | 2009-198688 | 9/2009 |
| WO | WO 2009/122691 | 10/2009 |

OTHER PUBLICATIONS

Written Opinion for PCT/2011/058633, mailed Jun. 28, 2011.

* cited by examiner

F I G. 1 0
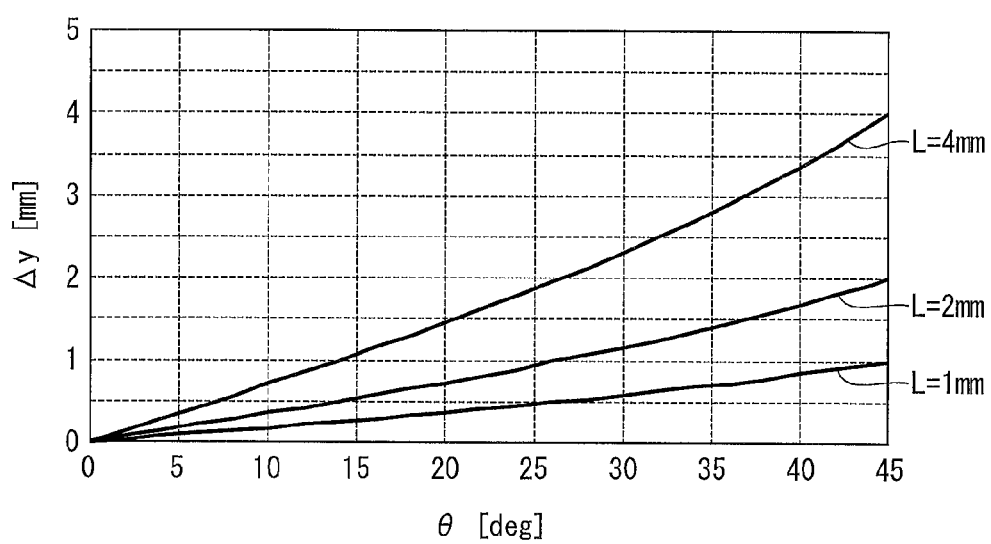

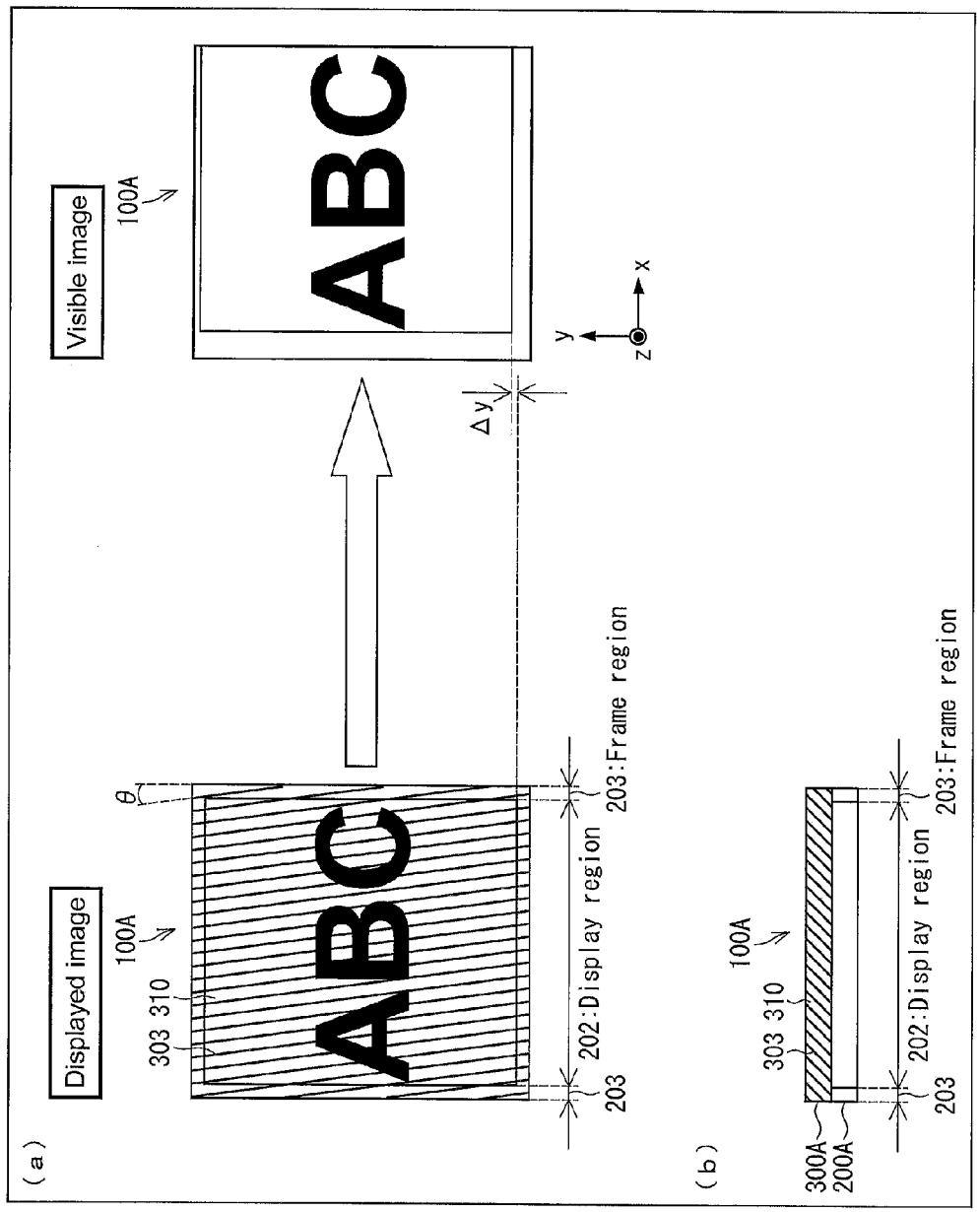

F I G. 20
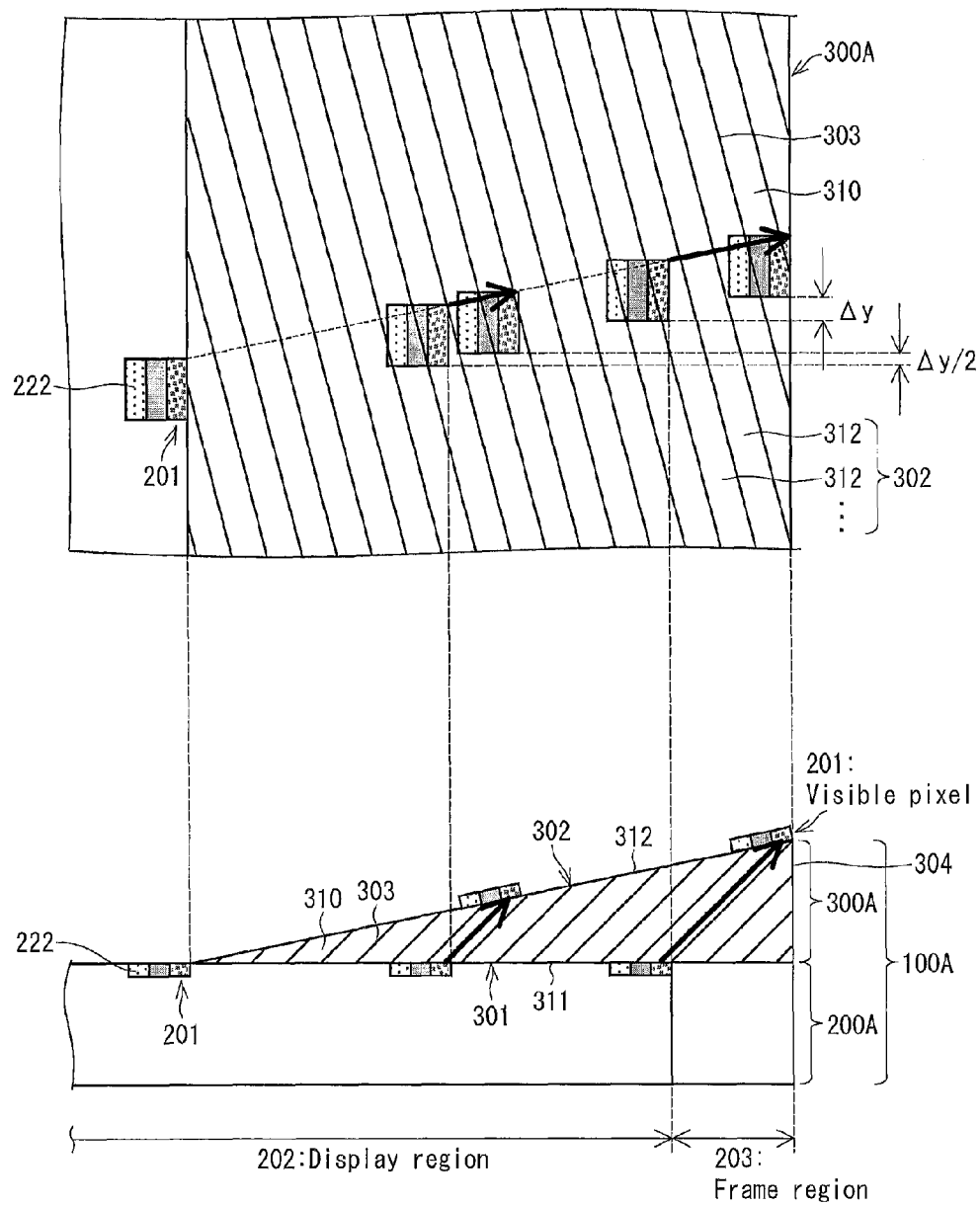

DISPLAY DEVICE, DISPLAY SYSTEM, DISPLAY CONTROL METHOD FOR SAME, ELECTRONIC DEVICE, PROGRAM, COMPUTER-READABLE RECORDING MEDIUM, AND LIGHT GUIDE ELEMENT

This application is the U.S. national phase of International Application No. PCT/JP2011/058633 filed 5 Apr. 2011 which designated the U.S. and claims priority to JP Patent Application No. 2010-099620 filed 23 Apr. 2010, the entire contents of each of which are hereby incorporated by reference.

TECHNICAL FIELD

The present invention relates to a seamless display technique for displaying an image seamlessly. To be more specific, the present invention relates to a display device, a display system, a display control method for the same, an electronic device, a program, a computer-readable recording medium, and a light guide element, each of which allows displaying an image seamlessly.

BACKGROUND ART

Recently, there is an increasing demand for enlarging a screen of a display device. However, enlarging a screen of a display device suffers many technical limits, and so development of a large display device requires much time.

In order to address the demand for enlarging a screen of a display device, for example, there is an attempt for arranging a plurality of display panels in a tiled pattern (tiling a plurality of display panels) and joining up display screens of the display panels so as to apparently realize a display device with a large screen.

However, a display panel includes a display region constituted by a plurality of pixels and a frame region formed outside the display region. The frame region includes a sealing section for causing a pair of substrates to face each other and sealing and retaining display medium (electric optical element) such as a liquid crystal material between the substrates, a driving circuit mounting section for driving pixels etc., which sections do not contribute to display.

Accordingly, the tiling technique for tiling a plurality of display panels and joining up display screens of the display panels suffers a problem that joint lines between the display panels are seen. Such a problem is common among direct-view display devices such as liquid crystal display devices (LCD), plasma display devices (PDP), and organic electroluminescence (EL) display devices independently of the type of display (display medium).

In order to deal with the problem, recently, there is proposed a display device with a light guide element on a display surface for the purposes of making a frame region of a display panel less apparent and enlarging a display area.

For example, Patent Literature 1 discloses a liquid crystal display device having an optical fiber face plate that covers the whole surface of a display panel. The optical fiber face plate is intended to guide a part of light emitted from a display region to a frame region in order to display an image seamlessly.

Furthermore, Patent Literature 2 discloses a display unit and a multiple-type display, each having an optical fiber face plate complex intended to enlarge and display light emitted from a display region to correspond to the size of a peripheral of the display region, thereby displaying an image seamlessly.

Furthermore, Patent Literature 3 discloses a display device which has optical compensation means constituted by a large number of tilted thin films and transparent mediums filling spaces between the tilted thin films and which guides a part of light emitted from a display region to a frame region via the optical compensation means so as to display an image seamlessly.

Furthermore, Patent Literature 4 discloses a display device in which a diffusing member including a large amount of optical fibers is provided only at a region in the vicinity of a frame region and which guides light emitted from a display region to the frame region via the optical fibers, thereby displaying an image seamlessly.

CITATION LIST

Patent Literatures

Patent Literature 1
Japanese Patent Application Publication No. 7-128652 (published on May 19, 1995)
Patent Literature 2
Japanese Patent Application Publication No. 2000-56713 (published on Feb. 25, 2000)
Patent Literature 3
Japanese Patent Application Publication No. 2001-5414 (published on Jan. 12, 2001)
Patent Literature 4
U.S. Pat. No. 5,129,028 (registered on Jul. 7, 1992)
Patent Literature 5
U.S. Pat. No. 5,280,371 (registered on Jan. 18, 1994)
Patent Literature 6
Japanese Patent No. 3442675 (registered on Jun. 20, 2003)
Patent Literature 7
Japanese Patent Application Publication No. 6-273753 (published on Sep. 30, 1994)

SUMMARY OF INVENTION

Technical Problem

However, the inventors of the present invention have actually laminated, on a region in the vicinity of a frame region or substantially the whole of a display panel, a light guide element which guides light emitted from a display region to the frame region so as to display an image, and found that, in either case, there was observed moiré (interference pattern), not resulting in good display.

Furthermore, it was found that the technique described in Patent Literature 4 suffers a problem that sides of the optical fibers are observed as steps and continuity of displays lacks, not resulting in good quality.

The present invention was made in view of the foregoing problems. An object of the present invention is to provide a technique which allows displaying an image at a frame region and preventing moiré.

Solution to Problem

In order to solve the foregoing problems, a display device of the present invention is a display device, including:
a display panel including a display region in which pixels are aligned in at least one direction and a frame region which is a non-display region positioned outside the display region; and
a light guide element, positioned on a display surface of the display panel, for guiding a part of light emitted from the display panel toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view (i.e. when the display device is seen from a direction perpendicular to the display surface of the display device) and a direction in which pixels adjacent to the frame region above which an image on the display region is to be displayed are aligned.

As described above, by the light guide element guiding a part of light emitted from the display region of the display panel toward above the frame region, it is possible to create display on the frame region of the display panel which region is a non-display region when the display device is seen from above the light guide element.

However, when a conventional display device in which a light guide element including a plurality of light guide sections being parallel to each other is provided on a surface of a display panel is manufactured and driven, moiré appears, resulting in unsatisfactory display.

The inventors of the present invention have found that such a conventional display device in which display is created above the frame region suffers moiré, and moiré appears due to interference between a periodic structure of pixels of a liquid crystal panel and a periodic structure of light guide sections of a light guide element, and depending on an angle between the borderline of adjacent light guide sections on the incident surface and the emission surface of the light guide element and the direction in which pixels adjacent to the frame region are aligned, moiré appears due to the interference between a periodic structure of pixels of a liquid crystal panel and a periodic structure of light guide sections of a light guide element, resulting in unsatisfactory display.

The inventors of the present invention have found that when the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on the incident surface and the emission surface of the light guide element and a direction in which pixels adjacent to the frame region are aligned, it is possible to create display above the frame region and to prevent moiré. Thus, the inventors of the present invention have completed the present invention.

Furthermore, in order to solve the foregoing problems, a display system of the present invention is a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are line-symmetrical with respect to a boundary between said adjacent ones of the plurality of display devices.

Since the display system includes the display devices, the display system can create display above the frame region and prevent moiré. However, when the light guide sections overlap while being inclined by an angle $\theta$ with respect to the direction in which pixels are aligned, a displayed image is shifted not only in a direction that hides the frame region but also in a direction in which pixels adjacent to the frame region are aligned.

In a case where only one display device is used, shift of a displayed image in the direction in which pixels adjacent to the frame region are aligned does not disturb display.

However, in a case where a plurality of display devices are aligned on a single plane as described above, when a borderline of adjacent light guide sections on an emission surface of one light guide element and a borderline of adjacent light guide sections on an emission surface of another light guide element are inclined in the same direction, light from a display region of a display panel through one light guide element and light from a display region of a display panel through another light guide element are guided in opposite directions. Consequently, an image displayed on one display device and an image displayed on another display device are shifted in opposite directions, resulting in great displacement of images at the boundary between the two display devices when a viewer views the display system as a whole.

However, when the direction of a borderline between adjacent light guide sections on the emission surface of one light guide element and the direction of a borderline between adjacent light guide sections on the emission surface of another light guide element are line-symmetrical with respect to a boundary between adjacent display devices, images are shifted in the same direction. Consequently, display can be created without displacement of images between adjacent display devices, so that frames of individual display devices at the boundary between the display devices are hardly to be seen.

Furthermore, in order to solve the foregoing problems, a display system of the present invention is a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, and said adjacent ones of the plurality of display devices being staggered from each other in the direction in which pixels adjacent to the frame region are aligned, so that displacements of images displayed on said adjacent ones of the plurality of display devices, respectively, seen by a viewer through the light guide element, cancel each other.

Since the display system includes the display device, the display system can create display at the frame region and prevent moiré.

Furthermore, in the display system, said adjacent ones of the plurality of display devices are staggered from each other in the direction in which pixels adjacent to the frame region are aligned, so that displacements of images displayed on said adjacent ones of the plurality of display devices, respectively, seen by a viewer through the light guide element, cancel each other. Accordingly, even when on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, the display system can create display without shifts of images between the adjacent display devices. Consequently, frames of individual display devices at the boundary between the display devices are hardly to be seen.

Furthermore, in order to solve the foregoing problems, a display system of the present invention is a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, and the display system further comprising a driving control device for controlling driving of the plurality of display panels, the display control device causing images displayed on the display panels in said adjacent ones of the plurality of display devices, respectively, to be shifted from each other in the direction in which pixels adjacent to the frame region are aligned, so that displacements of images displayed on said adjacent ones of the plurality of display devices, respectively, seen by a viewer through the light guide element, cancel each other.

Since the display system includes the display device, the display system can create display at the frame region and prevent moiré.

Furthermore, even when on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, the display system can cause individual display panels to display images whose shift amounts have been corrected by software beforehand, thereby cancelling displacement of actually visible images.

Furthermore, in order to solve the foregoing problems, a display system of the present invention is a display system, including the aforementioned display device, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display system further comprising a driving control device for controlling driving of the display panel, the driving control device causing an image displayed on the display region overlapping the incident surface of the light guide element in the display panel to be shifted in a direction in which pixels adjacent to the frame region are aligned, in accordance with a position of the displayed image between an end of the incident surface of the light guide element which end is closer to the display region of the display panel and an end of the incident surface which end is farther from the display region, so that displacement of a displayed image at a region where the light guide element is provided, seen by a viewer through the light guide element, is cancelled.

By using the light guide element having a triangular pillar shape as above, it is possible to reduce the weight of the display device compared with when a light guide element is provided on the whole of the display surface of the display panel for example, and costs for manufacturing the display device can be reduced.

However, in the case where the light guide element having a triangular pillar shape is used, the shift amount varies depending on a pixel position. Accordingly, it is necessary to change the shift amount depending on a pixel position.

With the arrangement, the display system can cause individual display panels to display images whose shift amounts have been corrected by software beforehand with respect to each pixel position, thereby cancelling displacement of actually visible images.

Furthermore, in order to solve the foregoing problems, a display system of the present invention is a display system, including a plurality of display devices aligned on a single plane, each of the plurality of display devices being a display device as set forth in claim 1 or 2, the light guide element in each of the plurality of display devices being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, the light guide element is provided on a part of the display region of the display panel and on the frame region above which an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are line-symmetrical with respect to a boundary between said adjacent ones of the plurality of display devices, the display system further comprising a driving control device for controlling driving of the plurality of display panels, the driving control device causing an image displayed on the display region overlapping the incident surface of the light guide element in each of the plurality of display panels to be shifted in a direction in which pixels adjacent to the frame region are aligned in each of the plurality of display panels, in accordance with a position of the displayed image between an end of the incident surface of the light guide element which end is closer to the display region of each of the plurality of display panels and an end of the incident surface which end is farther from the display region, so that displacement of a displayed image at a region where the light guide element is provided, seen by a viewer through the light guide element in each of the plurality of display devices, is cancelled.

In a case where the triangular prism-shaped light guide element is used as described above, the shift amount differs depending on where a pixel is positioned. Therefore, it is necessary to change the shift amount depending on where a pixel is positioned.

With the arrangement, the display system can cause individual display panels to display images whose shift amounts have been corrected by software beforehand with respect to each pixel position, thereby cancelling displacement of actually visible images.

Furthermore, in order to solve the foregoing problems, a display device of the present invention is a display device, including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and when a distance between interfaces of adjacent ones of the plurality of light guide sections on the incident surface of the light guide element is referred to as a pitch p1, a distance between interfaces of adjacent ones of the plurality of light guide sections in a direction perpendicular to an optical transmission direction is referred to as a pitch p11, a pitch between pixels adjacent to the frame region above which an image on the display region is to be displayed is referred to as a pitch p2, an acute angle between a plane parallel to the display surface of the display panel and a borderline between adjacent ones of the plurality of light guide sections on a cross section of the light guide element in a normal direction is referred to as an inclination angle $\alpha$, and m is a natural number, in a case of P1>P2, a relation $$(m+0.3) \times p2 \times \sin\alpha < p11 < (m+0.7) \times p2 \times \sin\alpha$$

being met, and in a case of P1<P2, a relation $$p2 \times \sin\alpha/(m+0.7) < p11 < p2 \times \sin\alpha/(m+0.3)$$

being met.

Also with the above arrangement, it is possible to prevent moiré, and to create satisfactory display. When employing the above arrangement, $\theta$ is not particularly limited.

Furthermore, it is preferable to arrange the display device such that a relation below is met, $$\alpha > \sin^{-1}(n_0/n_1)$$

where $n_0$ indicates an absolute refractive index of an air layer and $n_1$ indicates a relative refractive index of the transmissive layer in the light guide section with respect to the absolute refractive index of the air layer.

By setting the inclination angle $\alpha$ as above, it is possible to create satisfactory display without leakage of external light to the outside.

It is preferable that an electronic device of the present invention includes the aforementioned display system and is foldable at an interface section between adjacent display devices.

Furthermore, in order to solve the foregoing problems, a display control method of the present invention is a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5° < \theta < 85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are identical, the display control method comprising the steps of:

(i) dividing a data signal corresponding to one line of an input image source into data signals in the number of the plurality of display devices, and (ii) generating a timing signal for causing the data signals obtained in the step (i) to be outputted to respective display panels with different timings, so that displacements of displayed images between the plurality of display devices cancel each other.

Furthermore, in order to solve the foregoing problems, a display control method of the present invention is a display control method for a display system including a display device, the display device including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation 5°<θ<85° is met, where θ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display control method comprising the step of generating a timing signal for causing a data signal displayed on the region where the light guide element is provided on the display panel to be outputted to the display panel with a shifted timing corresponding to the shift amount by referring to a look-up table, so that a displacement amount of the displayed image on the region where the light guide element is provided is cancelled, said look-up table being a look-up table in which a shift amount of a displayed image in accordance with a position of the displayed image between an end of the incident surface of the light guide element which end is closer to the display region of the display panel and an end of the incident surface which end is farther from the display region is related to a corresponding position of a pixel on the display panel.

Furthermore, in order to solve the foregoing problems, a display control method of the present invention is a display control method for a display system including a display device, the display device including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation 5°<θ<85° is met, where θ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display control method comprising the steps of:

(i) calculating a shift amount of a displayed image along the direction in which pixels adjacent to the frame region are aligned, with respect to each position of a pixel on the display panel, by using the angle between the direction of a borderline between adjacent ones of the plurality of light guide sections on a plan view and the direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, and generating a timing signal for causing a data signal displayed on the region where the light guide element is provided on the display panel to be outputted to the display panel with a shifted timing corresponding to the shift amount calculated in the step (i), so that the shift amount of the displayed image on the region where the light guide element is provided is cancelled.

Furthermore, in order to solve the foregoing problems, a display control method of the present invention is a display control method for a display system including a display device, the display device including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is a right triangle, and the light guide element covers a part of the display region of the display panel and at least a part of the frame region above which an image on the display region is to be displayed, the display control method comprising the steps of:

(i) calculating a shift amount of a displayed image in accordance with a position of the displayed image between an end of the incident surface of the light guide element which end is closer to the display region of the display panel and an end of the incident surface which end is farther from the display region, with respect to each position of a pixel on the display panel, based on a linear function which exhibits 0 at the end of the incident surface of the light guide element which end is closer to the display region of the display panel and exhibits L×tan $\theta$ at an end of the frame region above which an image on the display region is to be displayed, the end of the frame region being farther from the display region, and (ii) generating a timing signal for causing a data signal displayed on the region where the light guide element is provided on the display panel to be outputted to the display panel with a shifted timing corresponding to the shift amount calculated in the step (i), so that a displacement amount of the displayed image on the region where the light guide element is provided is cancelled.

Furthermore, in order to solve the foregoing problems, a display control method of the present invention is a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, and (ii) generating a timing signal for causing a data signal which is obtained in the step (i) and which is to be displayed on the region where the light guide element is provided on the display panel to be outputted to the display panel with a shifted timing corresponding to the shift amount by referring to a look-up table, so that a displacement amount of the displayed image on the region where the light guide element is provided is cancelled, the look-up table being a look-up table in which a shift amount of a displayed image in accordance with a position of the displayed image between an end of the incident surface of the light guide element provided in each of the plurality of display devices which end is closer to the display region of the display panel and an end of the incident surface which end is farther from the display region is related to a corresponding position of a pixel on the display panel.

Furthermore, in order to solve the foregoing problems, a display control method of the present invention is a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, (ii) calculating a shift amount of a displayed image along the direction in which pixels adjacent to the frame region are aligned, with respect to each position of a pixel on the display panel, by using the angle between a direction of a borderline between adjacent ones of the plurality of light guide sections on a plan view of each of the plurality of display devices and a direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, and (iii) generating a timing signal for causing a data signal which is obtained in the step (i) and which is to be displayed on the region where the light guide element is provided on the display panel to be outputted to the display panel with a shifted timing corresponding to the shift amount calculated in the step (ii), so that a displacement amount of the displayed image on the region where the light guide element is provided is cancelled.

Furthermore, in order to solve the foregoing problems, a display control method of the present invention is a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5° < \theta < 85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is a right triangle, and the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, (ii) calculating a shift amount in accordance with a position of the displayed image between the end of the incident surface of the light guide element which end is closer to the display region of the display panel and an end of the incident surface which end is farther from the display region, with respect to each position of a pixel on the display panel, based on a linear function which exhibits 0 at the end of the incident surface of the light guide element which end is closer to the display region of the display panel and exhibits $L \times \tan \theta$ at an end of the frame region above which an image on the display region is to be displayed, the end of the frame region being farther from the display region, and (iii) generating a timing signal for causing a data signal which is obtained in the step (i) and which is to be displayed on the region where the light guide element is provided on the display panel to be outputted to the display panel with a shifted timing corresponding to the shift amount calculated in the step (ii), so that a displacement amount of the displayed image on the region where the light guide element is provided is cancelled.

With each of the aforementioned methods, individual display panels display images whose shift amounts have been corrected as above, so that displacement of actually visible images can be cancelled.

The steps of the display control method carried out by the display system may be realized by a computer. In that case, a computer carries out the steps of the display control method according to a program. Accordingly, a program for causing a computer to realize the display control method is also encompassed in the present invention. Furthermore, a computer-readable storage medium in which the program is stored is also encompassed in the present invention.

Furthermore, in order to solve the foregoing problems, a light guide element of the present invention is a light guide element for guiding a part of light emitted from a display region of a display panel toward above a frame region of the display panel, so that an image on the display region is displayed above the frame region, the light guide element being rectangular on a plan view and, out of an incident surface and an emission surface, at least the incident surface being flat, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and an angle between a direction of a borderline between adjacent ones of the plurality of light guide sections on a plan view and an outer edge of the light guide element falling within not less than 5° and less than 85°.

In general, a display panel has a rectangular shape. In the display panel having a rectangular shape, pixels are formed in such a manner as to be parallel to the outer edge of the display panel. Accordingly, by overlapping the light guide element having the above configuration on the display surface of the display panel in such a manner as to bridge the boundary between the display region and the frame region of the display panel, it is possible to guide a part of light emitted from the display region of the display panel toward above the frame region of the display panel. Consequently, an image on the display region can be displayed above the frame region, and the above configuration of the light guide element can prevent generation of moiré. Therefore, the light guide element having the above configuration is suitable for the display device of the present invention.

Advantageous Effects of Invention

In the present invention, as described above, the plurality of light guide sections of the light guide element are designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed. Accordingly, it is possible to display an image above the frame region of the display panel through the light guide element.

In this configuration, (1) by setting the angle $\theta$ to meet the relation $5° < \theta < 85°$ or (2) by setting the pitches p1, p11, and p2 and the inclination angle $\alpha$ to meet the relation $(m+0.3) \times p2 \times \sin \alpha < p11 < (m+0.7) \times p2 \times \sin \alpha$ in a case of P1>P2 and the relation $p2 \times \sin \alpha/(m+0.7) < p11 < p2 \times \sin \alpha/(m+0.3)$ in a case of P1<P2, it is possible to prevent generation of moiré due to placement of the light guide element. Consequently, it is possible to realize both display of an image above the frame region of the display panel and prevention of moiré.

Furthermore, in a case of employing the above configuration (1), by appropriately arranging adjacent light guide elements or adjacent display devices or by software for image correction, it is possible to create good display without image displacement in a display screen constituted by at least one display device even when characters etc. are displayed on a frame region of a display panel.

BRIEF DESCRIPTION OF DRAWINGS

FIG. 10 is a graph showing a relation among an angle θ, a width L of a frame region, and a shift amount Δy in a longitudinal direction.

FIG. 11(a) of FIG. 11 is a plan view showing a relation among an image displayed on a liquid crystal panel, an image actually visible through a light guide element, and an interface between light guide sections. (b) of FIG. 11 is a cross sectional view showing a direction in which the interface between the light guide sections is inclined in the liquid crystal display device shown in (a) of FIG. 11.

FIG. 20 is a view for explaining a relationship between the position of an original pixel on a display region having a triangular prism-shaped light guide element thereon and the position of a visible pixel displayed above a frame region to which the original pixel is shifted in a longitudinal direction.

DESCRIPTION OF EMBODIMENTS

The following explains embodiments of the present invention in details.

First Embodiment

Figure 1:
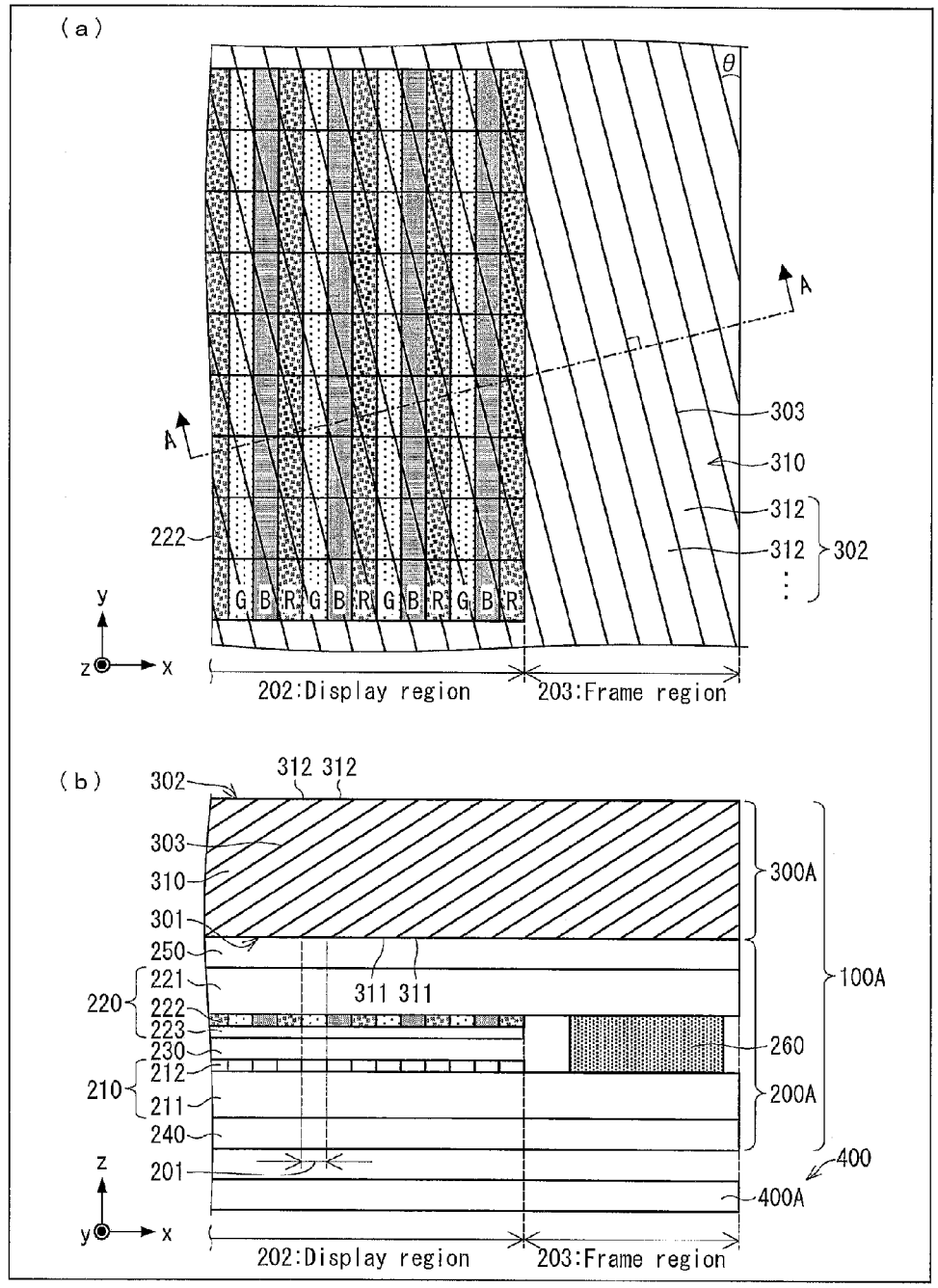
FIG. 1(a) of FIG. 1 is a plan view schematically showing a configuration of a main part of a liquid crystal display device in accordance with First Embodiment of the present invention. (b) of FIG. 1 is a cross sectional view of the liquid crystal display device taken along a line A-A of (a) of FIG. 1.
Figure 13:
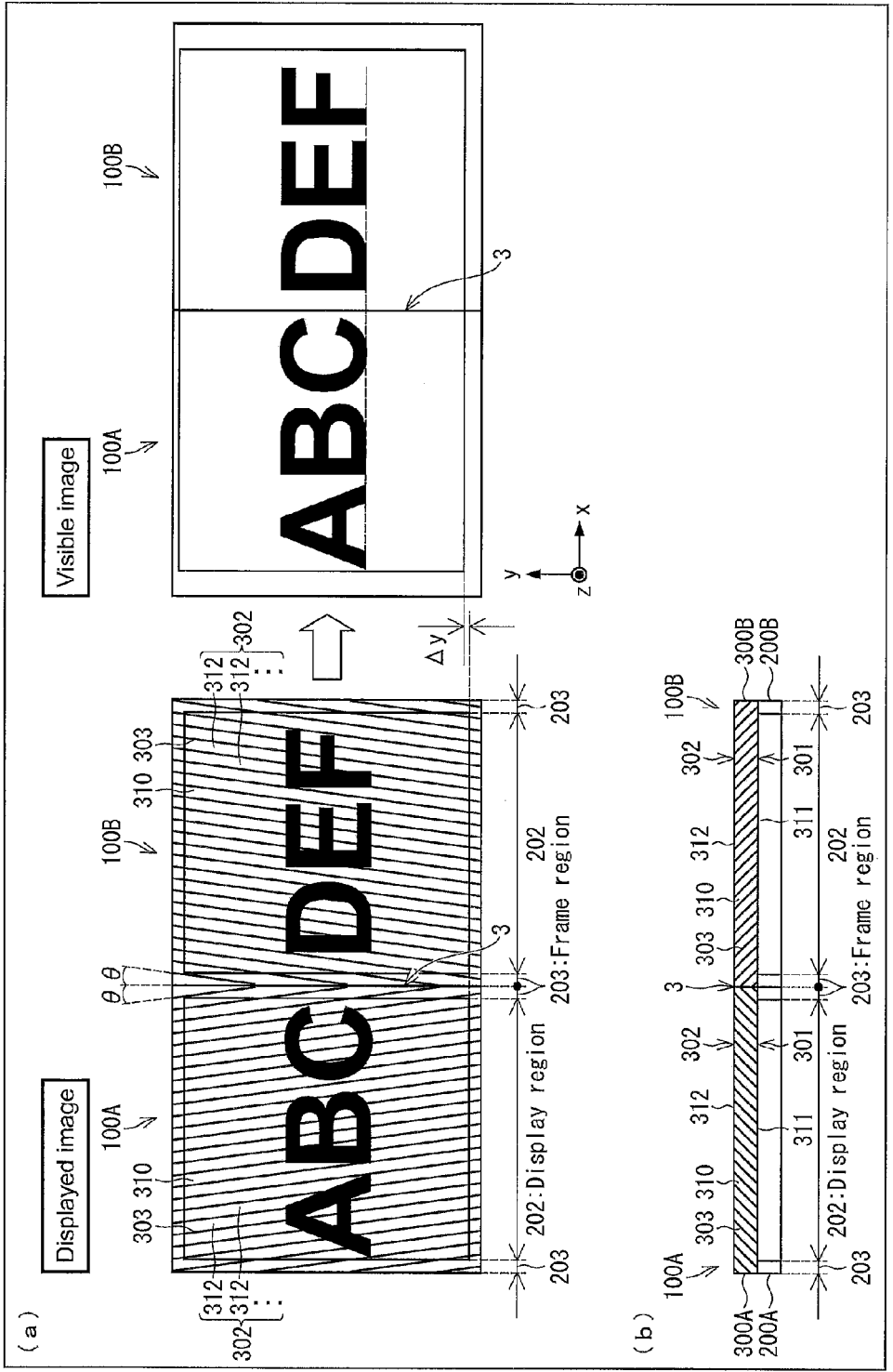
FIG. 13(a) of FIG. 13 is a plan view showing a relation among images displayed on liquid crystal panels, images actually visible through light guide elements, and interfaces between light guide sections in a case where a direction in which a borderline between adjacent light guide sections on an emission surface of one light guide element is inclined and a direction in which a borderline between adjacent light guide sections on an emission surface of the other light guide element is inclined are line-symmetrical in an arrangement in which adjacent liquid crystal display devices are arranged in a horizontal direction. (b) of FIG. 13 is a cross sectional view showing an inclination direction of the interface between the light guide sections in the liquid crystal display device shown in (a) of FIG. 13.

The following explains an embodiment of the present invention with reference to FIG. 1 to (a) and (b) of FIG. 13.

Examples of a display system in accordance with the present embodiment and an electronic device including the display system include various electronic devices that have display sections, such as mobile phones, electronic books, game machines, TVs (television receivers), public bulletin boards for outdoor use.

In the following, the display system will be explained using electronic devices such as electronic books, game machines, and mobile phones as examples. However, the present embodiment is not limited to these.

In the following, the display system in accordance with the present embodiment will be explained using, as an example, a liquid crystal display system including a liquid crystal display device as a display device. However, the present embodiment is not limited to this.

<Appearance of Liquid Crystal Display System>

Figure 2:
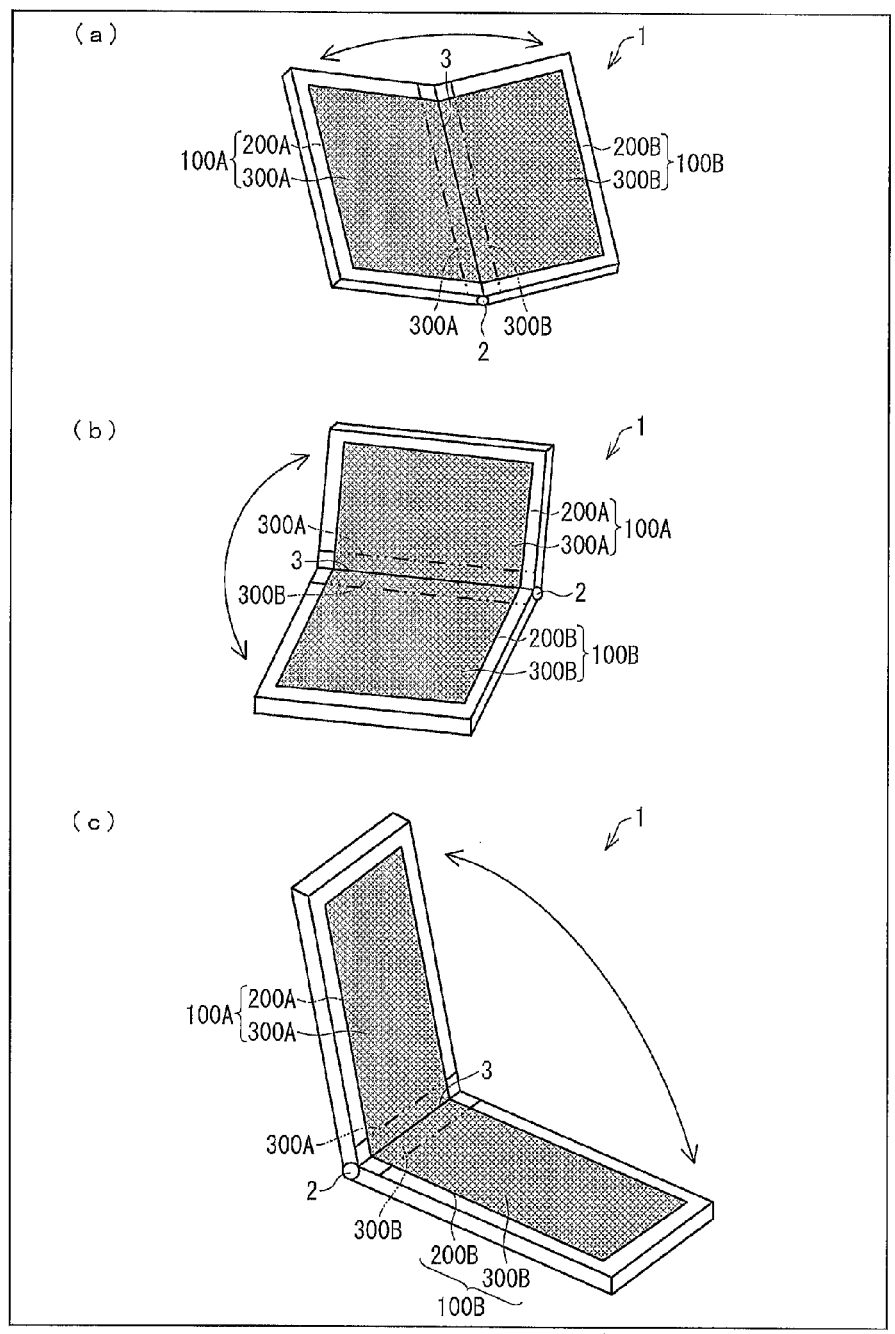
FIG. 2(a)-(c) of FIG. 2 are views schematically showing examples of the appearance of a liquid crystal display system in accordance with First Embodiment.

(a)-(c) of FIG. 2 are views schematically showing examples of appearances of a liquid crystal display system 1 in accordance with the present embodiment.

The liquid crystal display system 1 shown in (a)-(c) of FIG. 2 is a foldable electronic device having two display sections. Examples of the liquid crystal display system 1 shown in (a)-(c) of FIG. 2 include electronic books, game machines, and portable phones as described above. However, the present embodiment is not limited to them.

As shown in (a)-(c) of FIG. 2, the liquid crystal display system 1 includes, as a first display section (display unit) and a second display section (display unit), two liquid crystal display devices 100A and 100B (first display device and second display device) that are positioned to be adjacent to each other.

The liquid crystal display system 1 is a tiling type liquid crystal display system in which two liquid crystal display devices 100A and 100B are arranged in a tiled pattern. By tiling a plurality of liquid crystal display devices as above, it is possible to obtain a liquid crystal display system having a large screen. Tiling may be made by a publicly known method.

The liquid crystal display device 100A (first display device) includes a liquid crystal panel 200A (first display panel, liquid crystal display panel) and a light guide element 300A (first light guide element) positioned on the liquid crystal panel 200A. Similarly, the liquid crystal display device 100B (second display device) includes a liquid crystal panel 200B (second display panel, liquid crystal display panel) and a light guide element 300B (second light guide element) positioned on the liquid crystal panel 200B.

These light guide elements 300A and 300B may be provided on the whole display surfaces of the liquid crystal panels 200A and 200B, respectively. Alternatively, as shown by chain double-dashed lines in (a)-(c) of FIG. 2, the light guide elements 300A and 300B may be provided only at and in the vicinity of adjacent frame regions in the adjacent liquid crystal panels 200A and 200B.

In either case, the light guide elements 300A and 300B are provided on the liquid crystal display devices 100A and 100B, respectively, in such a manner that ends of the light guide elements 300A and 300B contact with each other so that the liquid crystal display devices 100A and 100B are arranged (tiled) in a tiled pattern so as to form a one seamless screen.

On the other hand, the liquid crystal panels 200A and 200B in the liquid crystal display devices 100A and 100B respectively may be provided in such a manner that ends of the liquid crystal panels 200A and 200B are close to each other or that the ends contact with each other.

Configurations of the liquid crystal panels 200A and 200B and the light guide elements 300A and 300B will be explained later.

The liquid crystal display devices 100A and 100B are rotatably connected with each other by a movable mechanism such as a hinge 2. Consequently, the liquid crystal display system 1 is foldable at a border 3 between the liquid crystal display devices 100A and 100B, and a relative angle between display surfaces of the liquid crystal display devices 100A and 100B can be changed.

Such a movable mechanism is merely an example and may be omitted. An angle between two display surfaces may be constant.

<Whole Configuration of Liquid Crystal System 1>

Next, an explanation is made as to a whole configuration of the liquid crystal display system 1.

In the following, an explanation is made as to a case where the liquid crystal display system 1 includes two liquid crystal display devices 100A and 100B. However, the number of the liquid crystal display device is not particularly limited, and may be one or three or more.

In the following, an explanation is made as to a case where the liquid crystal display system 1 includes the liquid crystal display devices 100A and 100B positioned to be adjacent to each other in a gate line direction (horizontal direction), i.e. a right-and-left direction, these two liquid crystal display devices 100A constitute one screen, and the liquid crystal display devices 100A and 100B have the light guide elements 300A and 300B having a plate shape on whole display surfaces of the liquid crystal panels 200A and 200B which display surfaces are viewer's side surfaces of the liquid crystal panels 200A and 200B, respectively. However, the present embodiment is not limited to this.

In the present embodiment, an explanation is made as to a case of employing a line inversion driving method in which polarities of a voltage applied to a liquid crystal layer 230 are inverted with respect to each line and with respect to each frame. However, the present embodiment is not limited to this.

In the following explanation, a display surface side (viewer's side) is referred to as an upper side (front side) and a side opposite to the display surface side is referred to as a lower side (back side).

Figure 3:
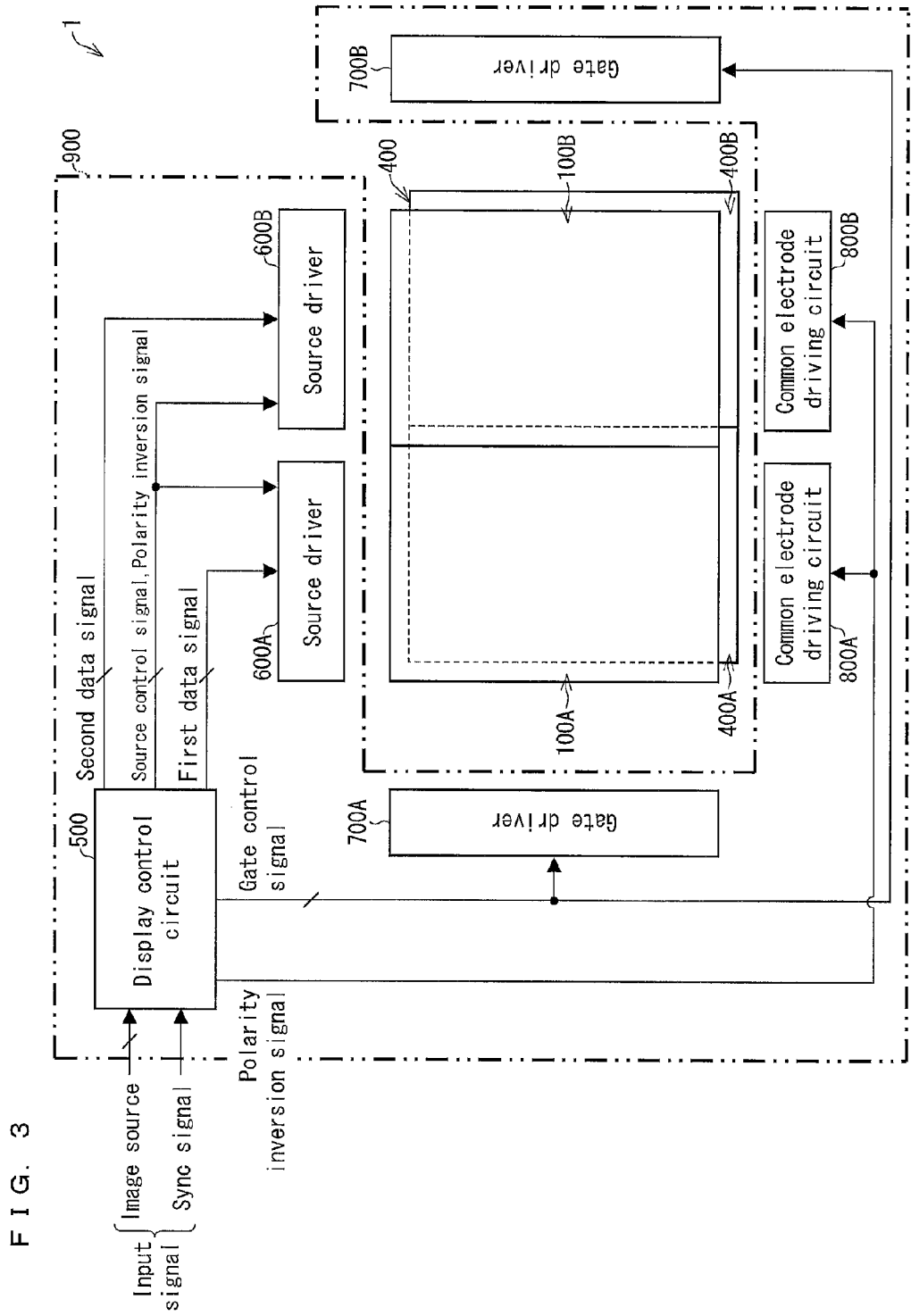
FIG. 3 is a block diagram schematically showing a configuration of a main part of the liquid crystal display system in accordance with First Embodiment.

FIG. 3 is a block diagram schematically showing a configuration of a main part of the liquid crystal display system 1 in accordance with the present embodiment.

As shown in FIG. 3, the liquid crystal display system 1 in accordance with the present embodiment includes the liquid crystal display devices 100A and 100B serving as a first display section and a second display section, respectively, a backlight device 400 (backlight section), and a driving control device 900 (driving control section) which includes a display control circuit 500 (display control means, display control section), source drivers 600A and 600B, gate drivers 700A and 700B, and common electrode driving circuits 800A and 800B.

The source driver 600A (first source driver), the gate driver 700A (first gate driver), the common electrode driving circuit 800A (first common electrode driving circuit) are driving control circuits for the first display section, and are positioned around the liquid crystal panel 200A in the liquid crystal display device 100A. The source driver 600B (second source driver), the gate driver 700B (second gate driver), the common electrode driving circuit 800B (second common electrode driving circuit) are driving control circuits for the second display section, and are positioned around the liquid crystal panel 200B in the liquid crystal display device 100B.

The display control circuit 500 and the source drivers 600A and 600B may be constituted by separate LSIs (Large Scale Integration Circuit) chips, respectively, or may be constituted by a single LSI chip. In the case where the display control circuit 500 and the source drivers 600A and 600B are constituted by a single LSI chip, the LSI chip may be a RAM built-in source driver including a RAM as a later-mentioned memory. Furthermore, a driving control circuit which includes the display control circuit 500, the source drivers 600A and 600B, and the gate drivers 700A and 700B may be constituted by a single LSI chip, or may be formed monolithically on glass substrates of the liquid crystal panels 200A and 200B instead of the form of a chip.

Furthermore, the backlight device 400 includes a backlight 400A (first backlight) for the first display section, a backlight 400B (second backlight) for the second display section, and a backlight driving circuit (not shown) for driving the backlights 400A and 400B.

The backlights 400A and 400B are provided at back surface sides of the liquid crystal panels 200A and 200b in the liquid crystal display devices 100A and 100B, respectively, and the backlights 400A and 400B emit light to the liquid crystal display devices 100A and 100B from the back surface sides of the liquid crystal panels 200A and 200B.

The backlight device 400 may be a conventional and publicly known illumination device. Specific examples thereof include a backlight device in which a plurality of cold-cathode tubes are arranged in parallel as light sources for the backlights 400A and 400B, and an LED system using light-emitting diodes (LED) as light sources for the backlights 400A and 400B. However, the present embodiment is not limited to these.

Among candidates for the backlight device 400, a backlight device capable of adjusting luminance distribution is preferable, and an area active backlight device is more preferable.

Figure 4:
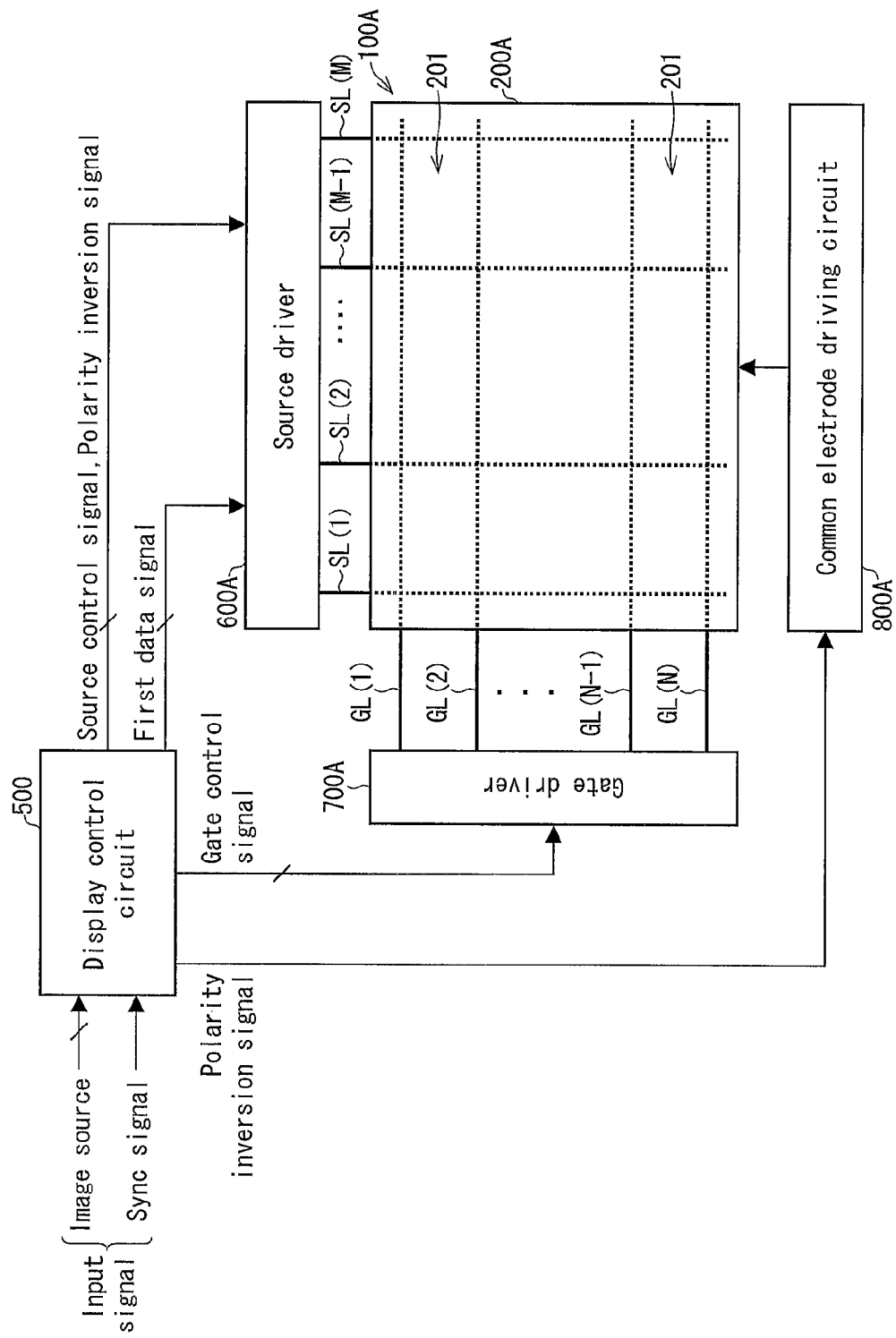
FIG. 4 is a block diagram schematically showing configurations of a liquid crystal panel in accordance with First Embodiment and its peripherals.

Next, with reference to FIG. 4, an explanation is made as to relations between individual display sections and driving control circuits for driving the display sections.

The liquid crystal panel 200A and the liquid crystal panel 200B have the same structure. Furthermore, the liquid crystal display device 100A and the liquid crystal display device 100B include the same members. Accordingly, in explanations on the present embodiment and later-mentioned other embodiments, the sign "A" at the end of each member may be replaced with the sign "B". For example, "liquid crystal display device 100A", "liquid crystal panel 200A", and "light guide element 300A" may be replaced with "liquid crystal display device 100B", "liquid crystal panel 200B", and "light guide element 300B", respectively.

As such, in the following, an explanation is made using as an example the liquid crystal display device 100A which is the first display section (see FIG. 4).

FIG. 4 is a block diagram schematically showing configurations of the liquid crystal panel 200A and its peripherals.

As described above, the liquid crystal panel 200A is a liquid crystal panel of an active matrix type, and includes a plurality of pixels arranged in a matrix manner.

As shown in FIG. 4, the liquid crystal panel 200A includes a plurality of (M) source lines SL(1)-SL(M) and a plurality of (N) gate lines GL(1)-GL(N) that cross the plurality of source lines SL(1)-SL(M). Hereinafter, unless it is necessary to distinguish the source lines SL(1)-SL(M), they are collectively referred to as "source line SL". Unless it is necessary to distinguish the gate lines GL(1)-GL(N), they are collectively referred to as "gate line GL".

A region surrounded by the source lines SL and the gate lines GL is a pixel. The liquid crystal panel 200A includes a plurality of (M×N) pixels 201 that are provided in such a manner as to correspond to intersections of the source lines SL and the gate lines GL.

Each pixel 201 includes a pixel electrode (not shown) and a switching element (not shown) such as a thin film transistor (TFT).

A gate electrode of each switching element is connected with a gate line GL that passes through a corresponding intersection. A source electrode of each switching element is connected with a source line SL that passes through a corresponding intersection. A drain electrode of each switching element is connected with a pixel electrode of each pixel 201.

The source line SL and the gate line GL in the liquid crystal panel 200A are connected with the source driver 600A and the gate driver 700A, respectively. Similarly, the source line SL and the gate line GL in the liquid crystal panel 200B are connected with the source driver 600B and the gate driver 700B, respectively.

The common electrode driving circuit 800A is connected with a common electrode (not shown) which is common among the pixels 201 in the liquid crystal panel 200A. The common electrode driving circuit 800B is connected with a common electrode (not shown) which is common among the pixels 201 in the liquid crystal panel 200B.

As shown in FIGS. 3 and 4, the display control circuit 500 receives an input signal from an input signal supply source (not shown) provided outside, and generates a source control signal, a gate control signal, and a polarity inversion signal ($\phi$) from the input signal, and outputs the generated source control signal to the source drivers 600A and 600B. Furthermore, the display control circuit 500 outputs the generated gate control signal to the gate drivers 700A and 700B, and outputs the generated polarity inversion signal to the source drivers 600A and 600B and the common electrode driving circuits 800A and 800B.

The source control signal is a timing signal for controlling timing for driving the source drivers 600A and 600B. The gate control signal is a timing signal for controlling timing for driving the gate drivers 700A and 700B. The polarity inversion signal is a timing signal for inverting the polarity of a voltage applied on a liquid crystal layer in each pixel 201.

The source control signal includes a source start pulse signal (SSP), a source clock signal (SCK), a latch strobe signal (LS) etc.

The gate control signal includes a gate start pulse signal (GSP), a gate clock signal (GCK) etc.

Furthermore, input data inputted to the display control circuit 500 from the input signal supply source includes image sources such as a data signal (image signal) and sync signals such as a horizontal sync signal and a vertical sync signal.

The image source may be a still image or a moving image. Examples of the image source include books (texts), photographs, slide shows, and word processing documents.

The display control circuit 500 divides the input data signal into a data signal for the first display section (first data signal) and a data signal for the second display section (second data signal) by using a memory (storage section) (not shown) such as a RAM, and outputs the first data signal to the source driver 600A and outputs the second data signal to the source driver 600B in the order of scanning in accordance with the generated source control signal. The memory is a line memory for example.

The source drivers 600A and 600B serve as driving sections for driving the liquid crystal panels 200A and 200B in accordance with the first data signal and the second data signal, respectively. The source drivers 600A and 600B receive, from the display control circuit 500, the first data signal, the second data signal, and the source control signals such as the source start pulse signal (SSP), the source clock signal (SCK), and the latch strobe signal (LS), and applies driving source signals to the source lines SL(1)-SL(M) so as to charge pixel capacitors of individual pixels in the liquid crystal panels 200A and 200B. At that time, the source drivers 600A and 600B sequentially retain the first data signal and the second data signal that are indicative of voltages to be applied to the source lines SL(1)-SL(M) with timing when the pulse of the source clock signal (SCK) is generated.

The first data signal and the second data signal are digital image signals. The retained first data signal and the retained second data signal are converted into analog voltages with timing when the pulse of the latch strobe signal (LS) is generated. The analog voltages are applied, as source signals (driving source signals), on all the source lines SL(1)-SL(M) in each of the liquid crystal panels 200A and 200B simultaneously. In the present embodiment, the source lines SL(1)-SL(M) are driven by a line sequential driving method. The polarities of the source signals applied on the source lines SL(1)-SL(M) are inverted according to the polarity inversion signal ($\phi$) in order to AC-drive the liquid crystal panels 200A and 200B.

The gate drivers 700A and 700B sequentially apply active gate signals on the gate lines GL(1)-GL(N) in accordance with the gate start pulse signal (GSP) and the gate clock signal (GCK) that are outputted from the display control circuit 500.

The common electrode driving circuits 800A and 800B generate the common voltage Vcom to be applied on the common electrode. In the present embodiment, in order to reduce the amplitude of the voltage applied on the source line SL, the potential of the common electrode is also changed in accordance with AC-driving. The common electrode driving circuits 800A and 800B may be provided in the display control circuit 500 or in the gate drivers 700A and 700B.

As described above, source signals are applied on the source lines SL(1)-SL(M) and gate signals are applied on the gate lines GL(1)-GL(N), so that light transmittance of the liquid crystal layer is controlled and images are displayed by the liquid crystal panels 200A and 200B.

<Configuration of Liquid Crystal Display Device>

The following explains configurations of the liquid crystal display devices 100A and 100B.

Also in the following explanation, configurations of the liquid crystal display devices 100A and 100B are explained using the liquid crystal display device 100A as an example.

(*a*) of FIG. 1 is a plan view schematically showing a configuration of a main part of the liquid crystal display device 100A in accordance with the present embodiment. (*b*) of FIG. 1 is a cross sectional view of the liquid crystal display device 100A taken along a line A-A of (*a*) of FIG. 1.

The liquid crystal display device 100A is a direct-view type display device, and includes the liquid crystal panel 200A and the light guide element 300A laminated on the liquid crystal panel 200A as shown in (*b*) of FIG. 1.

The liquid crystal display device 100A is a transmissive liquid crystal display device, and includes the backlight 400A at the back side of the liquid crystal display device 100A. The liquid crystal display device 100A displays an image by causing the liquid crystal panel 200A to modulate light from the backlight 400A.

<Configuration of Liquid Crystal Panel>

Initially, an explanation is made as to a configuration of the liquid crystal panel 200A.

The liquid crystal panel 200A may be a publicly known liquid crystal panel. An example of the liquid crystal panel 200A is a VA mode TFT liquid crystal panel. However, the present invention is not limited to this.

As shown in (*b*) of FIG. 1, the liquid crystal panel 200A is configured such that the liquid crystal layer 230 is provided as an electric optical element (display medium) between an array substrate 210 (first substrate) and a counter substrate 220 (counter substrate).

The array substrate 210 is configured such that switching elements such as TFTs (thin film transistors) and pixel electrodes 212 etc. are formed on an insulating substrate 211 made of glass etc.

The counter substrate 220 is configured such that color filter layers 222 each having color filters and black matrices between the color filters and a counter electrode 223 (common electrode) are laminated in this order for example on an insulating substrate 221 made of glass etc. Alternatively, the counter substrate 220 may be configured such that the color filter layers 222 are positioned on the counter electrode 223 to be closer to the liquid crystal layer 230.

The array substrate 210 and the counter substrate 220 have orientation films (not shown), if necessary, at their surfaces facing the liquid crystal layer 230.

The array substrate 210 and the counter substrate 220 have, if necessary, at their surfaces opposite to the liquid crystal layer 230, optical film sections 240 and 250, respectively, which include a polarization plate and if necessary a wave plate.

As shown in (a) and (b) of FIG. 1, the liquid crystal panel 200A includes a display region 202 and a frame region 203 (non-display region) which is positioned outside the display region 202 and which corresponds to the periphery of the liquid crystal panel.

As shown in (a) and (b) of FIG. 1, the display region 202 of the liquid crystal panel 200A includes a plurality of pixels 201 aligned in a matrix manner, i.e. along an x-axis direction (first direction) and a y-axis direction (second direction) that are parallel to the display surface and are perpendicular to each other. The pixels 201 are aligned with the same pitch both in the x-axis and y-axis directions. In the present embodiment, a lateral direction of the display surface of the liquid crystal panel 200A is referred to as the x-axis direction and a longitudinal direction of the display surface of the liquid crystal panel 200A is referred to as the y-axis direction.

The color filter layers 222 are provided in such a manner as to correspond to individual pixels 201. In the present embodiment, an explanation is made as to a case where the color filter layers 222 of RGB (R: red, G: green, B: blue) are aligned along the y-axis direction of the liquid crystal panel 200A as shown in (a) of FIG. 1.

However, the present embodiment is not limited to this. The kinds of the color filter layer 222 are not limited to the three kinds of RGB, and may be any combination of RGBYCM (R: red, G: green, B: blue, Y: yellow, C: cyan, and M: magenta).

On the other hand, the frame region 203 includes a seal section 260 for sealing and retaining the liquid crystal layer 230, a driving circuit mounting section for driving the pixels 201 etc.

<Configuration of Light Guide Element>

Next, an explanation is made as to a configuration of the light guide element 300A.

The light guide element 300A includes, at a surface facing the liquid crystal panel 200A, incident surfaces 311 (light-incident surfaces) where light from the liquid crystal panel 200A is incident, and includes a plurality of light guide sections 310 that are defined by later-mentioned reflective sections (reflective layers). Each of the plurality of light guide sections 310 includes at least one transmissive layer as a transmissive section. Furthermore, between transmissive sections of adjacent light guide sections 310, there is provided a reflective layer as a reflective section.

Light incident to the incident surfaces 311 of the light guide sections 310, which constitute an incident surface 301 of the light guide element 300A, is transmitted in the transmissive sections of the light guide sections 310, and thereafter emitted from emission surfaces 312 (light-emission surfaces) of the light guide sections 310, which constitute an emission surface 302 of the light guide element 300A. At that time, the light incident to the transmissive sections is propagated in the transmissive sections while being reflected by the reflective section between the transmissive sections.

Accordingly, the transmissive layer (transmissive section) serves as a light guide path (light guide layer). It should be noted that the reflective sections of the light guide element 300A are not required to be provided on the whole interfaces of the transmissive sections, and may be provided in such a manner as to enable light incident to the transmissive sections to be propagated in the transmissive sections while being reflected by the reflective sections.

The light guide sections 310 each include the transmissive layer as described above, and are parallel to each other in their thickness direction. Accordingly, interfaces 303 (layer surfaces, contact surfaces) of the light guide sections 310 with other light guide sections 310 are parallel to each other. Furthermore, interfaces (layer surfaces, contact surfaces) of individual layers constituting each of the light guide sections 310 are parallel to each other.

The light guide element 300A is configured such that the interfaces 303 are inclined with respect to the incident surface 301 where light from the liquid crystal panel 200A is incident and with respect to the emission surface 302 from which the light is emitted.

In the light guide element 300A, the inclination angle of the interfaces 303, i.e. the inclination angle of the interfaces (layer planes) of individual layers constituting the light guide section 310 is set so that the incident surface 311 of at least a part of the light guide sections 310 overlaps a part of the display region 202 of the liquid crystal panel 200A, and the emission surface 312 of said at least a part of the light guide sections 310 overlaps at least a part of the frame region 203 of the liquid crystal panel 200A.

The light guide element 300A is laminated on the liquid crystal panel 200A in such a manner that the incident surface 301 of the light guide element 300A closely contacts the display surface of the liquid crystal panel 200A.

The light guide element 300A used in the present embodiment has a plate shape as shown in (b) of FIG. 1, and the incident surface 301 and the emission surface 302 of the light guide element 300A are parallel to the display surface of the liquid crystal panel 200A.

Accordingly, the light guide sections 310 of the light guide element 300A do not extend in a normal direction to the display surface of the liquid crystal panel 200A but extend obliquely from the normal direction.

Light incident to the light guide element 300A via one ends of the transmissive sections is reflected by the reflective sections and is propagated in the transmissive sections and is emitted from the other ends of the transmissive sections.

The light guide element 300A guides, toward above the frame region 203, a part of light from the display region 202 of the liquid crystal panel 200A via the light guide sections 310 provided obliquely with respect to the display surface of the liquid crystal panel 200A as described above. Consequently, when the liquid crystal display device 100A is seen from a position above the light guide element 300A, an image is displayed on a region above the display region 202 and the frame region 203 of the liquid crystal panel 200A.

The light guide element 300A may be a light guide element made of an optical fiber face plate described in Patent Literatures 1 and 2 for example. However, the light guide element 300A is preferably a light guide element including a sheet laminate 320 or 330 having a laminate structure shown in (a) or (b) of FIG. 5.

<Structure of Sheet Laminate>

Figure 5:
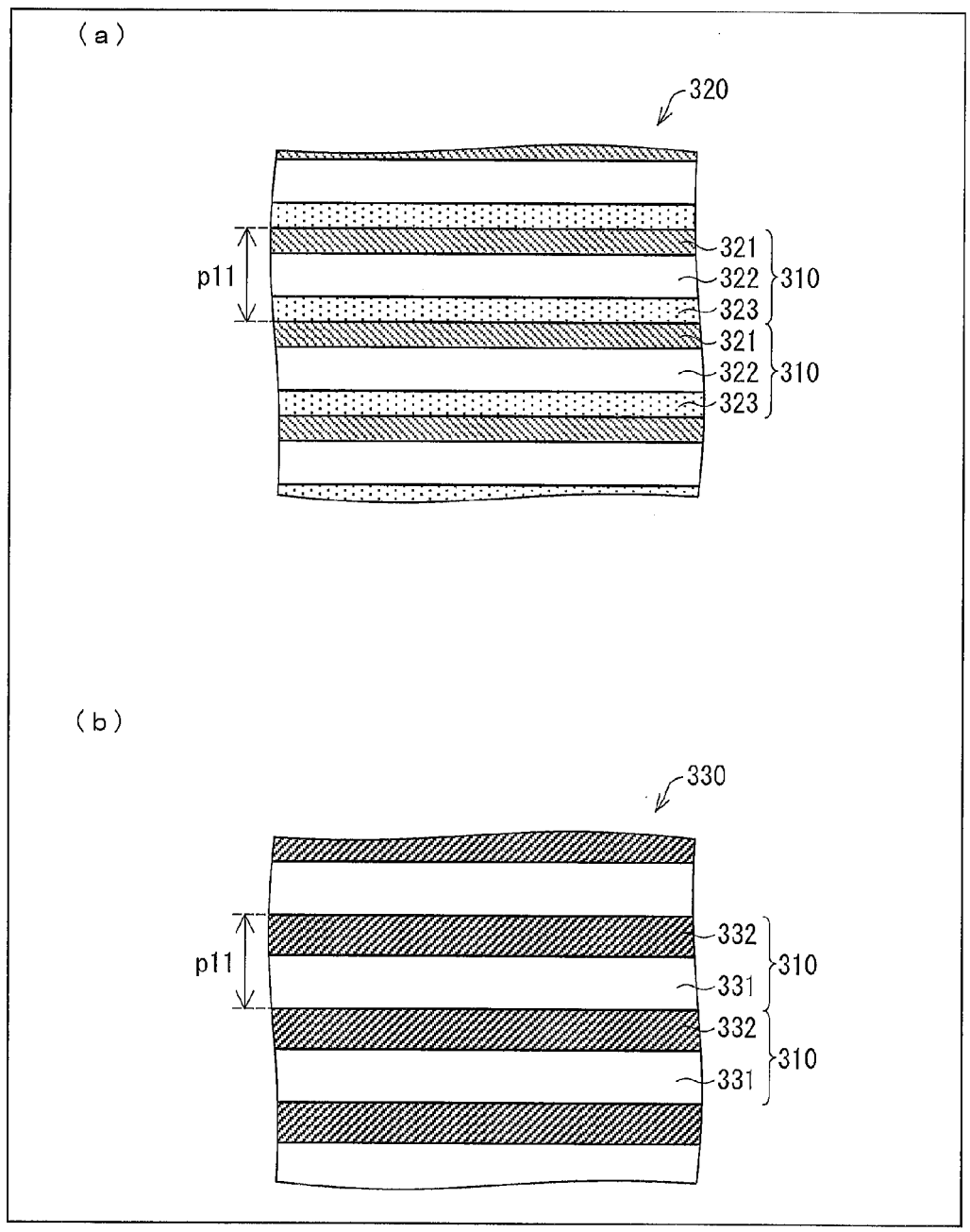
FIG. 5(a) and (b) of FIG. 5 are cross sectional views showing examples of the structure of a sheet laminate used in a light guide element in accordance with First Embodiment of the present invention.

(a) and (b) of FIG. 5 are cross sectional views showing examples of configurations of the sheet laminates 320 and 330, respectively, used in the light guide element 300A.

The sheet laminate 320 shown in (a) of FIG. 5 is a laminate in which metal layers 321 (reflective layers) and transmissive layers 322 (light guide layers) are laminated in parallel to each other. The sheet laminate 320 shown in (a) of FIG. 5 includes a plurality of metal layers 321, a plurality of transmissive layers 322, and a plurality of adhesive layers 323.

In a case where the light guide element 300A is made of the sheet laminate 320, each of the light guide sections 310 of the light guide element 300A consists of the metal layer 321, the transmissive layer 322, and the adhesive layer 323 as shown in (a) of FIG. 5.

The sheet laminate 320 is configured such that the metal layers 321, the transmissive layers 322, and the adhesive layers 323 are repeatedly laminated in this order to be parallel to each other in their thickness directions (i.e. direction perpendicular to a propagation direction of light) in order that a pitch p11 of each light guide section 310 (thickness in a lamination direction) is desired one.

In the case where the light guide element 300A is made of the sheet laminate 320, light incident to the light guide element 300A via the incident surface 301 is propagated in the transmissive layer 322 and is emitted via the emission surface 302 toward a viewer. At that time, the light incident to the transmissive layer 322 is propagated therein while being reflected by the metal layers 321 adjacent to that transmissive layer 322. That is, in the sheet laminate 320, the transmissive layer 322 serves as a light guide path (transmissive section), and the interfaces (layer surfaces) of the metal layers 321 adjacent to that transmissive layer 322 serve as reflective surfaces (reflective sections). Light is incident to the incident surface 311 from various directions. The sheet laminate 320 can guide all light regardless of its incident direction, because the sheet laminate 320 utilizes metal reflection by the metal layers 321.

On the other hand, the sheet laminate 330 shown in (b) of FIG. 5 is a laminate in which at least two kinds of transmissive layers with different refractive indices are laminated in parallel to each other. In the present embodiment, an explanation is made using, as an example, the sheet laminate 330 in which two kinds of transmissive layers with different refractive indices are laminated. Needless to say, three kinds of transmissive layers with different refractive indices may be laminated.

The sheet laminate 330 shown in (b) of FIG. 5 includes a plurality of transmissive layers 331 and a plurality of transmissive layers 332 with a lower refractive index than that of the transmissive layers 331.

In a case where the light guide element 300A is made of the sheet laminate 330, each of the light guide sections 310 of the light guide element 300A consists of the transmissive layer 331 and the transmissive layer 332 as shown in (b) of FIG. 5.

The sheet laminate 330 is configured such that the transmissive layers 331 and the transmissive layers 332 are repeatedly laminated in this order to be parallel to each other in their thickness directions (i.e. direction perpendicular to a propagation direction of light) in order that a pitch p11 of each light guide section 310 (distance between interfaces 303 of adjacent light guide sections 310 in a direction perpendicular to a propagation direction of light) is desired one.

In the case where the light guide element 300A is made of the sheet laminate 330 as described above, light incident to the light guide element 300A via the incident surface 301 is propagated in the transmissive layer 331 and is emitted via the emission surface 302 toward a viewer. Since the refractive index of the transmissive layer 331 is higher than that of the transmissive layer 332, light incident to the transmissive layer 331 is totally reflected by interfaces between the transmissive layer 331 and the transmissive layers 332 and is propagated in the transmissive layer 331.

Total reflection is a phenomenon that light incident to a medium with a smaller refractive index from a medium with a larger refractive index does not pass through the interface between the two mediums and is totally reflected. Total reflection occurs when the incident angle is a certain angle or more. This certain angle is referred to as a critical angle. The critical angle depends on a ratio of the refractive index of the transmissive layer 331 to the refractive index of the transmissive layer 332. Of all the light incident to the transmissive layer 331, only light with an incident angle larger than the critical angle can be propagated in the transmissive layer 331. 100% of light with an incident angle larger than the critical angle is reflected, whereas light with an incident angle equal to or less than the critical angle is not reflected but refracted and is emitted from the transmissive layer 331. At that time, the light with an incident angle equal to or smaller than the critical angle passes through the transmissive layer 332 and is incident to the adjacent transmissive layer 331 to be stray light or, if an absorption layer is provided in the transmissive layer 332, the light is absorbed by the absorption layer.

As described above, in the case where the light guide element 300A is made of the sheet laminate 330, light incident to the light guide element 300A is guided by using total reflection at the interface between a transmissive layer and another transmissive layer with a refractive index smaller than that of the transmissive layer as in the case of optical fibers. That is, the transmissive layer 331 corresponds to a core portion called a core, and the transmissive layer 332 with a refractive index smaller than that of the transmissive layer 331 corresponds to a portion outside the core, called a clad.

In contrast thereto, the light guide element 300A made of the sheet laminate 320 utilizes reflection (metal reflection) at the surface of the metal layer 321 (at the interface with the transmissive layer 322). As described above, total reflection occurs only when light is incident to a clad from a core with an angle larger than a critical angle, whereas metal reflection occurs regardless of an incident angle. Accordingly, the light guide element 300A made of the sheet laminate 320 is advantageous in that the light guide element 300A made of the sheet laminate 320 has higher utilization efficiency of light than the light guide element 300A made of the sheet laminate 330 (however, there is a case where the utilization efficiency of light drops when a light reflectance of the metal layer is low).

Furthermore, a material that increases a ratio in refractive index of one transmissive layer to another is limited, whereas the transmissive layer 322 in the sheet laminate 320 is only required to be transparent, and may have any refractive index, so that the sheet laminate 320 is advantageous in that it provides a wider selection of a material for the transmissive layer 322.

However, it should be noted that in the case of metal reflection as above, there is slight absorption of light by the metal layer. Accordingly, depending on the length of a light guide path and the type of metals, there is a case where total reflection exhibits higher utilization efficiency of light than metal reflection.

Therefore, which of the sheet laminate 320 and the sheet laminate 330 is to be used may be selected appropriately in accordance with the length of the light guide path etc.

<Method for Manufacturing Light Guide Element 300A Made of Sheet Laminate>

Figure 6:
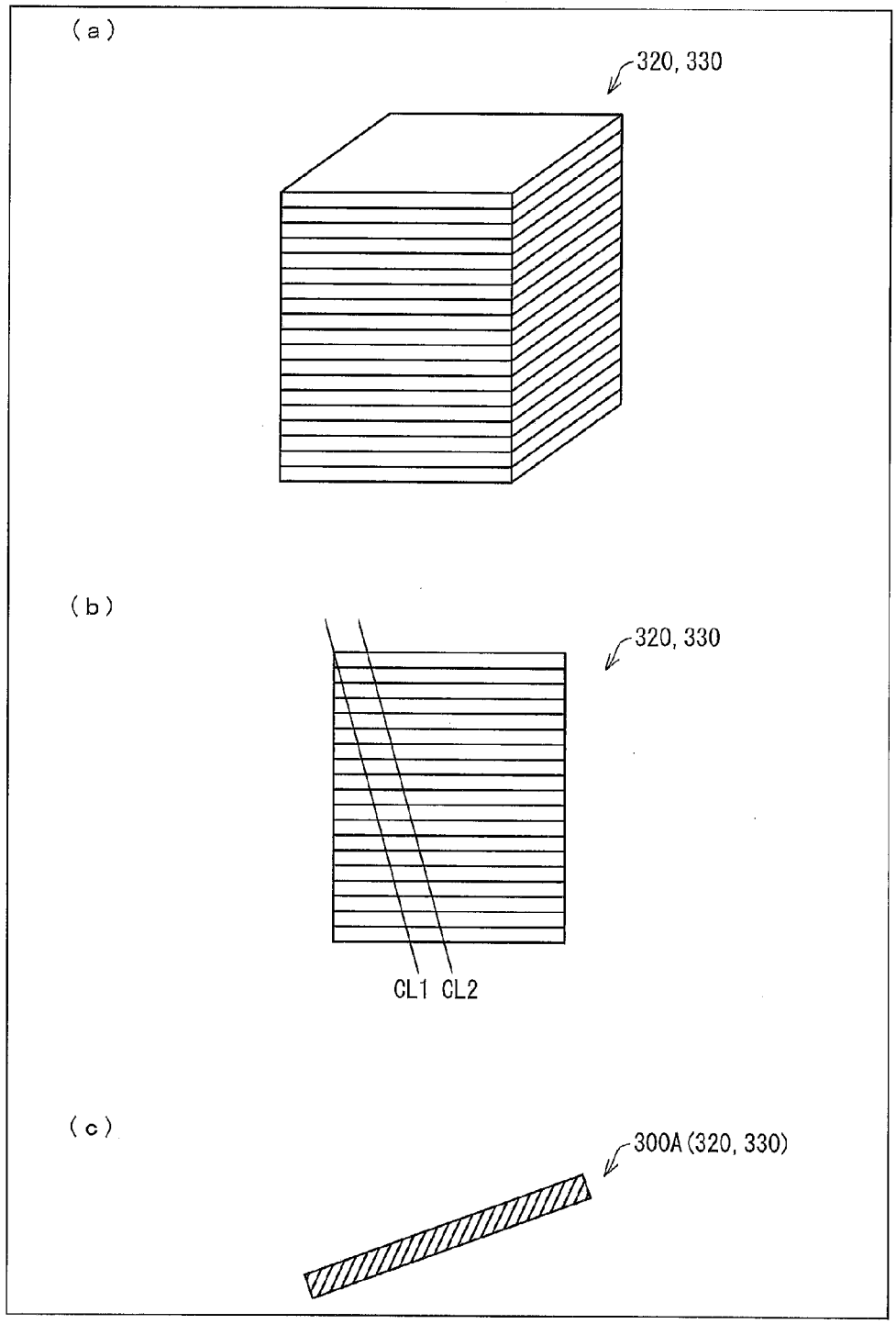
FIG. 6(a)-(c) of FIG. 6 are views showing, in the order of process, a method for manufacturing a light guide element made of the sheet laminate shown in (a) or (b) of FIG. 5.

With reference to (a)-(c) of FIG. 6, the following explains a method for manufacturing the light guide element 300A made of the sheet laminate 320 or the sheet laminate 330.

(a)-(c) of FIG. 6 are views showing, in the order of process, a method for manufacturing the light guide element 300 made of the sheet laminate.

The processes shown in (b) and (c) of FIG. 6 are common between both cases where the sheet laminate 320 is used and where the sheet laminate 330 is used. Therefore, herein, the method for manufacturing the light guide element 300A made of the sheet laminate 320 or the sheet laminate 330 is collectively explained.

In the following, the method for manufacturing the light guide element 300A is explained using specific numerals and materials. These numerals and materials are merely examples and the present invention is not limited to these specific examples.

Initially, as shown in (*a*) of FIG. 6, there is prepared the sheet laminate 320 or the sheet laminate 330 in which a plurality of sheets are laminated.

In the case where the light guide element 300A is made of the sheet laminate 320, initially, there is prepared, as a transparent macromolecule film (transparent film) which is to be the transmissive layer 322, a PET (polyethylene terephthalate) film, an acrylic film, a COP (cycloolefin polymer, cycloolefin resin) film etc. with a thickness of 75 μm. Subsequently, on the macromolecule film, there is formed by vacuum deposition, as the metal layer 321, a silver layer, an aluminum layer or etc. with a thickness of 100 nm for example. On the metal layer 321, there is formed the adhesive layer 323 with a thickness of 3 μm for example by a hot melt adhesive (thermoplastic resin) for example. A plurality of sheets thus obtained (macromolecule film/metal layer/hot melt adhesive) are laminated and pressed. Thereafter, the resulting laminate is put in an oven at 140° C. for example so that the hot melt adhesive is fused, thereby adhering sheets to each other.

On the other hand, in the case where the light guide element 300A is made of the sheet laminate 330, initially, there is prepared, as a transparent macromolecule film (transparent film) which is to be the transmissive layer 331, an acrylic resin film with a thickness of 75 μm for example. On one surface of the macromolecule film, resin whose refractive index is smaller than that of the macromolecule film (e.g. resin containing fluoride compound such as OPSTAR (product name) manufactured by JSR Corporation) is applied, and dried and hardened to form the transmissive layer 332. Herein, in a case where the material for the transmissive layer 332 has adhesiveness (including viscosity), the material may be hardened while being laminated on other transmissive layer 331. In a case where the material for the transmissive layer 331 does not have adhesiveness (including viscosity), an adhesive layer may be provided between the transmissive layer 331 and the transmissive layer 332 as in the case of the sheet laminate 320. The sheet laminate 320 can be formed by a roll-to-roll method for example.

Subsequently, as shown in (*b*) of FIG. 6, the sheet laminate 320 or the sheet laminate 330 that was prepared in (*a*) of FIG. 6 is cut along cutting lines (cutting planes) CL1 and CL2 that form a predetermined angle with respect to interfaces of the sheet laminate 320 or the sheet laminate 330, so that a plate-shaped sheet laminate 320 or 330 with a predetermined thickness is cut from the sheet laminate 320 or 330.

Cutting of the sheet laminate 320 or 330 may be made by publicly known cutting methods. For example, laser cutting may be employed. However, a multi-wire saw is preferable. Since a multi-wire saw cuts an object by a plurality of wires that are positioned to be parallel to each other, the multi-wire saw can cut out a plurality of plate-shaped sheet laminate 320 or 330 at once. Furthermore, the multi-wire saw is advantageous in that the multi-wire saw yields a smaller kerf loss than a rotary blade or a belt blade. The multi-wire saw may be a loose abrasive type or a fixed abrasive type.

Subsequently, the cutting planes of the sheet laminate 320 or 330 are subjected to a treatment such as polishing if necessary, and surfaces of the cut-out sheet laminate 320 or 330 are rinsed and dried. Thus, the light guide element 300A made of the sheet laminate 320 or 330 is obtained as shown in (*c*) of FIG. 6. A plane to be subjected to treatment such as polishing is suitably selected according to necessity.

<Advantages of Light Guide Element Made of Sheet Laminate>

Here, advantages of the light guide element 300A made of the sheet laminate 320 or 330 are explained below by being compared with light guide elements described in Patent Literatures 1-3. The problem which the light guide element described in Patent Literature 4 suffers has been already explained above.

<Optical Fiber Face Plate>

An optical fiber face plate is one obtained by bundling optical fibers in a block. Each of the optical fibers is obtained by coating a core having a high refractive index with a clad having a low refractive index. As the difference in refractive index between the core and the clad is larger, the numerical aperture (NA) in the optical fibers is larger, so that light transmittance is increased. Light incident to the optical fiber face plate is propagated in the core and is emitted via an emission surface toward a viewer.

As described above, the optical fiber face plate uses total reflection caused by setting the refractive index of the core to be higher than that of the clad. Accordingly, a range of an incident angle of light that can be propagated in the optical fiber face plate varies depending on a critical angle. This limits the materials for the core and the clad.

The materials for the optical fiber may be the same as the materials for the sheet laminate 330. In a case where the optical fiber face plate is designed to include an optical absorber that prevents light leaking from a core from entering an adjacent core, so that blurring of a displayed image can be prevented. Such an optical fiber face plate is preferable in this regard.

However, since the optical fiber face plate is an aggregation of optical fibers, the optical fiber face plate with a larger area is more difficult to manufacture and requires a larger cost, unlike the light guide element 300A made of the sheet laminate 320 or 330.

Therefore, in a case where the light guide element 300A is provided on the whole of the display surface of the liquid crystal panel 200A as in the present embodiment and not on a part of the display surface of the liquid crystal panel 200A as in a later-mentioned embodiment, use of the optical fiber face plate as the light guide element 300A is not realistic as the liquid crystal panel 200A is larger in terms of manufacturing method and cost.

The techniques described in Patent Literatures 1 and 2 require optical fiber face plates that cover substantially whole surfaces of display panels. Accordingly, the techniques described in Patent Literatures 1 and 2 are not realistic in terms of manufacturing method and cost.

Patent Literature 2 describes that a parallel plate (fiber face plate whose light receiving surface and emission surface are parallel to each other) at a display region may be omitted. However, if the parallel plate is omitted, an edge portion of an optical fiber face plate in a block shape (cross section is rectangular) at the periphery of the display region forms a step in the display region, making images discontinuous and damaging display quality.

<Optical Compensation Means Described in Patent Literature 3>

The technique described in Patent Literature 3 is different from the techniques described in Patent Literatures 1 and 2 in that the technique described in Patent Literature utilizes optical compensation means made of a large number of inclined thin films and a transparent medium filling the inclined thin films, instead of the optical fiber face plate. However, the technique described in Patent Literature 3 requires optical compensation means that cover substantially the whole surface of the display panel, and suffers the same problem as in the case of the techniques described in Patent Literatures 1 and 2.

Patent Literature 3 describes that the optical compensation means is manufactured in such a manner that inclined thin films are fixed to an outer frame while inclined with a predetermined angle, a liquid transparent medium is poured into spaces between the outer frame and the inclined thin films so that the transparent medium fills the spaces, and then the transparent medium is hardened.

In order to prevent blurring of an image displayed by a display device, it is necessary to form inclined thin films with a pitch equal to or less than a pitch of pixels. Furthermore, in order to form inclined thin films with spaces to be filled with a liquid transparent medium, one possible solution is to form libs with a super high aspect ratio by photolithography. However, this is very difficult.

Furthermore, it is difficult to form inclined thin films with a large inclination angle (e.g. 30 degrees or more with respect to a normal direction to a display surface). Besides, it is difficult to fill a space between the inclined thin films with a large inclination angle with a liquid transparent medium without bubbles.

The above difficulties increase as the screen size of a display device increases. Formation of such optical compensation means suffers low productivity and high cost.

Furthermore, it is necessary for the inclined thin films to have a thickness above a certain level in order that the inclined thin films can support themselves. On the other hand, unless the thickness is sufficiently small with respect to the pitch of the inclined thin films, transmittance of a light guide element drops, which results in drop of luminance of the display device. For example, when the thickness is 0.5 mm and the pitch for the inclined thin films is 1 mm, transmittance is 50% (in reality, due to absorption by the transparent medium filling the space between the inclined thin films, the transmittance would be smaller). Besides, an actual display device has a smaller pitch for pixels, which requires a smaller pitch for the inclined thin films, resulting in further smaller transmittance.

<Cause for Generation of Moiré>

Next, an explanation is made as to a cause for generation of moiré.

As described above, the inventors of the present invention have found that actually driving a display device while an incident surface of a light guide element such as an optical fiber face plate closely contacts a display panel in order to display an image above a frame region causes moiré (interference pattern) and drops display quality.

Figure 7:
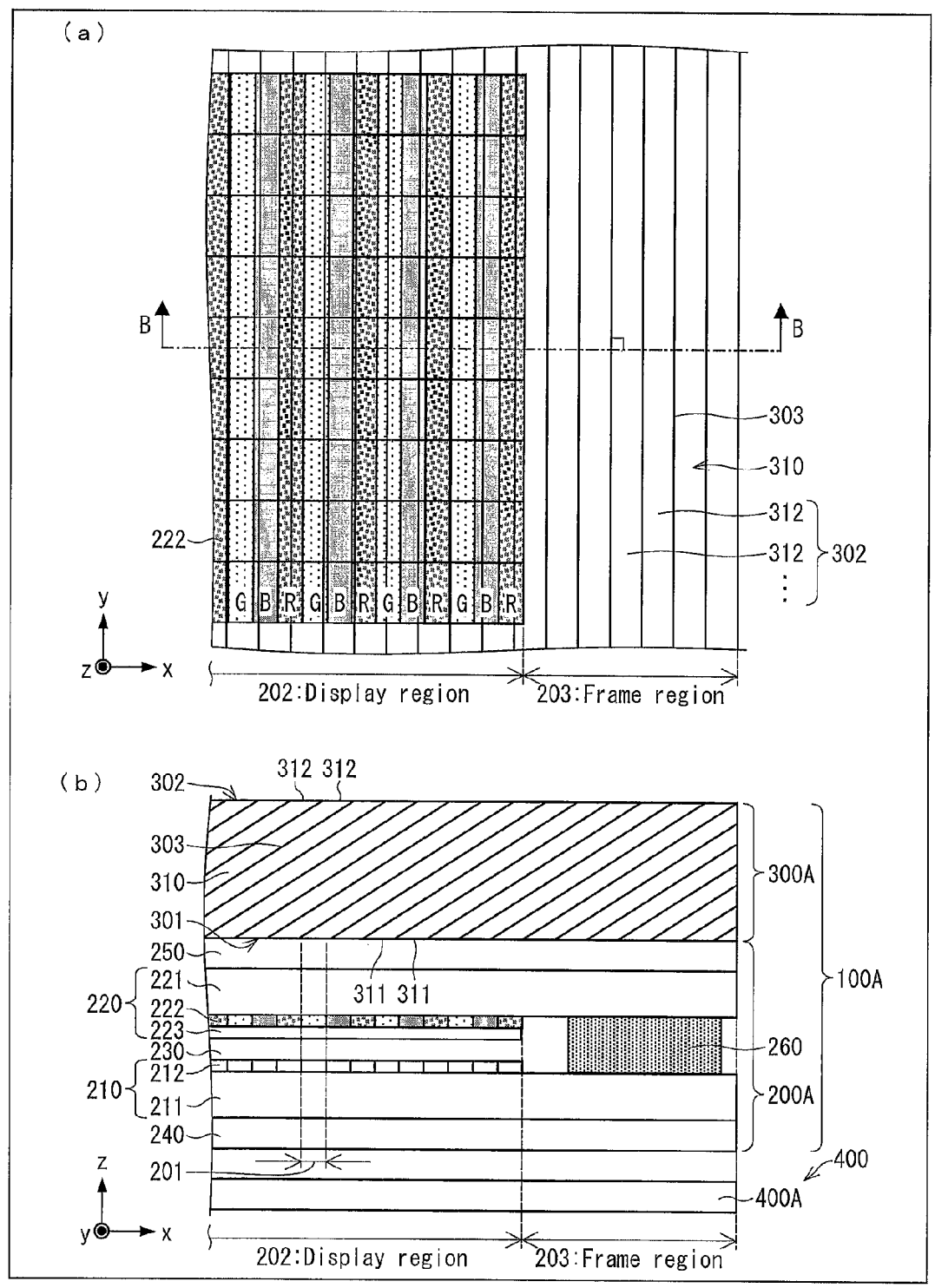
FIG. 7(a) of FIG. 7 is a plan view schematically showing a configuration of a main part of a liquid crystal display device in a case where a light guide element is designed such that a borderline between light guide sections of the light guide element on a plan view is parallel to an outer edge of the light guide element. (b) of FIG. 7 is a cross sectional view of the liquid crystal display device taken along a line B-B of (a) of FIG. 7.

(a) of FIG. 7 is a plan view schematically showing, for comparison, a configuration of a main part of the liquid crystal display device 100A in a case where the light guide element 300A is designed such that a borderline between the light guide sections 310 of the light guide element 300A on a plan view is parallel to an outer edge of the light guide element 300A. (b) of FIG. 7 is a cross sectional view of the liquid crystal display device 100A taken along a line B-B of (a) of FIG. 7. The plan view here indicates a view seen from a direction normal to the display surface of the liquid crystal display device 100A.

It has been conventionally known that overlapping a plurality of regularly repeated patterns causes moiré due to a difference in cycle between the patterns.

In the present embodiment, the light guide sections 310 of the light guide element 300A are laminated in an oblique direction as described above with the pitch p11 for example, and the light guide sections 310 and individual layers constituting each of the light guide sections 310 are parallel to a direction in which the light guide sections 310 are laminated.

Here, in a case where pattern sequences of the color filter layers 222 of individual colors are parallel to pattern sequences of the light guide sections 310 of the light guide element 300A as shown in (a) of FIG. 7, rainbow moiré appears. In a case where pattern sequences of the color filter layers 222 of individual colors are perpendicular to pattern sequences of the light guide sections 310 of the light guide element 300A or the color filter layers 222 are not provided, monochrome moiré appears.

Between adjacent pixels 201 of the liquid crystal panel 200A, there is a convexity and a concavity derived from the pixel electrode 212 as shown in (b) of FIG. 7.

Furthermore, as described above, there is provided a reflective section between transmissive layers that serve as light guide paths of adjacent light guide sections 310. Consequently, the emission surface 302 of the light guide element 300A has bright portions and dark portions corresponding to the transmissive layers serving as the light guide paths and the reflective sections between the transmissive layers, respectively.

In view of the above, it is deemed that the cause for generation of moiré in the liquid crystal display device 100A is interference between the periodic structure of the pixels 201 of the liquid crystal panel 200A and the periodic structure of the light guide sections 310 of the light guide element 300A. Here, it is deemed that the color of moiré differs depending on whether there exists interference of the color filter layers 222 provided to correspond to the pixels 201, and the cause for generation of moiré is the same regardless of the color of moiré.

The same can be applied to cases of using the light guide elements such as optical fiber face plates etc. used in Patent Literatures 1-4. Therefore, it is deemed that the causes for generation of moiré appearing in the conventional techniques in Patent Literatures 1-4 are the same as the cause mentioned above.

However, Patent Literatures 1-4 do not mention moiré at all.

<Method for Cancelling Moiré>

There are the following three conventional methods to cancel moiré.

(I) In a case where there are two kinds of patterns with regular intervals and the patterns overlap each other with an angle θ formed between them, the angle θ is increased.

(II) In a case where there are two kinds of patterns with regular intervals and the pitches for the patterns are P1 and P2 respectively, one of P1 and P2 is set to be approximately a half-integer multiple of the other.

(III) Light is diffused to blur bright and dark patterns.

However, the method (III) is not preferable because it drops display quality.

The method (I) is disclosed in Patent Literature 5 for example, and the method (II) is disclosed in Patent Literatures 6 and 7 for example.

However, Patent Literatures 5-7 are intended to cancel moiré that appears when a liquid crystal panel overlaps a backlight device. Moiré appears due to prisms of a light guide plate of a backlight device and to ridges and concavities and convexities of a prism sheet between a liquid crystal panel and a backlight device.

On the other hand, in the case of the liquid crystal display device 100A shown in (a) of FIG. 7, it is deemed that the cause for generation of moiré is interference between the periodic structure of the pixels 201 of the liquid crystal panel 200A and the periodic structure of the light guide sections 310 of the light guide element 300A on the display surface of the liquid crystal panel 200A. In the present embodiment, in order to create display also above the frame region 203, it is necessary to guide a part of light from the display region 202 toward above the frame region 203 and cancel moiré.

For this reason, in the present embodiment, as shown in (a) and (b) of FIG. 1, the light guide element 300A is designed such that the light guide sections 310 include transmissive layers which are inclined in such a manner that the incident surfaces 311 overlap a part of the display region 202 and the emission surfaces 312 overlap at least a part of the frame region 203, and the inclination angle θ of each of the light guide sections 310 on a plan view is in a range of 5 degrees<θ<85 degrees.

The inclination angle θ of each of the light guide sections 310 on a plan view is an angle formed by a direction in which a borderline between the adjacent light guide sections 310 on a plan view extends and a direction in which the pixels 201 adjacent to the frame region 203 where an image is to be displayed are aligned (i.e. pixel columns parallel to a long side direction of the frame region 203 where an image is to be displayed).

The direction in which a borderline between the adjacent light guide sections 310 on a plan view extends is a direction in which a line drawn by the interface between the light guide sections 310 on the incident surface 301 and the emission surface 302 of the light guide element 300A (i.e. a line which the interface 303 draws on the incident surface 301 and the emission surface 302 of the light guide element 300A) extends. Accordingly, the line the interface 303 draws in (a) of FIG. 1 corresponds to the borderline between the adjacent light guide sections 310 on the plan view.

The line A-A shown in (a) of FIG. 1 and the line B-B shown in (a) of FIG. 7 are lines perpendicular to the direction in which the borderline between the adjacent light guide sections 310 of the light guide element 300A on a plan view extends.

The cross section of the light guide element 300A when the liquid crystal display device 100A is cut along a line perpendicular to a direction in which the borderline between the adjacent light guide sections 310 of the light guide element 300A on a plan view extends is identical between (b) of FIG. 1 and (b) of FIG. 7. However, in the present embodiment, as shown in (a) of FIG. 1, the direction in which the borderline between the light guide sections 310 on the emission surface 302 of the light guide element 300A is different from that shown in (a) of FIG. 7.

Figure 8:
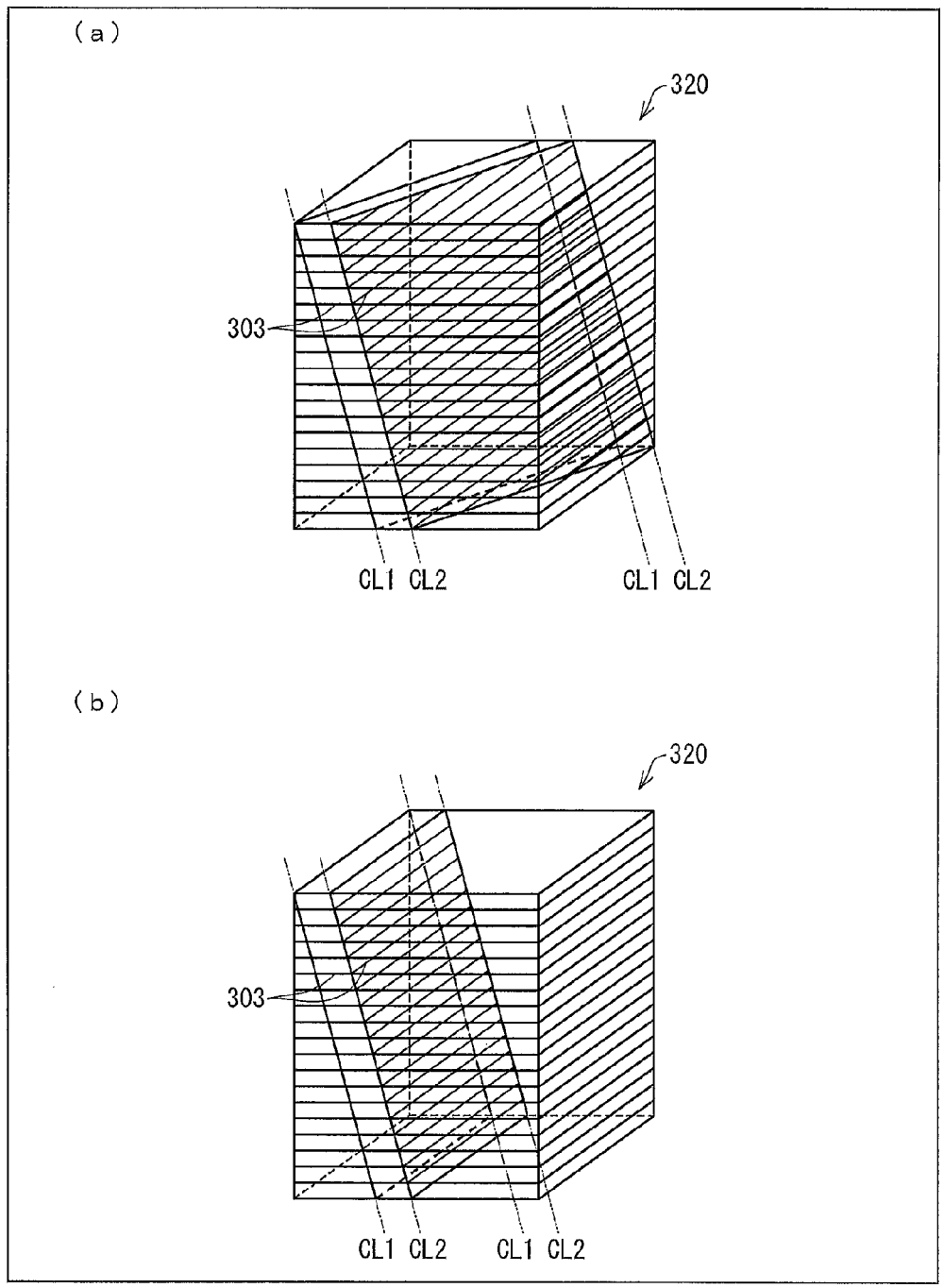
FIG. 8(a) and (b) of FIG. 8 are perspective views showing, in a case where a light guide element is made of a sheet laminate, relationships between cross sections of seat laminates and the interfaces of light guide sections when plate-shaped sheet laminates are cut from block-shaped sheet laminates by the process shown in (b) of FIG. 6 to be used as the light guide element shown in (a) and (b) of FIG. 1 and the light guide element shown in (a) and (b) of FIG. 7, respectively.

(a) and (b) of FIG. 8 are perspective views showing, in a case where the light guide element 300A is made of the sheet laminate 320 for example, relationships between cross sections of the seat laminates 320 and the interfaces 303 when plate-shaped sheet laminates 320 are cut from block-shaped sheet laminates 320 by the process shown in (b) of FIG. 6 to be used as the light guide element 300A shown in (a) and (b) of FIG. 1 and the light guide element 300A shown in (a) and (b) of FIG. 7, respectively.

The plate-shaped sheet laminate 320 cut from the block-shaped sheet laminate 320 in the manner shown in (b) of FIG. 8 becomes the light guide element 300A shown in (a) and (b) of FIG. 7. The plate-shaped sheet laminate 320 cut from the block-shaped sheet laminate 320 in the manner shown in (a) of FIG. 8 becomes the light guide element 300A shown in (a) and (b) of FIG. 1.

<Shift of Displayed Image>

In the present embodiment, by using the light guide element 300A having the interface 303 shown in (a) and (b) of FIG. 1 in such a manner that the direction in which the borderline between the adjacent light guide sections 310 on a plan view extends (i.e. when the liquid crystal display device 100A is seen from the above) forms the angle θ of more than 5 degrees and less than 85 degrees with the pixel columns parallel to the long side direction of the frame region 203 where an image is to be displayed, it is possible to create display above the frame region 203 and to prevent generation of moiré.

Figure 9:
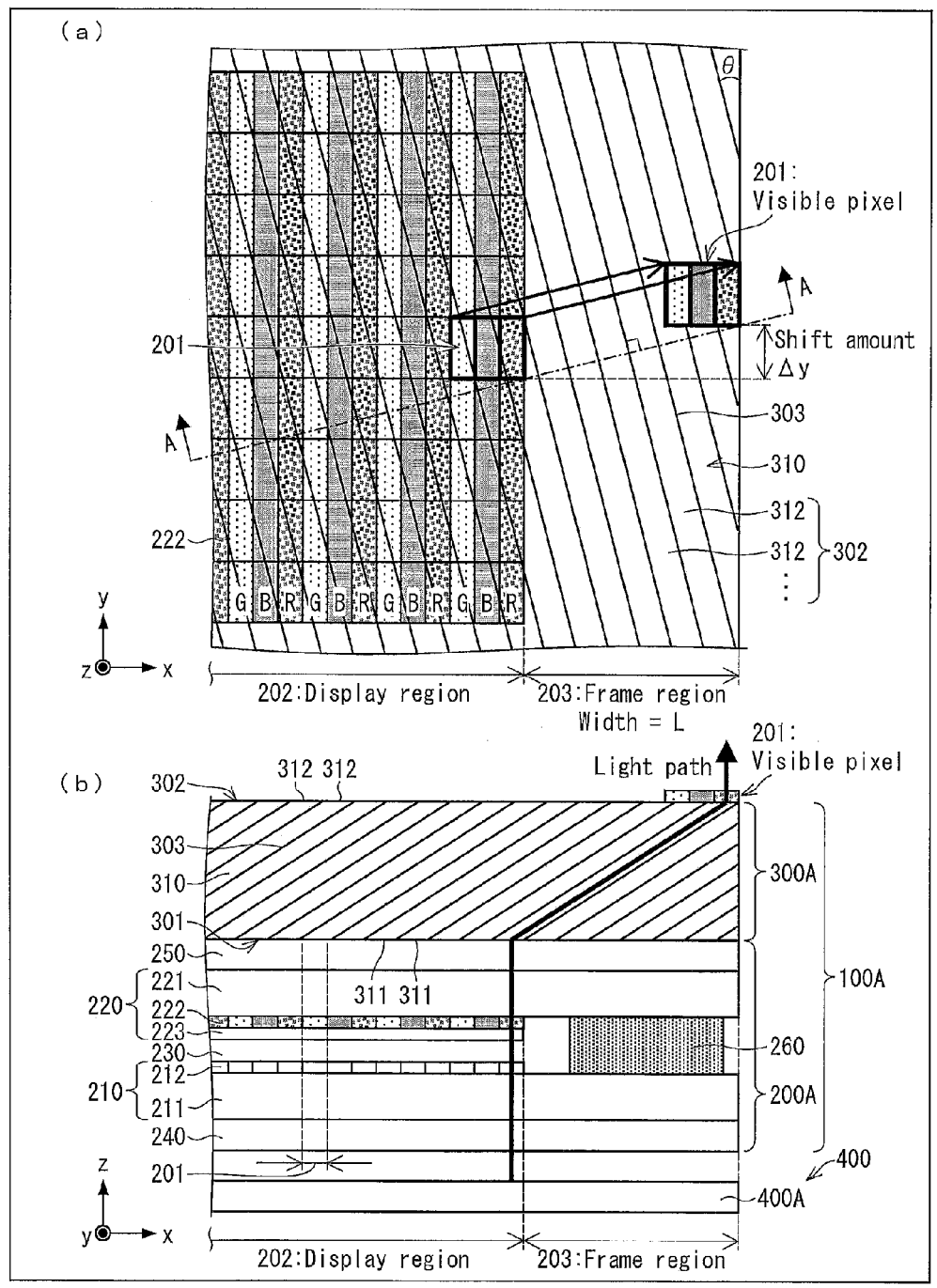
FIG. 9(a) of FIG. 9 is a plan view schematically showing a configuration of a main part of a liquid crystal display device, explaining the principle of shift of a displayed image. (b) of FIG. 9 is a cross sectional view showing the liquid crystal display device taken along a line A-A shown in (a) of FIG. 9.

However, when the light guide sections 310 are overlapped on the pixel columns while the light guide sections 310 are inclined by the angle θ with respect to the pixel columns on a plan view as shown in (a) of FIG. 1, a displayed image is shifted by the light guide sections 310 not only in a direction that hides the frame region 203 as shown in (a) and (b) of FIG. 9, i.e. a direction perpendicular to a long side direction of the frame region 203 (short side direction), but also in a direction parallel to the long side direction of the frame region 203 as shown in (a) of FIG. 9 (i.e. direction in which the pixels 201 adjacent to the frame region 203 are aligned).

In the present embodiment, the direction perpendicular to the long side direction of the frame region 203 where an image is to be displayed indicates a lateral direction of a display surface (x-axis direction. This direction may be hereinafter merely referred to as "lateral direction"), and the direction parallel to the long side direction of the frame region 203 indicates a longitudinal direction of the display surface (y-axis direction. This direction may be hereinafter merely referred to as "longitudinal direction").

(a) of FIG. 9 is a plan view schematically showing a configuration of a main part of the liquid crystal display device 100A, explaining the principle of shift of a displayed image. (b) of FIG. 9 is a cross sectional view showing the liquid crystal display device 100A taken along a line A-A shown in (a) of FIG. 9. The line A-A shown in (a) of FIG. 9 is the same as the line A-A shown in (a) of FIG. 1.

Assume that the amount of shift in a longitudinal direction (y-axis direction) between the original pixel 201 (i.e. actual pixel 201 on the liquid crystal panel 200A) and the apparent pixel 201 displayed above the frame region 203 to which the original pixel 201 is shifted by the light guide sections 310 in the longitudinal direction as shown in (a) of FIG. 9 is Δy, and the width of the frame region 203 (length in the lateral direction) is L. The amount of shift Δy in the longitudinal direction is expressed by an equation below based on the trigonometric ratio of the trigonometric function.

$$\Delta y = L \times \tan \theta$$

FIG. 10 shows a relation among the angle θ, the width L of the frame region 203, and the amount of shift Δy in a longitudinal direction.

It is found from FIG. 10 that as the angle θ and the width L of the frame region 203 are lager, the amount of shift Δy is larger.

(a) of FIG. 11 is a plan view showing a relation among an image displayed on the liquid crystal panel 200A, an image actually visible through the light guide element 300A, and the interface 303 between the light guide sections 310 of the light guide elements 300A and 300B in a case where the liquid crystal display device 100A displays a text of "ABC". (b) of FIG. 11 is a cross sectional view showing a direction in which the interface 303 between the light guide sections 310 is inclined in the liquid crystal display device 100A shown in (a) of FIG. 11.

When creating display above the frame region 203 while the interface 303 of the light guide element 300A is inclined as shown in (a) and (b) of FIG. 11, the frame is hardly visible as shown in (a) of FIG. 11. However, an actually visible image is shifted by Δy in the longitudinal direction from an image displayed on the liquid crystal panel 200A. When the interface 303 between the light guide sections 310 of the light guide element 300A is inclined as shown in (a) and (b) of FIG. 11, an actually visible image is shifted in an upper right direction from an image displayed on the liquid crystal panel 200A.

The number of the liquid crystal display device 100A may be one. In a case where the liquid crystal display system 1 includes only one liquid crystal display device 100A, that is, one screen is constituted by one liquid crystal display device 100A, shift of a displayed image in the longitudinal direction as shown in (a) of FIG. 11 does not disturb display.

Figure 12:
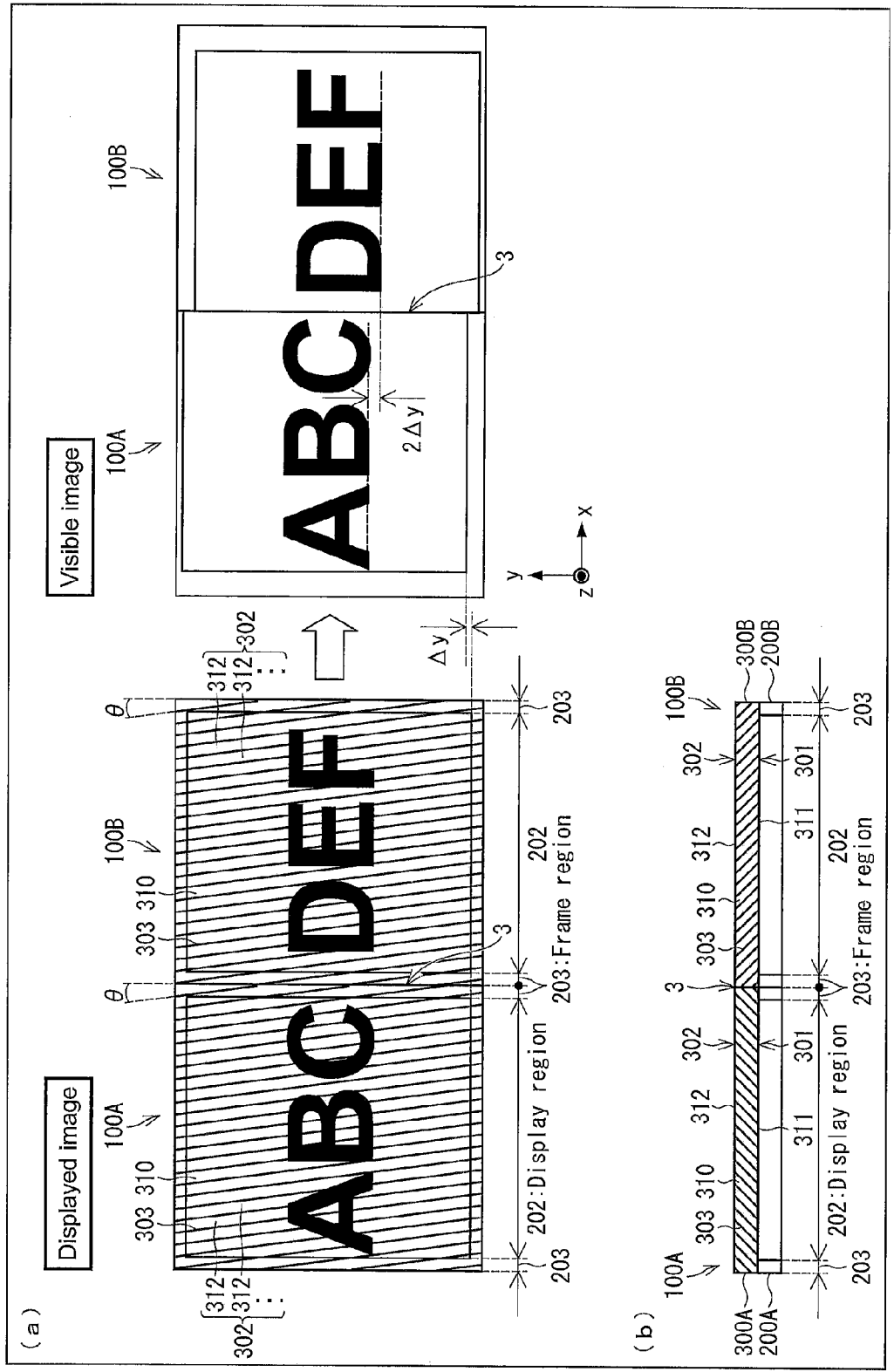
FIG. 12(a) of FIG. 12 is a plan view showing a relation among images displayed on liquid crystal panels, images actually visible through light guide elements, and interfaces between light guide sections in a case where a direction in which a borderline between adjacent light guide sections on an emission surface of one light guide element is inclined is equal to a direction in which a borderline between adjacent light guide sections on an emission surface of the other light guide element is inclined in an arrangement in which adjacent liquid crystal display devices are arranged in a horizontal direction. (b) of FIG. 12 is a cross sectional view showing an inclination direction of the interface between the light guide sections of the liquid crystal display device shown in (a) of FIG. 12.

(a) and (b) of FIG. 12 show an example in which an inclination direction of the borderline between adjacent light guide sections 310 on the emission surface 302 of the light guide element 300A is set to be equal to that of the light guide element 300B in a configuration of positioning the liquid crystal display devices 100A and 100B adjacently to each other in a horizontal direction.

(a) of FIG. 12 is a plan view showing a relation among images displayed on the liquid crystal panels 200A and 200B, images actually visible through the light guide elements 300A and 300B, and the interfaces 303 between the light guide sections 310 of the light guide elements 300A and 300B. (b) of FIG. 12 is a cross sectional view showing an inclination direction of the interface 303 between the light guide sections 310 of the liquid crystal display device 100A shown in (a) of FIG. 12.

In a case where the liquid crystal display system 1 is designed such that the liquid crystal display devices 100A and 100B are positioned adjacently to each other in a horizontal direction as shown in (a) and (b) of FIG. 12, the liquid crystal display system 1 displays an image also above the frame regions 203 positioned adjacently to each other via the border 3 between the liquid crystal display devices 100A and 100B, thereby creating seamless display.

Consequently, in the light guide elements 300A and 300B, the light guide sections 310 are aligned in parallel with each other while inclined in such a manner that the incident surface 311 of the light guide sections 310 in a part of the display region 202 which part is adjacent to the frame region 203 overlaps a part of the display region 202 and the emission surface 312 of those light guide sections 310 overlaps at least a part of the frame region 203.

Consequently, as shown in (b) of FIG. 12, the light guide sections 310 of the light guide elements 300A and 300B are inclined with respect to the boundary 3 in such a manner that the interfaces 303 in the cross section of the light guide element A are line-symmetrical at the boundary 303 with the interfaces 303 in the cross section of the light guide element B.

However, in that case, if the light guide elements 300A and 300B are positioned in such a manner that the interfaces 303 of the light guide element 300A are inclined in the same direction as the interfaces 303 of the light guide element 300B on a plan view as shown in (a) of FIG. 12, there occurs opposite shifts of images in a longitudinal direction. That is, in the liquid crystal display device 100A, an actually visible image is shifted uniformly by Δy in an upward direction from an image displayed on the liquid crystal panel 200A, and in the liquid crystal display device 100B, an actually visible image is shifted uniformly by Δy in a downward direction from an image displayed on the liquid crystal panel 200B.

Consequently, there occurs displacement of the actually visible images by 2Δy in the longitudinal direction between the liquid crystal display device 100A and the liquid crystal display device 100B.

<Cancelling Image Displacement by Shifting Displayed Images>

(a) and (b) of FIG. 13 show an example in which an inclination direction of the borderline between adjacent light guide sections 310 on the emission surface 302 of the light guide element 300A (in other words, an inclination direction of a line drawn by the interface 303 on a plan view) is set to be line-symmetrical with that of the light guide element 300B in a configuration of positioning the liquid crystal display devices 100A and 100B adjacently to each other in a horizontal direction.

(a) of FIG. 13 is a plan view showing a relation among images displayed on the liquid crystal panels 200A and 200B, images actually visible through the light guide elements 300A and 300B, and the interfaces 303 between the light guide sections 310 of the light guide elements 300A and 300B. (b) of FIG. 13 is a cross sectional view showing an inclination direction of the interface 303 in the liquid crystal display device 100A shown in (a) of FIG. 13.

When there occurs opposite shifts of images in a longitudinal direction in the liquid crystal display device 100A and the liquid crystal display device 100B as described above, there occurs image displacement between the liquid crystal display device 100A and the liquid crystal display device 100B.

In order to deal with this, in the present embodiment, as shown in (a) of FIG. 13, the light guide elements 300A and 300B are positioned in such a manner that the inclination directions of the respective interfaces 303 of the light guide elements 300A and 300B are line-symmetrical with respect to the boundary 3 between the liquid crystal display devices 100A and 100B (i.e. boundary 3 between two screens) on a plan view.

As shown in (b) of FIG. 13, in order to display an image on the frame regions 203 that are adjacent to each other via the boundary 3 between the liquid crystal display devices 100A and 100B, the respective interfaces 303 on the cross sections of the light guide elements 300A and 300B are inclined with respect to the boundary 3 while being line-symmetrical with respect to the boundary 3, as with the case of (b) of FIG. 12.

Consequently, both in the liquid crystal display devices 100A and 100B, actually visible images are uniformly shifted by Δy in the same (upper) direction along a longitudinal direction from images displayed on the liquid crystal panels 200A and 200B, respectively. As a result, respective amounts of shift in the longitudinal direction in the liquid crystal display devices 100A and 100B are equal to each other. Consequently, displacements of displayed images (display displacements, image displacements) between the liquid crystal display devices 100A and 100B occurring when a viewer views the displayed images through the light guide elements 300A and 300B, respectively, cancel each other. Accordingly, the liquid crystal display devices 100A and 100B can display images without displacement of images between the liquid crystal display devices 100A and 100B, so that the frames at the boundary 3 are less likely to be seen.

In the present embodiment, an explanation was made as to a case where the liquid crystal display devices 100A and 100B are positioned to be adjacent to each other in a lateral direction, and so shift of a displayed image is considered as occurring in a longitudinal direction. However, the present embodiment is not limited to this.

Shift of a displayed image occurs along an alignment pattern of pixels 201 adjacent to the frame region 203 where the image is to be displayed (i.e. the frame region 203 at the boundary 3 between the liquid crystal display devices 100A and 100B adjacent to each other in a case of tiling as above). In other words, display displacement due to image shift occurs in a direction along a pixel column having a periodic structure which is a cause for generation of moiré (direction along a longitudinal direction of the frame region 203).

Accordingly, in a case where the liquid crystal display devices 100A and 100B are positioned to be adjacent to each other in a horizontal direction (i.e. arranged on the same plane), when the liquid crystal display devices 100A and 100B are arranged in a longitudinal direction (up-and-down direction) and an image is displayed on the frame regions 203 at the boundary 3 therebetween, a direction in which the pixels 201 adjacent to the frame regions 203 are aligned is a lateral direction and therefore a shift direction along the direction in which the pixels 201 are aligned is a lateral direction.

Accordingly, the same matters are applied to the case of aligning the liquid crystal display devices 100A and 100B in a longitudinal direction as the case of aligning the liquid crystal display devices 100A and 100B in a lateral direction except for a change in a shift direction from the lateral direction to the longitudinal direction. Therefore, in that case, "longitudinal direction" and "up and down direction" may be replaced with "lateral direction" and "right and left direction", respectively.

Modification Examples

In the present embodiment, an explanation was made as to a case where the light guide element is provided on the whole surface of the liquid crystal display panel. However, the present embodiment is not limited to this. The light guide element may be provided in such a manner as to cover the whole display region of the liquid crystal panel and at least a part of the frame region on which part an image on the display region is to be displayed. For example, in a case where an image is displayed on the frame region 203 at the right side of the liquid crystal display device 100A as shown in (a) of FIG. 13, it is not always necessary to provide the light guide element 300A on the frame region 203 at the left side of the liquid crystal display device 100A.

In the present embodiment, an explanation was made as to a case where the display system includes a liquid crystal display device as a display device. However, the present embodiment is not limited to this. The display device may be one whose display panel is a PDP display panel, an organic EL (electroluminescence) display panel, an electrophoresis display panel etc. for example.

In a case where the display panel is a self-luminous display panel such as an organic EL display panel instead of a liquid crystal panel, an illumination device such as a backlight device is, needless to say, unnecessary.

In the present embodiment, an explanation was made as to a case where the liquid crystal panel is an active matrix liquid crystal panel. However, the present embodiment is not limited to this. The liquid crystal panel may be a simple matrix liquid crystal panel etc. for example.

In the present embodiment, an explanation was made as to a case where the liquid crystal panel is one in which a counter substrate is provided with a common electrode. However, the present embodiment is not limited to this. The method for driving the liquid crystal panel is not particularly limited, and may be a VA (Vertical Alignment) method, a TN (Twisted Nematic) method, an IPS (In-Plain Switching) method etc.

In the examples shown in (a)-(c) of FIG. 2, an explanation was made as to a case where the liquid crystal display system 1 is one in which two liquid crystal display devices 100A and 100B are adjacent to each other. Accordingly, as an example in which the light guide elements 300A and 300B of the liquid crystal display devices 100A and 100B respectively are provided at the frame regions 203 of the liquid crystal panels 200A and 200B and at the vicinities of the frame regions 203, (a)-(c) of FIG. 2 shows a case where the light guide elements 300A and 300B are provided only at the adjacent frame regions 203 of the adjacent liquid crystal panels 200A and 200B and at the vicinities of the adjacent frame regions 203 as indicated by chain double-dashed lines.

However, the present embodiment is not limited to this. In a case where a plurality of liquid crystal display devices are provided to be adjacent to each other, the light guide elements may be provided at adjacent frame regions of adjacent liquid crystal panels and at the vicinities of the adjacent frame regions or may be at a plurality of frame regions (e.g. all the frame regions) and the vicinities thereof regardless of adjacency of liquid crystal panels.

Second Embodiment

Figure 14:
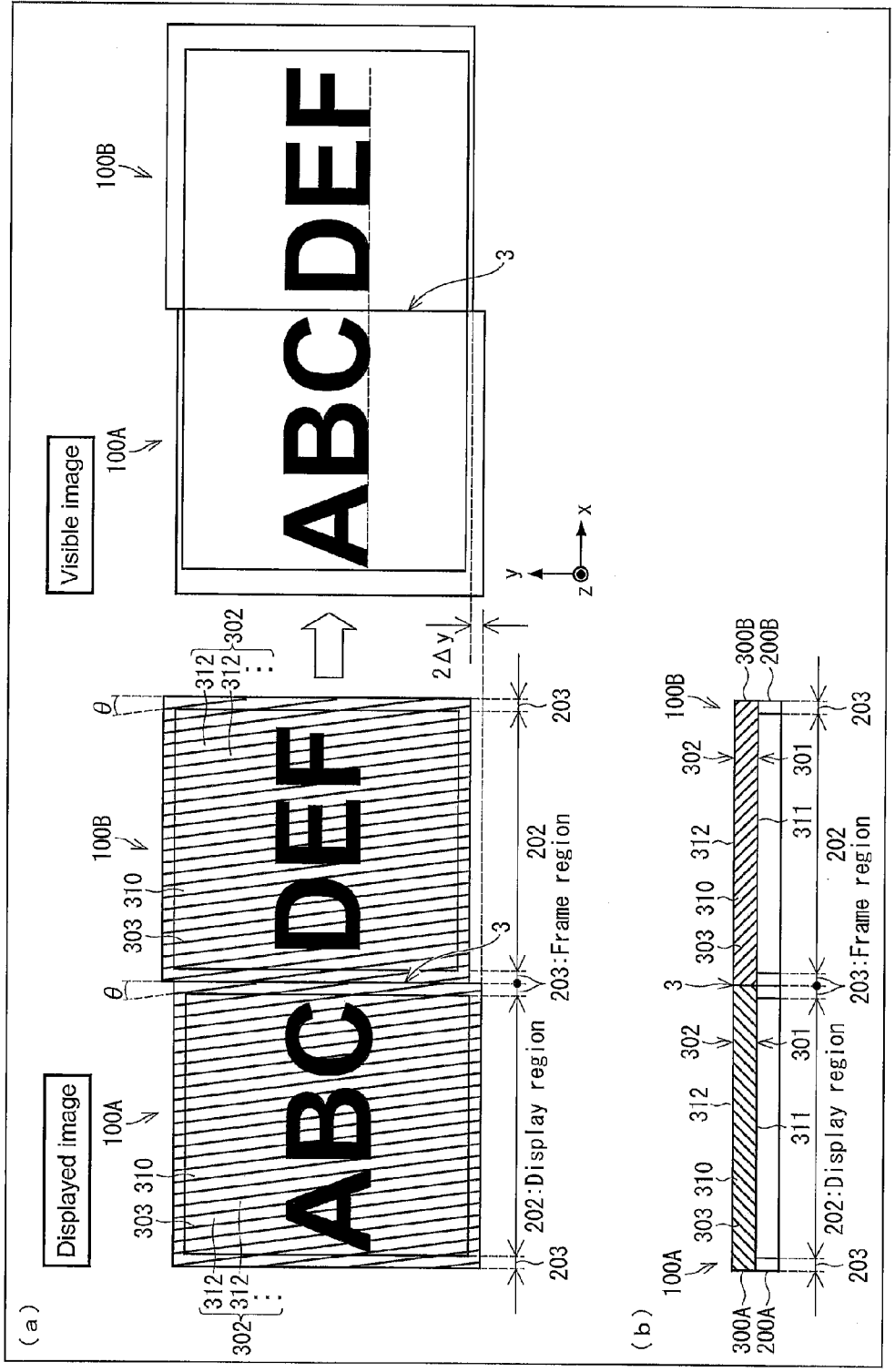
FIG. 14(a) of FIG. 14 is a plan view showing a relation among images displayed on liquid crystal panels of liquid crystal display devices in a liquid crystal display system in accordance with Second Embodiment, images actually visible through light guide elements, and interfaces between light guide sections. (b) of FIG. 14 is a cross sectional view showing an inclination direction of the interface between the light guide sections of the liquid crystal display device shown in (a) of FIG. 14.

The following explains an embodiment of the present invention with reference to (a) and (b) of FIG. 14. In the present embodiment, only differences from First Embodiment are explained, and the same matters between First Embodiment and the present embodiment are not explained. Members having the same functions as those in First Embodiment are given the same reference numerals and explanations thereof are omitted.

(a) of FIG. 14 is a plan view showing a relation among images displayed on liquid crystal panels 200A and 200B of liquid crystal display devices 100A and 100B in a liquid crystal display system 1 in accordance with the present embodiment, images actually visible through light guide elements 300A and 300B, and interfaces 303 between light guide sections 310 of the light guide elements 300A and 300B. (b) of FIG. 14 is a cross sectional view showing an inclination direction of the interface 303 between the light guide sections 310 of the liquid crystal display device 100A shown in (a) of FIG. 14.

As shown in (a) of FIG. 14, in the present embodiment, the light guide elements 300A and 300B are positioned in such a manner that lines drawn by the respective interfaces 303 of the light guide elements 300A and 300B on a plan view (borderlines) are inclined in the same direction, as in the case of (a) of FIG. 12.

Although the direction of the borderline of the light guide sections 310 of the light guide element 300A is identical to that of the light guide element 300B on a plan view as described above, the liquid crystal display devices 100A and 100B are staggered from each other in advance in such a manner that display displacements between the liquid crystal display devices 100A and 100B appearing when a viewer views a displayed image through the light guide elements 300A and 300B cancel each other, so that image displacement between the liquid crystal display devices 100A and 100B can be overcome.

The liquid crystal display devices 100A and 100B may be staggered from each other with a stagger distance corresponding to display displacements measured by naked eyes so that the display displacements cancel each other. Alternatively, by staggering the liquid crystal display devices 100A and 100B with a stagger distance corresponding to a predetermined shift amount, i.e. $2\Delta y$ ($=2\times L\times \tan\theta$), it is possible to overcome image displacement between the liquid crystal display devices 100A and 100B. Consequently, it is possible to make the frame at the boundary 3 of the liquid crystal display device 100A less visible.

Third Embodiment

Figure 15:
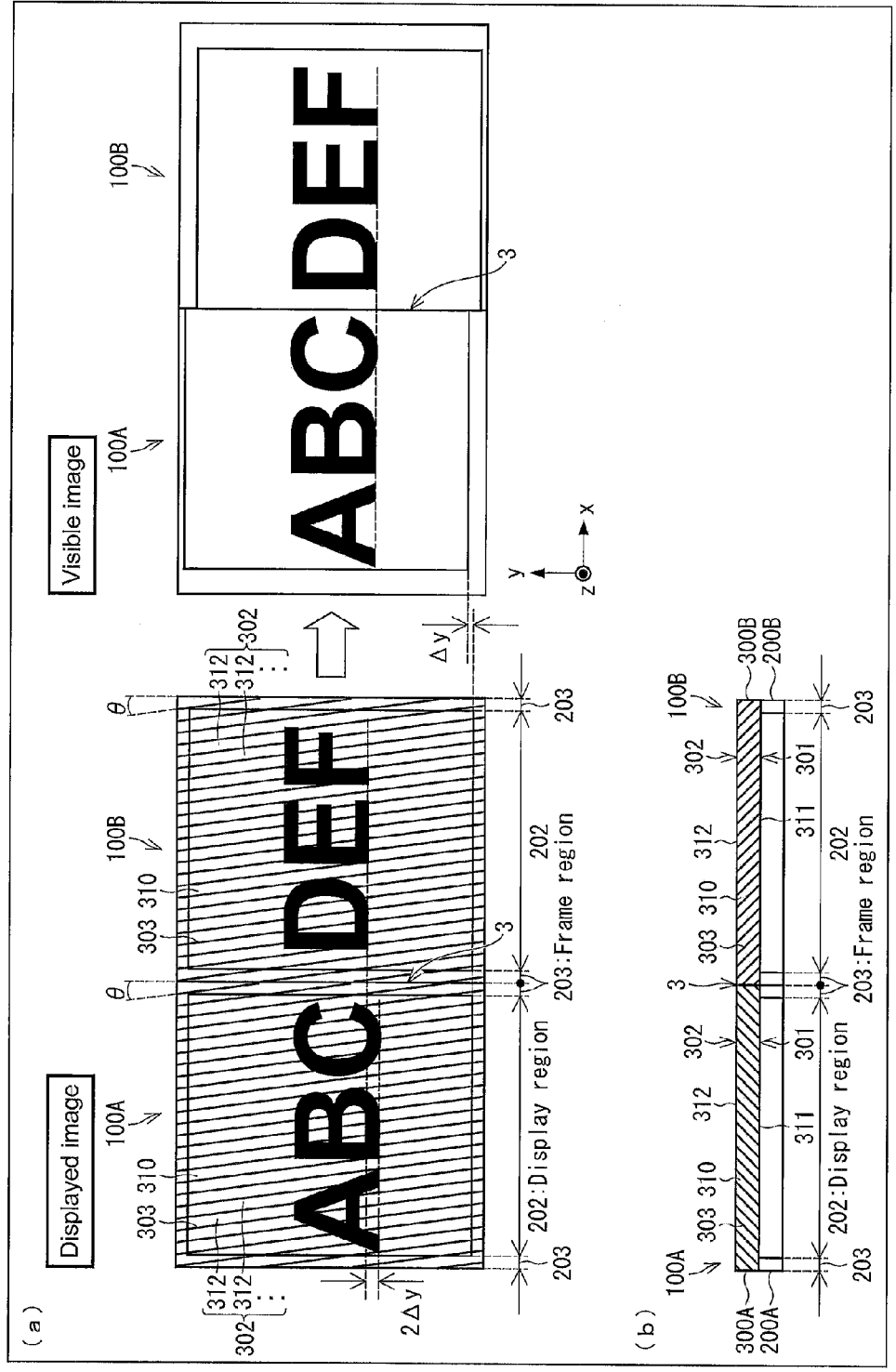
FIG. 15(a) of FIG. 15 is a plan view showing a relation among images displayed on liquid crystal panels of liquid crystal display devices in a liquid crystal display system in accordance with Third Embodiment of the present embodiment, images actually visible through light guide elements, and interfaces between light guide sections. (b) of FIG. 15 is a cross sectional view showing an inclination direction of the interface between the light guide sections in the liquid crystal display device shown in (a) of FIG. 15.
Figure 17:
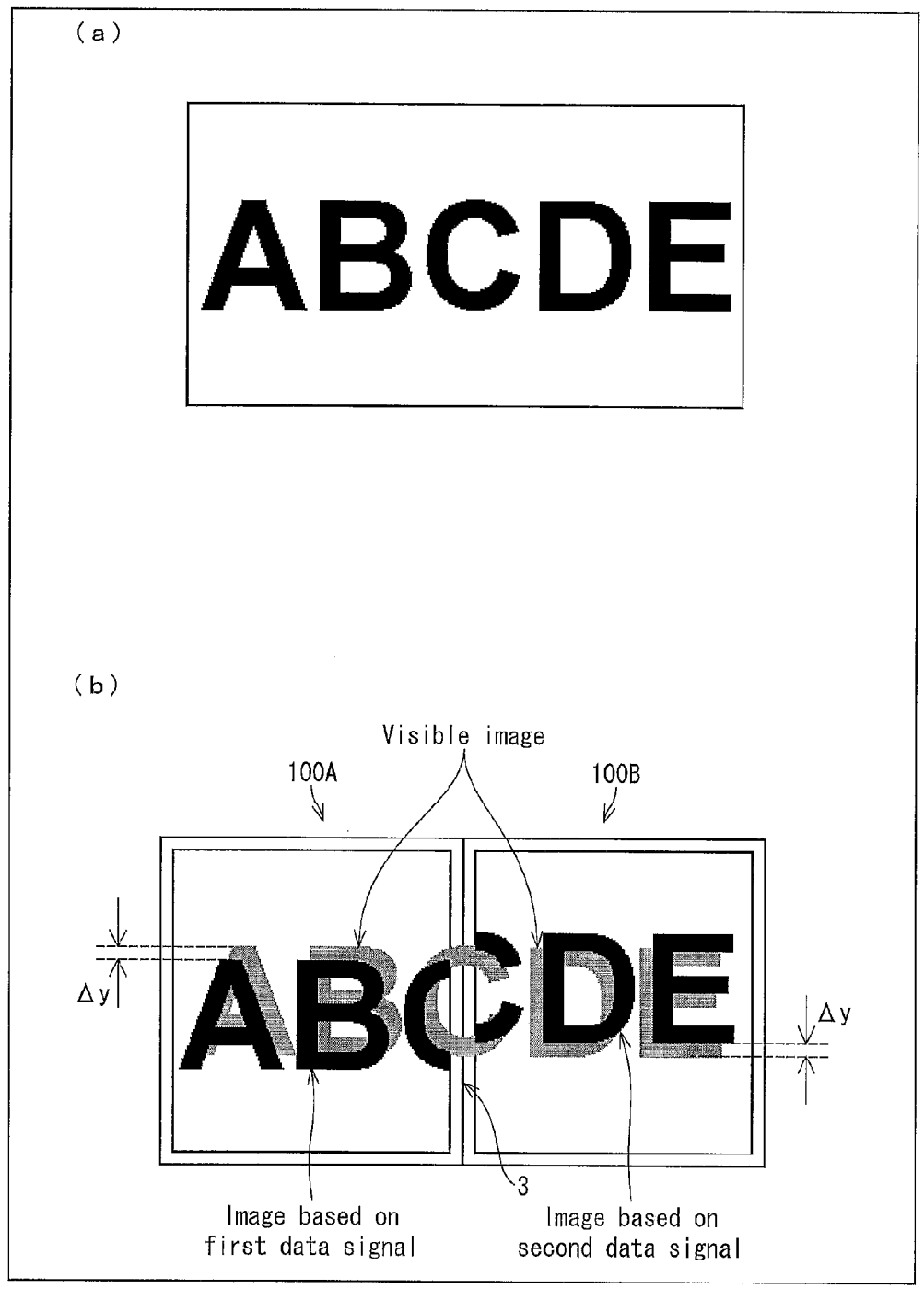
FIG. 17(a) of FIG. 17 shows an input image based on a data signal inputted to the liquid crystal display system in accordance with Third Embodiment of the present invention. (b) of FIG. 17 is a view for explaining relationships between images based on a first data signal and a second data signal and visible images.

The following explains an embodiment of the present invention with reference to (a) and (b) of FIG. 15 to (a) and (b) of FIG. 17. In the present embodiment, only differences from First Embodiment are explained, and the same matters between First Embodiment and the present embodiment are not explained. Members having the same functions as those in First Embodiment are given the same reference numerals and explanations thereof are omitted.

(a) of FIG. 15 is a plan view showing a relation among images displayed on liquid crystal panels 200A and 200B of liquid crystal display devices 100A and 100B in a liquid crystal display system 1 in accordance with the present embodiment, images actually visible through light guide elements 300A and 300B, and interfaces 303 between light guide sections 310 of the light guide elements 300A and 300B. (b) of FIG. 15 is a cross sectional view showing an inclination direction of the interface 303 between the light guide sections 310 in the liquid crystal display device 100A shown in (a) of FIG. 15.

As shown in (a) of FIG. 15, also in the present embodiment, the light guide elements 300A and 300B are positioned in such a manner that the respective interfaces 303 of the light guide elements 300A and 300B are inclined in the same direction on a plan view, as in the case of (a) of FIG. 12.

In First and Second Embodiments, explanations were made as to cases of displaying images whose shift amounts are modified by hardware so that display displacements between the liquid crystal display devices 100A and 100B occurring when a viewer views a displayed image through the light guide elements 300A and 300B cancel each other. In the present embodiment, an explanation is made as to a case of displaying images whose shift amounts are modified by software so that display displacement between the liquid crystal display devices 100A and 100B occurring when a viewer views a displayed image through the light guide elements 300A and 300B is cancelled.

That is, as described above, in the liquid crystal display device 100A, an actually visible image is shifted by $\Delta y$ in an upward direction from an image displayed on the liquid crystal panel 200A. In the liquid crystal display device 100B, an actually visible image is shifted by $\Delta y$ in a downward direction from an image displayed on the liquid crystal panel 200B.

Therefore, image displacement can be overcome by the liquid crystal panel 200A displaying an image shifted by $\Delta y$ in the downward direction and the liquid crystal panel 200B displaying an image shifted by $\Delta y$ in the upward direction as shown in (a) of FIG. 15.

Figure 16:
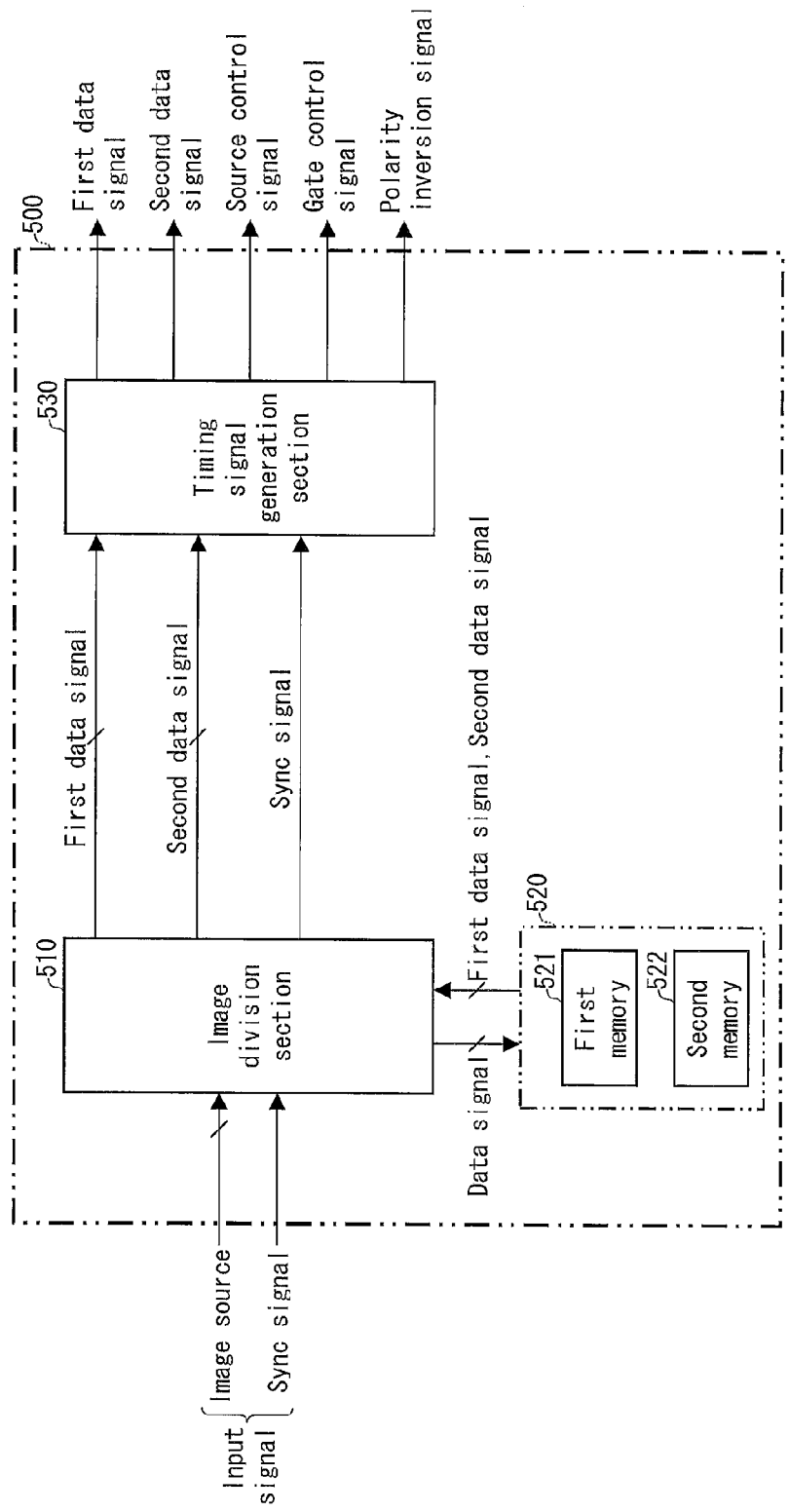
FIG. 16 is a block diagram showing a configuration of a display control circuit in the liquid crystal display system in accordance with Third Embodiment of the present invention.

With reference to FIG. 16 and (a) and (b) of FIG. 17, the following specifically explains a display control method for overcoming the image displacement.

FIG. 16 is a block diagram showing a configuration of a display control circuit 500 in the liquid crystal display system 1 in accordance with the present embodiment.

(a) of FIG. 17 shows an input image based on a data signal inputted to the liquid crystal display system 1. (b) of FIG. 17 is a view for explaining relationships between images (output images) based on a first data signal and a second data signal and visible images (actually displayed images).

The configuration of the liquid crystal display system 1 in accordance with the present embodiment is the same as that explained in First Embodiment with reference to FIG. 3. Accordingly, in the present embodiment, an explanation on the whole configuration of the liquid crystal display system 1 is omitted.

The display control circuit 500 includes an image division section 510 (data signal division section), a RAM 520 (storage section), and a timing signal generation section 530.

The RAM 520 includes a first memory 521 in which a data signal for a first display section (first data signal) is stored, and a second memory 522 in which a data signal for a second display section (second data signal) is stored. The first memory 521 and the second memory 522 may be a line memory for example. The data signal for a first display section is a data signal for causing the liquid crystal display device 100A to display an image (image signal) and the data signal for a second display section is a data signal for causing the liquid crystal display device 100B to display an image (image signal).

An image source and a sync signal are inputted as input signals to the image division section 510. The image source inputted to the image division section 510 is divided by the image division section 510 into a first data signal and a second data signal in accordance with a sync signal, and the first data signal and the second data signal are temporarily stored in the first memory 521 and the second memory 522, respectively.

Furthermore, the image division section 510 reads out, in accordance with the sync signal, the first data signal and the second data signal temporarily stored in the RAM 520, and sends the first data signal and the second data signal to the timing signal generation section 530.

The timing signal generation section 530 generates, from the sync signal inputted thereto, a source control signal, a gate control signal, and a polarity inversion signal in accordance with a predetermined shift amount $\Delta y$, and outputs the source control signal, the gate control signal, and the polarity inversion signal to source drivers 600A and 600B, gate drivers 700A and 700B, and common electrode driving circuits 800A and 800B, respectively, and outputs the first data signal to the source driver 600A and the second data signal to the source driver 600B.

The source driver 600A transmits, in accordance with the source control signal, the first data signal to the liquid crystal panel 200A with timing earlier by the shift amount $\Delta y$ than when correction of the shift amount is not made. The source driver 600B transmits, in accordance with the source control signal, the second data signal to the liquid crystal panel 200B with timing later by the shift amount $\Delta y$ than when correction of the shift amount is not made.

Consequently, as indicated by deep color in (b) of FIG. 17, the liquid crystal panel 200A of the liquid crystal display device 100A displays an image shifted by the shift amount $\Delta y$ in a downward direction, and the liquid crystal panel 200B of the liquid crystal display device 100B displays an image shifted by the shift amount $\Delta y$ in an upward direction. When a viewer views the liquid crystal display devices 100A and 100B in these states through the light guide elements 300A and 300B, the viewer views images without displacement as indicated by thin color in (b) of FIG. 17.

As described above, in the present embodiment, even when the light guide elements 300A and 300B are not positioned line-symmetrically with respect to the boundary 3 between the two screens, displacement of actually visible images can be overcome by the liquid crystal panels 200A and 200B displaying images whose shift amounts have been corrected beforehand by software.

Displayed images may be shifted in such a manner that respective displayed images on the liquid crystal panels 200A and 200B are shifted by Δy in opposite directions or in such a manner that one of the displayed images on the liquid crystal panels 200A and 200B is shifted by 2Δy so as to match displays with each other.

Fourth Embodiment

The following explains an embodiment of the present invention with reference to (a) and (b) of FIG. 18 to FIG. 23. In the present embodiment, only differences from First Embodiment are explained, and the same matters between First Embodiment and the present embodiment are not explained. Members having the same functions as those in First Embodiment are given the same reference numerals and explanations thereof are omitted.

Figure 18:
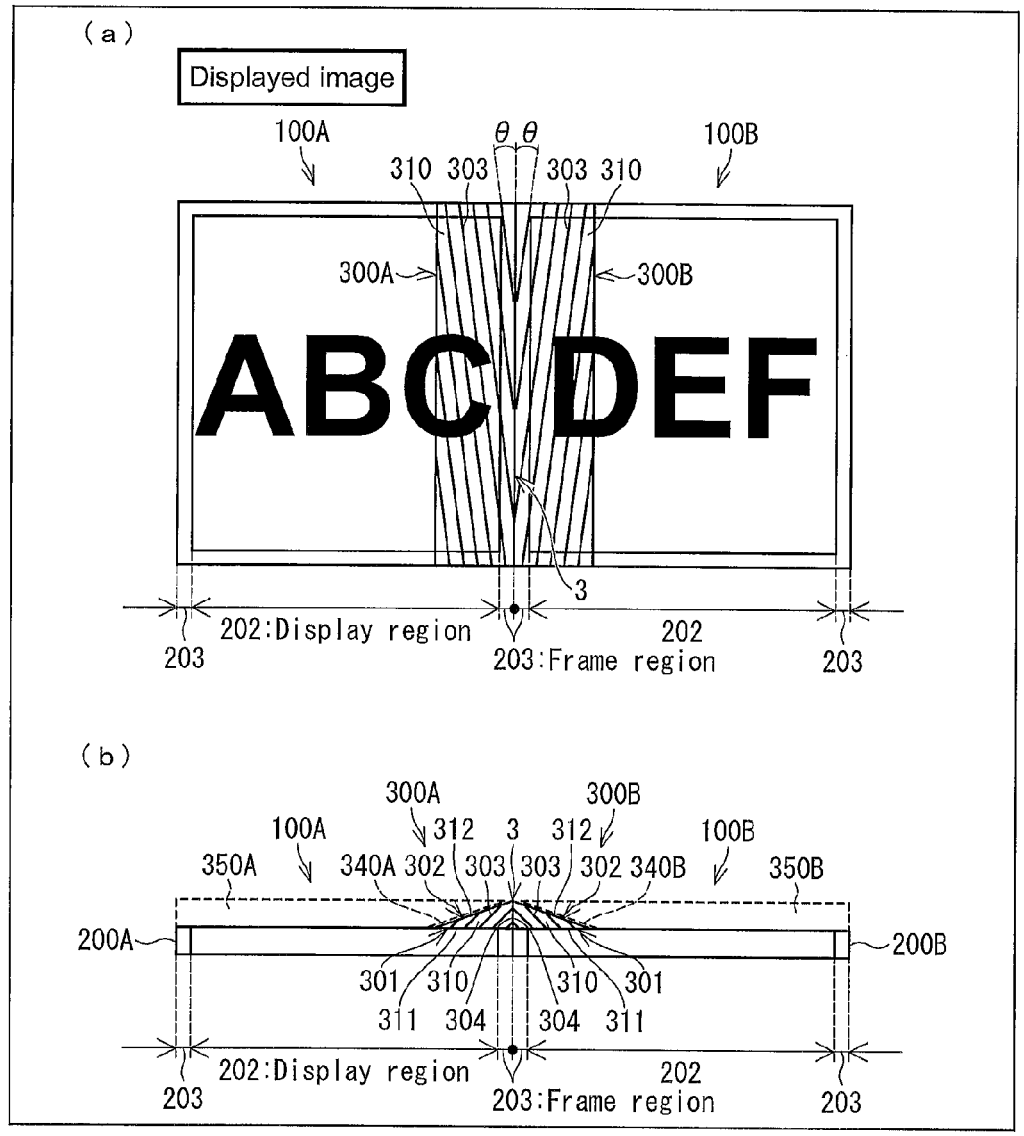
FIG. 18(a) of FIG. 18 is a plan view showing a relation among images displayed on liquid crystal panels of liquid crystal display devices in a liquid crystal display system in accordance with Fourth Embodiment of the present invention, images actually visible through light guide elements, and interfaces between light guide sections. (b) of FIG. 18 is a cross sectional view showing an inclination direction of the interfaces between light guide sections in the liquid crystal display device shown in (a) of FIG. 18.

(a) of FIG. 18 is a plan view showing a relation among images displayed on liquid crystal panels 200A and 200B of liquid crystal display devices 100A and 100B in a liquid crystal display system 1 in accordance with the present embodiment, images actually visible through light guide elements 300A and 300B, and interfaces 303 in the light guide elements 300A and 300B. (b) of FIG. 18 is a cross sectional view showing an inclination direction of the interface 303 of the liquid crystal display device 100A shown in (a) of FIG. 18.

In First to Third embodiments, explanations were made as to cases where the plate-shaped light guide elements 300A and 300B are provided on the whole surfaces of the liquid crystal panels 200A and 200B, respectively.

In the present embodiment, an explanation is made as to a case where the light guide elements 300A and 300B are provided at only the frame regions 203 and parts of the display regions 202 which parts are adjacent to the frame regions 203.

In the present embodiment as well as in First to Third Embodiments, images are displayed above the frame regions 203 which are adjacent to each other via the boundary 3 between the liquid crystal display devices 100A and 100B. Accordingly, in the present embodiment, the light guide elements 300A and 300B are provided at only the frame regions 203 where display is created and the vicinities of the frame regions 203.

<Configuration of Light Guide Element>

The light guide elements 300A and 300B are triangular prisms whose cross sections perpendicular to long side directions of the frame regions 203 are right triangles. The cross sections are right triangles in which incident surfaces 301 are perpendicular to sides 304 leading to edges of the liquid crystal panels 200A and 200B, respectively (i.e. sides 304 of the light guide elements 300A and 300B, respectively, at a boundary 3).

Consequently, in contrast to the configurations of the plate-shaped light guide elements 300A and 300B in First to Third Embodiments in which the incident surfaces 301 and the emission surfaces 302 are parallel to the display surfaces of the liquid crystal panels 200A and 200B, the light guide elements 300A and 300B in accordance with the present embodiment are configured such that the incident surfaces 301 are parallel to the display surfaces of the liquid crystal panels 200A and 200B and the emission surfaces 302 are inclined with respect to the display surfaces of the liquid crystal panels 200A and 200B.

In either case, the light guide elements 300A and 300B have a rectangular shape (square shape or oblong shape) on a plan view. Furthermore, the incident surfaces 301 of the light guide elements 300A and 300B are flat (have flat surfaces).

As indicated by chain double-dashed line in (b) of FIG. 18, the liquid crystal display devices 100A and 100B may have transmissive cover sheets 350A and 350B that cover the display regions 202 of the liquid crystal panels 200A and 200B and the emission surfaces 302 of the light guide elements 300A and 300B.

The transmissive cover sheets 350A and 350B are formed to fit the shapes of the emission surfaces 302 of the light guide elements 300A and 300B and the shapes of the display surfaces of the liquid crystal panels 200A and 200B.

The light guide elements 300A and 300B and the transmissive cover sheets 350A and 350B are attached to each other via adhesive layers 340A and 340B for example. However, the adhesive layers 340A and 340B are not always necessary, and the light guide elements 300A and 300B and the transmissive cover sheets 350A and 350B may be fixed to each other with an air layer therebetween.

By attaching the transmissive cover sheets 350A and 350B to the light guide elements 300A and 300B to provide sheet shapes with flat surfaces as indicated by a chain double-dashed line in (b) of FIG. 18, it is possible to protect the light guide elements 300A and 300B and the display surfaces of the liquid crystal panels 200A and 200B. Furthermore, since the surfaces of the liquid crystal display devices 100A and 100B are flat, visual discomfort is reduced. Furthermore, there is a merit that stains on the surfaces are easy to wipe out.

The transmissive cover sheets 350A and 350B are made of transparent resin such as acrylic resin. By providing the transmissive cover sheets 350A and 350B, it is possible to improve display quality of the liquid crystal display devices 100A and 100B.

<Advantage in Use of Triangular Prism Shaped Light Guide Element>

The transmissive cover sheets 350A and 350B are not necessarily required. That is, in the present embodiment, it is unnecessary to use light guide elements having substantially the same sizes as those of the liquid crystal panels 200A and 200B. Accordingly, in the present embodiment, the liquid crystal display devices 100A and 100B, the liquid crystal display system 1 using the liquid crystal display devices 100A and 100B, and electronic devices using the liquid crystal display devices 100A and 100B or the liquid crystal display system 1 can save their weights, and can be produced in low costs.

The light guide element 300A may be provided at each of two facing frame regions 203 in one liquid crystal panel (e.g. two facing frame regions 203 in each of the liquid crystal panels 200A and 200B), and the inclination angle and the inclination direction of the interface 303 of the light guide sections 310 can be set with respect to each light guide element 300A.

Therefore, for example, by providing each of two facing frame regions 203 in one liquid crystal panel with the light guide element, it is possible to display an image above individual frame regions 203 regardless of whether a plurality of liquid crystal display devices are used or whether the frame regions 203 are at the boundary between the liquid crystal display devices. This allows realizing a display screen of a further larger scale.

<Method for Manufacturing Light Guide Element>

As shown in (a) and (b) of FIG. 18, the light guide elements 300A and 300B have the same configuration except for a difference in inclination direction of the interface 303.

Accordingly, the method for manufacturing the light guide elements 300A and 300B in accordance with the present embodiment is explained below using the method for manufacturing the light guide element 300A as an example.

In the following, an explanation is made as to the method for manufacturing the light guide element 300A using a sheet laminate. Here, the sheet laminate is a sheet laminate 320. However, the process mentioned below is common between sheet laminates 320 and 330 and is not limited to the case of the sheet laminate 320.

In the following explanation, as the method for manufacturing the light guide element 300A, the method for manufacturing the light guide element 300A having the transmissive cover sheet is explained as an example.

Figure 19:
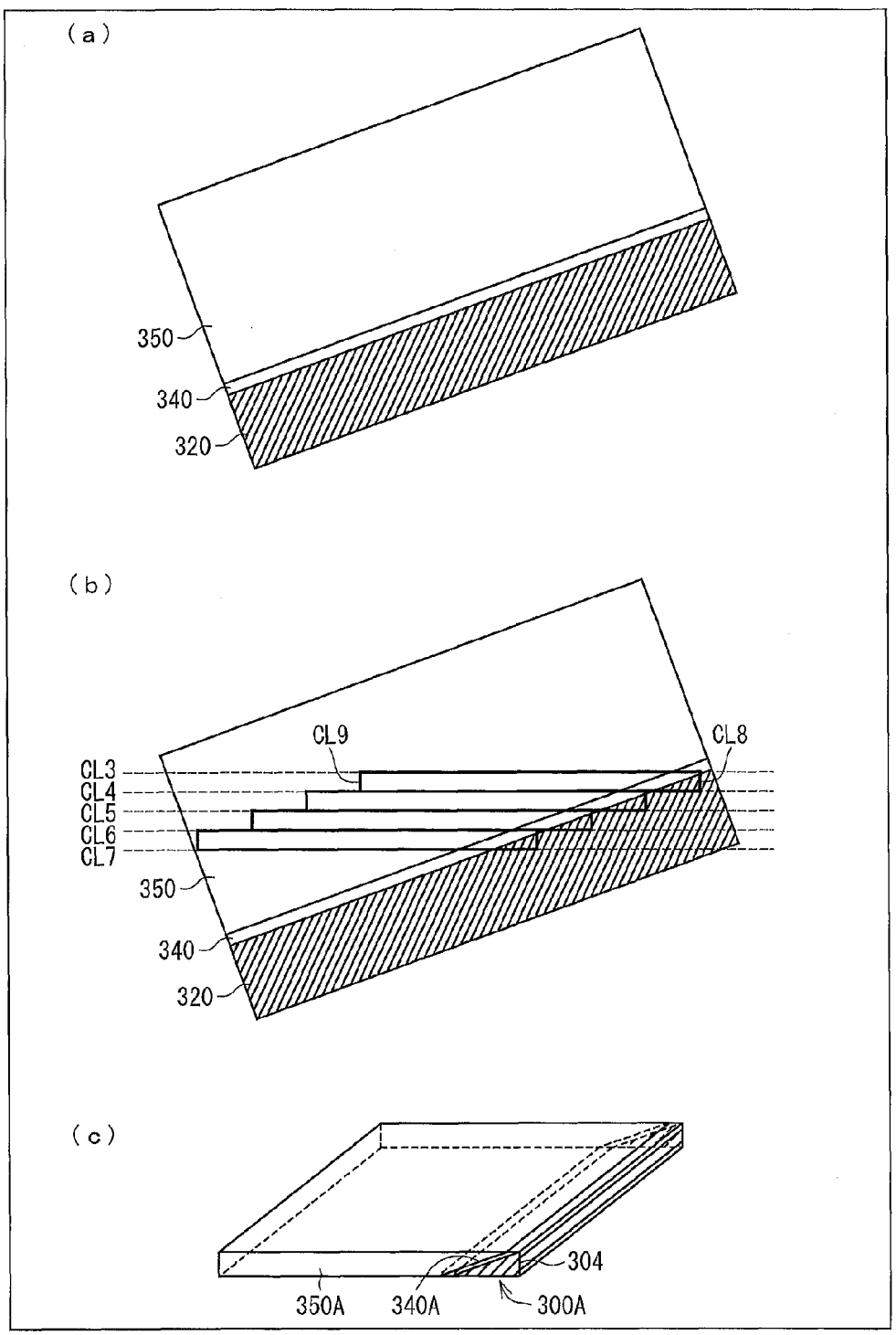
FIG. 19(a)-(c) of FIG. 19 are views showing, in the order of process, a method for manufacturing a light guide layer in accordance with Fourth Embodiment of the present invention.

(a)-(c) of FIG. 19 are views showing, in the order of process, the method for manufacturing the light guide element 300A in accordance with the present embodiment.

Initially, similarly with the processes of (a)-(c) of FIG. 6, the sheet laminate 320 having the plate shape is obtained. At that time, in the present embodiment, the plate-shaped sheet laminate 320 is cut out in the process shown in (b) of FIG. 6 in the manner shown in (a) of FIG. 8.

Next, as shown in (a) of FIG. 19, a transmissive sheet 350 for forming a transmissive cover sheet 350A is attached to the plate-shaped sheet laminate 320 via an adhesive layer 340. The transmissive sheet 350 is an acrylic resin sheet for example. If washing is made after cutting, it is preferable to use a water-resistant adhesive. If cutting oil is used in cutting, it is preferable to use an oil-resistant adhesive. A preferable example of the adhesive is the instant adhesive TB7737 made by ThreeBond Co., Ltd.

Next, as shown in (b) of FIG. 19, the resultant is cut along cutting lines (cutting planes) CL3-CL7 which are inclined by a predetermined angle with respect to the interfaces of the sheet laminate 320. The cutting is preferably made by a multi-wire saw.

Next, the plate-shaped sheet members cut out along the cutting lines CL3-CL7 are cut along cutting lines CL8 and CL9 perpendicularly to the seat surfaces of the plate-shaped sheet members, as shown in (b) of FIG. 19. This cutting is easier by a cutting blade or laser than by a multi-wire saw. Cutting surfaces of the plate-shaped sheet members are subjected to a treatment such as polishing according to necessity. Which surface is to be subjected to a treatment such as polishing is determined suitably according to necessity. Furthermore, surfaces of the cut plate-shaped sheet members are washed and dried according to necessity. Thus, the light guide element 300A (light guide sheet) having a transmissive cover sheet shown in (c) of FIG. 19 is obtained.

<Method for Overcoming Moiré>

As shown in (a) and (b) of FIG. 18, also in the present embodiment, the light guide element 300A includes a plurality of light guide sections 310 having transmissive layers that are inclined in such a manner that incident surfaces 311 overlap a part of the display region 202 and emission surfaces 312 overlap at least a part of the frame regions 203. Furthermore, the light guide sections 310 are positioned in such a manner that a direction of a borderline between adjacent light guide sections 310 on the incident surface 301 and the emission surface 302 forms an angle θ in a range of 5°<θ<85° with a direction in which pixels 201 adjacent to the frame regions 203 where an image is to be displayed are aligned (i.e. pixel columns parallel to a long side direction of the frame regions 203 where an image is to be displayed).

Consequently, also in the present embodiment, by providing the light guide sections 310 in the light guide element 300A as described above, it is possible to create display above the frame regions 203 and to prevent generation of moiré.

<Shift of Displayed Image>

However, also in the present embodiment, by overlapping the light guide sections 310 on the pixel columns while the light guide sections 310 are inclined by the angle θ with respect to the pixel columns on a plan view as shown in (a) of FIG. 18, a displayed image is shifted by the light guide sections 310 not only in a direction perpendicular to the long side direction of the frame regions 203 (i.e. short side direction of the frame regions 203) but also in a direction parallel to the long side direction of the frame regions 203 (i.e. direction along a direction in which pixels 201 adjacent to the frame regions 203 are aligned).

FIG. 20 is a view for explaining a relationship between the position of an original pixel 201 on the display region 202 having the triangular prism-shaped light guide element 300A thereon and the position of a visible pixel 201 displayed above the frame region 203 to which the original pixel 201 is shifted in a longitudinal direction.

As shown in FIG. 20, shift of the displayed image occurs at regions where the light guide elements 300A and 300B are provided. Furthermore, in a case where the triangular prism-shaped light guide elements 300A and 300B are used as described above, the shift amount differs depending on where a pixel is positioned as shown in FIG. 20. Therefore, in the case where the triangular prism-shaped light guide elements 300A and 300B are used as described above, it is necessary to change the shift amount depending on where a pixel is positioned.

Accordingly, the following explains a specific method for controlling display in order to overcome the image displacement mentioned above.

The shift amount may be changed by using a LUT (look-up table) in which shift amounts of displayed images in accordance with distances from ends of the incident surfaces of the light guide elements 300A and 300B which ends are closer to the display regions 202 of the liquid crystal panels 200A and 200B to ends of the incident surfaces which ends are farther from the display regions 202 are related to pixel positions of the liquid crystal panels 200A and 200B, or the shift amount may be calculated on each occasion with respect to each pixel position.

<Method Using LUT>

Initially, a method using LUT is explained below.

Figure 21:
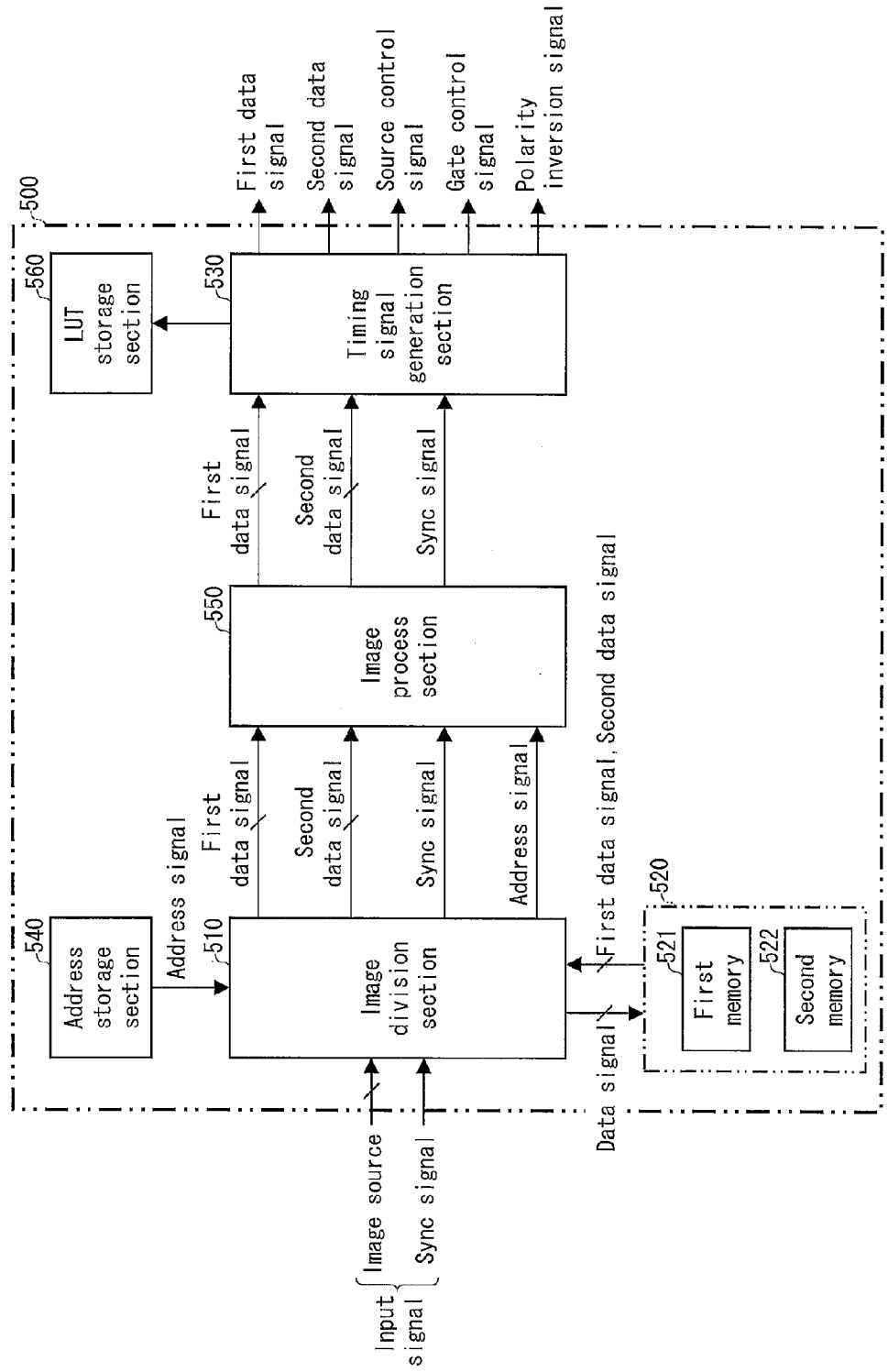
FIG. 21 is a block diagram showing a configuration of a display control circuit in the liquid crystal display system in accordance with Fourth Embodiment of the present invention.

FIG. 21 is a block diagram showing a configuration of a display control circuit 500 in the liquid crystal display system 1 in accordance with the present embodiment.

Figure 22:
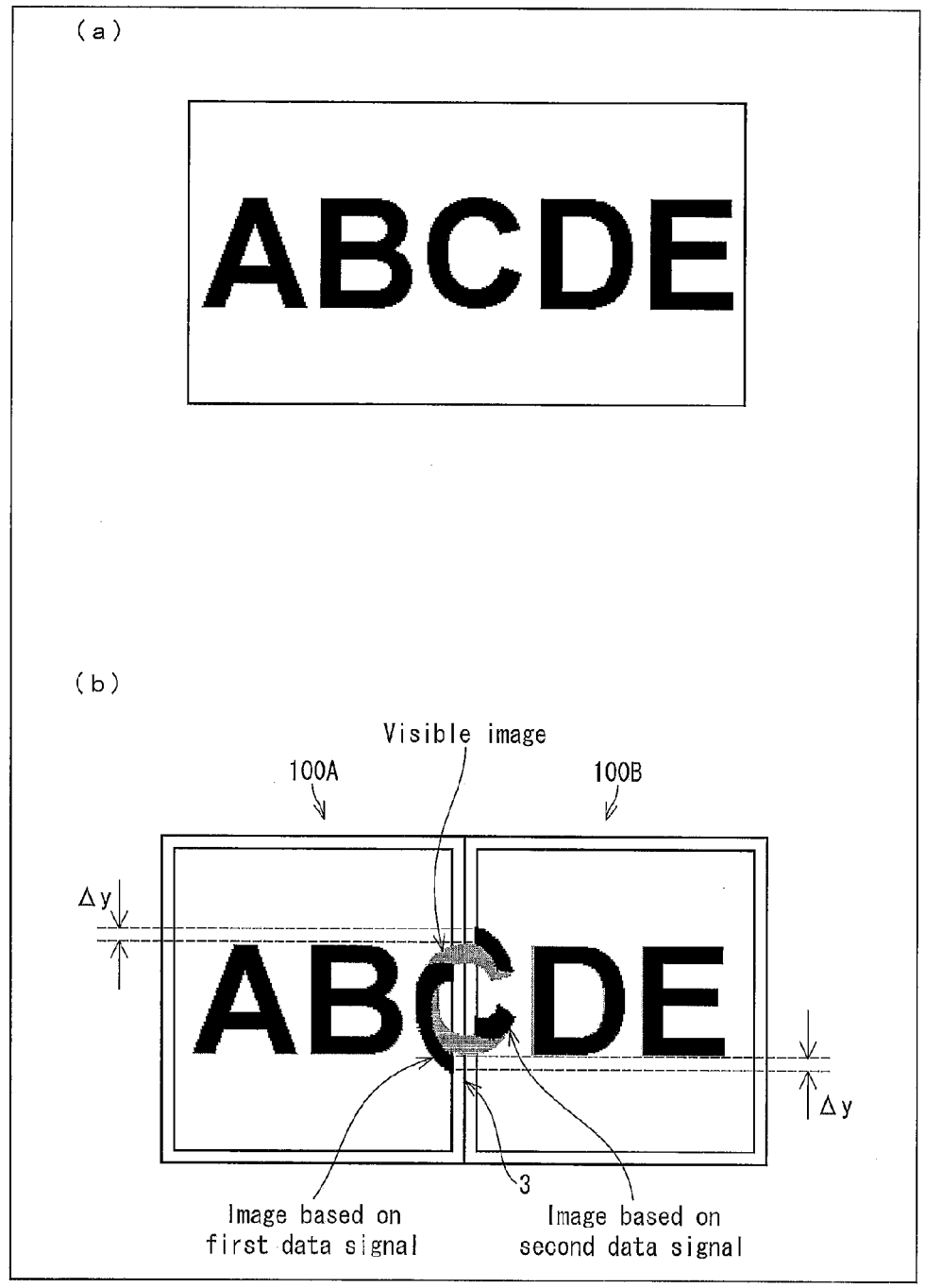
FIG. 22(a) of FIG. 22 shows an input image based on a data signal inputted to the liquid crystal display system in accordance with Fourth Embodiment of the present invention. (b) of FIG. 22 is a view for explaining relations between images based on a first data signal and a second data signal and visible images.

(a) of FIG. 22 shows an input image based on a data signal inputted to the liquid crystal display system 1. (b) of FIG. 22 is a view for explaining relations between images based on a first data signal and a second data signal (output images) and visible images (actually displayed images).

The configuration of the liquid crystal display system 1 in accordance with the present embodiment is the same as that described in First Embodiment with reference to FIG. 3. Accordingly, in the present embodiment, explanations on the whole configuration of the liquid crystal display system 1 and members described in Third Embodiment are simplified or omitted.

The display control circuit 500 in accordance with the present embodiment includes an image division section 510, a RAM 520 (storage section), a timing signal generation section 530, an address storage section 540, an image process section 550, and a LUT storage section 560.

The address storage section 540 stores addresses indicative of the positions of pixels in the display regions 202 of the liquid crystal display devices 100A and 100B. The image division section 510 reads out the addresses from the address storage section 540 according to necessity.

The image division section 510 divides an image source inputted thereto into two in accordance with the addresses of pixels 201 stored in the address storage section 540. The first data signal and the second data signal outputted from the image division section 510 include addresses indicative of the positions of pixels.

The image process section 550 is positioned between the image division section 510 and the timing signal generation section 530. The image process section 550 carries out an image process on the first data signal and the second data signal transmitted from the image division section 510. The image process section 550 transmits, to the timing signal generation section 530 in the subsequent stage, the first data signal and the second data signal having been subjected to the image process together with a sync signal.

The image process section 550 carries out, as the image process, a thinning-out process on the first data signal and the second data signal which are to be displayed on regions of the liquid crystal panels 200A and 200B on which regions the light guide elements 300A and 300B are laminated, respectively. The thinning-out process is carried out because use of the triangular prism-shaped light guide elements 300A and 300B elongates displayed images, which necessitates displaying images while downsizing the images on the regions of the liquid crystal panels 200A and 200B where the light guide elements 300A and 300B are laminated.

The LUT storage section 560 stores a LUT (Look-Up Table) to be referred when the timing signal generation section 530 generates timing signals. The LUT stored herein is a table in which the addresses of the pixels 201 are related to shift amounts $\Delta y$.

In the case of using the triangular prism-shaped light guide elements 300A and 300B as described above, the shift amount $\Delta y$ in the longitudinal direction is in a linear relation with coordinates of the pixel 201 in the lateral direction. Accordingly, image correction is made based on this relation. For example, it is assumed that edges (ends) of the light guide elements 300A and 300B which edges are closer to the display regions 202 of the liquid crystal display panels 200A and 200B exhibit no shift, the central part of the light guide element 300A exhibits the shift amount $\Delta y/2$ in the longitudinal direction, and edges of the light guide elements 300A and 300B which edges are closer to the boundary 3, i.e. portions in the vicinity of the frames exhibit the shift amount $\Delta y$ in the longitudinal direction. These shift amounts are related to corresponding address information, and the shift amounts $\Delta y$ in the longitudinal direction corresponding to other pixel positions are calculated beforehand. Thus, a LUT is prepared.

In a case where addresses obtained from the address information included in the input first data signal and the input second data signal are addresses indicative of the positions of pixels on regions of the liquid crystal panels 200A and 200B on which regions the light guide elements 300A and 300B are laminated, the timing signal generation section 530 refers to the LUT stored in the LUT storage section 560, reads out the shift amounts $\Delta y$ corresponding to the addresses obtained from the address information included in the input first data signal and the input second data signal, and generates, in accordance with the read-out shift amounts $\Delta y$, source control signals, gate control signals, and polarity inversion signals from the input sync signal, and outputs the source control signals, the gate control signals, and the polarity inversion signals to source drivers 600A and 600B, gate drivers 700A and 700B, and common electrode driving circuits 800A and 800B, respectively, and outputs the first data signal to the source driver 600A and the second data signal to the source driver 600B.

On the other hand, in a case where addresses obtained from the address information included in the input first data signal and the input second data signal are not addresses indicative of the positions of pixels on regions of the liquid crystal panels 200A and 200B on which regions the light guide elements 300A and 300B are laminated, the timing signal generation section 530 does not refer to the LUT stored in the LUT storage section 560, and generates source control signals, gate control signals, and polarity inversion signals from the input sync signal, and outputs the source control signals, the gate control signals, and the polarity inversion signals to the source drivers 600A and 600B, the gate drivers 700A and 700B, and the common electrode driving circuits 800A and 800B, respectively, and outputs the first data signal to the source driver 600A and the second data signal to the source driver 600B.

The source driver 600A outputs the first data signal to the liquid crystal panel 200A in accordance with the source control signal, and the source driver 600B outputs the second data signal to the liquid crystal panel 200B in accordance with the source control signal.

Consequently, as shown by deep color in (b) of FIG. 22, images are displayed while being shifted from each other in directions in which pixels 201 adjacent to the frame regions 203 of the liquid crystal panels 200A and 200B are aligned, thereby cancelling displacement of displayed images on the regions where the light guide elements 300A and 300B are provided, which shifts occur in accordance with distances from ends of the incident surfaces of the light guide elements 300A and 300B which ends are closer to the display regions 202 of the liquid crystal panels 200A and 200B to ends of the incident surfaces which ends are farther from the display regions 202 when the liquid crystal display devices 100A and 100B are viewed through the light guide elements 300A and 300B.

When a viewer views the liquid crystal display devices 100A and 100B through the light guide elements 300A and 300B in this state, the viewer can view images without displacement as indicated by thin color in (b) of FIG. 22.

<Method for Calculating Shift Amount for Each Pixel Position in Each Case>

Next, an explanation is made as to a method for calculating the shift amount for each pixel position in each case.

Figure 23:
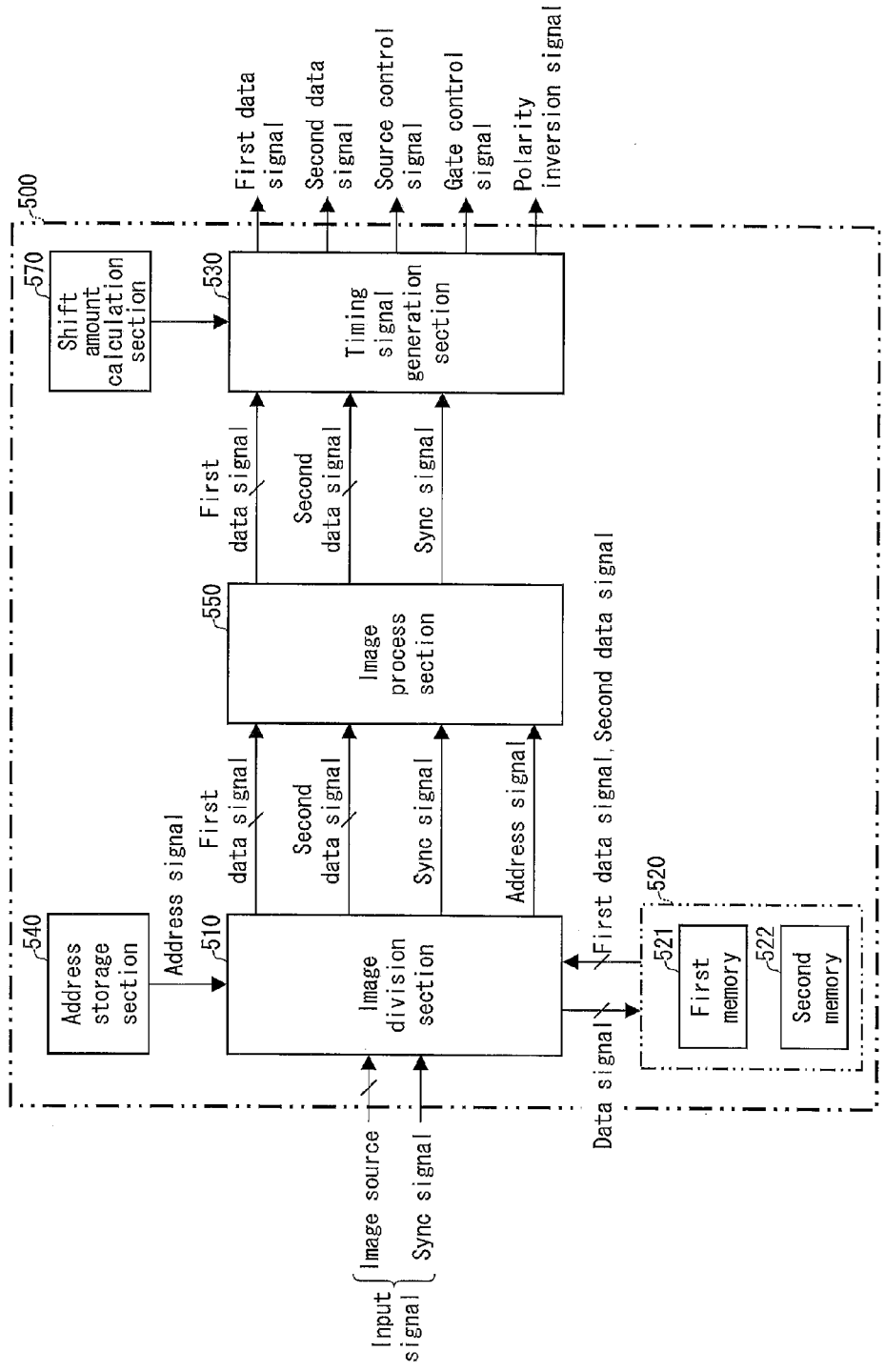
FIG. 23 is a block diagram showing another configuration of the display control circuit in the liquid crystal display system in accordance with Fourth Embodiment of the present invention.

FIG. 23 is a block diagram showing another configuration of the display control circuit 500 in the liquid crystal display system 1 in accordance with the present embodiment.

FIG. 23 shows an example of the display control circuit 500 in which the LUT storage section 560 is replaced with a shift amount calculation section 570. Accordingly, explanations on the whole configuration of the liquid crystal display system 1 and members described in Third Embodiment are simplified or omitted.

In a case of using the display control circuit 500 having the above configuration, a relational expression used in the shift amount calculation section 570 is obtained beforehand.

As shown in FIG. 20, the light guide element 300A has a triangular pillar shape. Due to the cross section of the triangular pillar shape, the shift amount is a linear function of the pixel position in the liquid crystal panel 200A covered by the light guide element 300A. In this case, the pixel position corresponding to an end of the light guide element 300A is a position where the shift amount is minimum, and the pixel position corresponding to an end of the light guide element 300A which end is closest to the boundary 3 is a position where the shift amount is maximum. Accordingly, a linear function indicative of a relation between the shift amount and the pixel position is obtained beforehand from the minimum value and the maximum value of the shift amount, and the linear function is used as the relational expression for obtaining the shift amount.

The shift amount calculation section 570 calculates the shift amount corresponding to the pixel position based on the relational expression obtained beforehand, and transmits the calculated shift amount to the timing signal generation section 530.

Specifically, the shift amount calculation section 570 calculates pixel positions based on address information included in the first data signal and the second data signal that have been transmitted from the timing signal generation section, and calculates shift amounts from the calculated pixel positions by using the relational expression.

The timing signal generation section 530 generates source control signals, gate control signals, and polarity inversion signals from the input sync signal in accordance with the shift amounts from the shift amount calculation section 570, and outputs the source control signals, the gate control signals, and the polarity inversion signals to the source drivers 600A and 600B, the gate drivers 700A and 70B, and the common electrode driving circuits 800A and 800B, respectively, and outputs the first data signal to the source driver 600A and the second data signal to the source driver 600B.

The source driver 600A outputs the first data signal to the liquid crystal panel 200A in accordance with the source control signal, and the source driver 600B outputs the second data signal to the liquid crystal panel 200B in accordance with the source control signal.

Also with the above display control method, it is possible to cancel displacement of displayed images on the regions where the light guide elements 300A and 300B are provided, which displacement occurs in accordance with distances from ends of the incident surfaces of the light guide elements 300A and 300B which ends are closer to the display regions 202 of the liquid crystal panels 200A and 200B to ends of the incident surfaces which ends are farther from the display regions 202 when the liquid crystal display devices 100A and 100B are viewed through the light guide elements 300A and 300B.

Modification Examples

In the present embodiment, an explanation was made as to an example in which the light guide elements 300A and 300B cover parts of the display regions 202 of the liquid crystal panels 200A and 200B and the whole of the frame regions 203 where images on the display regions 202 are to be displayed, i.e. a region ranging from the display region 202 in the vicinity of the frame region 203 to the boundary 3 between the liquid crystal display devices 100A and 100B. However, the present invention is not limited to this.

The liquid crystal display system 1 may include only one liquid crystal display device 100A. In this case, the light guide element 300A may be provided in such a manner as to cover a part of the display region 202 of the liquid crystal panel 200A and at least a part of the frame region 203 where an image on the display region 202 is to be displayed. Needless to say, it is more preferable to provide the light guide element 300A in such a manner as to cover the liquid crystal panel 200A from one end to the other end of the frame region 203 where an image on the display region 202 is to be displayed.

In the case where the liquid crystal display system 1 includes only one liquid crystal display device 100A, when an image where display displacement does not cause any problem, such as a solid image, is displayed on a region where the light guide element 300A is provided, it is unnecessary to make image correction.

However, in the case of using the triangular prism-shaped light guide elements 300A and 300B, the shift amount differs depending on the pixel position. Accordingly, when characters or an image continuous with an image to be displayed on the frame region 203 adjacent to a region where the light guide element 300A is provided is to be displayed on the region where the light guide element 300A is provided, it is necessary to make image correction.

In the case where the liquid crystal display system 1 includes only one liquid crystal display device 100A as above, it is unnecessary to allocate data signals of an input image source to the liquid crystal display devices 100A and 100B.

Accordingly, in the case where the liquid crystal display system 1 includes only one liquid crystal display device 100A, the image division section 510 and the RAM 520 can be omitted in the configuration of FIG. 21 or 23.

That is, the image correction can be made by transmitting the input image source together with an address signal and a sync signal to the image process section 550 without dividing the input image source into the first data signal and the second data signal, and carrying out the thinning-out process on the image source in the image process section 550 and then transmitting the resulting signal to the timing signal generation section 530.

In the present embodiment, in order to change the shift amount depending on the pixel position, there is used the address storage section 540 in which the addresses indicative of the positions of pixels in the display regions 202 of the liquid crystal display devices 100A and 100B are stored. However, the present embodiment is not limited to this.

Information for specifying the positions of the pixels 201 in the liquid crystal panels 200A and 200B in order to change the shift amounts of a displayed image is not limited to addresses on a RAM. What is required is to specify the positions of the pixels aligned in a matrix manner. For example, by applying a two-dimensional coordinates system to alignment of pixels in a matrix manner, it is possible to specify the positions of the pixels by (x, y) coordinates.

In the present embodiment, an explanation was made as to an example in which the light guide elements 300A and 300B each have a triangular pillar shape whose cross section in a direction perpendicular to a direction in which pixels 201 adjacent to the frame region 203 where an image is to be displayed are aligned is a right triangle. However, the present embodiment is not limited to this, and the cross section may have a triangular shape other than the right triangular shape.

Since the shapes of the light guide elements 300A and 300B are known beforehand, the shift amount can be calculated based on the angle θ between a direction of the boundary between the light guide sections 310 adjacent to each other on a plan view and a direction in which the pixels 201 adjacent to the frame regions 203 where an image is to be displayed are aligned and on the distance from ends of the incident surfaces 301 of the light guide elements 300A and 300B which ends are closer to the display regions 202 of the liquid crystal panels 200A and 200B to ends of the incident surfaces 301 which ends are farther from the display regions 202.

The present embodiment may be arranged such that a displacement amount is actually measured and the relation between a shift amount and a pixel position is obtained based on the result of measurement.

Furthermore, a shift amount which is not included in the LUT may be determined by interpolation based on shift amounts consecutive to that shift amount. This allows reducing the size of the LUT.

Therefore, the light guide elements 300A and 300B are not necessarily required to have a right triangular cross section.

In the present embodiment, the thinning-out process was made because the right triangular cross sections of the light guide elements 300A and 300B elongate images displayed through the light guide elements 300A and 300B.

However, the thinning-out treatment is not necessary if such a treatment is not required or images may be elongated.

That is, in the case where the light guide elements 300A and 300B have a triangular prism shape, when the length of the emission surfaces 302 of the light guide elements 300A and 300B in a direction perpendicular to a direction in which the pixels 201 adjacent to the frame regions 203 where images are to be displayed are aligned is longer than the length of the incident surfaces 301, an image to be displayed is elongated. However, when the length of the emission surfaces 302 of the light guide elements 300A and 300B in a direction perpendicular to a direction in which the pixels 201 adjacent to the frame regions 203 where images are to be displayed are aligned is equal to the length of the incident surfaces 301, i.e. when the cross sections of the light guide elements 300A and 300B are isosceles triangles, an image is not elongated.

Therefore, in that case, the image process section 550 is not particularly required. Therefore, in the case where the liquid crystal display system 1 includes only one liquid crystal display device 100A, the image correction can be made by sending an input image source as well as an address signal and a sync signal to the timing signal generation section 530 without dividing the input image source into a first data signal and a second data signal.

In the case where the liquid crystal display system 1 includes the liquid crystal display devices 100A and 100B, the image correction can be made by the image division section 510 dividing an input image source into a first data signal and a second data signal and then sending the first data signal and the second data signal as well as an address signal and a sync signal to the timing signal generation section 530.

Fifth Embodiment

The following explains the present embodiment with reference to (a) and (b) of FIG. 24 to FIG. 27. Only differences from First Embodiment are explained here, and members having the same functions as those in First Embodiment are given the same reference numerals and explanations thereof are omitted here.

In the present embodiment, an explanation is made to a method for improving moiré by setting one of two periodic structures (pitches) which are causes of moiré to be approximately a half-integer multiple of the other.

(Techniques Described in Patent Literatures 6 and 7)

Initially, before explaining the present invention, an explanation is made as to the techniques described in Patent Literatures 6 and 7 which are conventional arts for improving moiré by setting one of two periodic structures to be approximately a half-integer multiple of the other as shown in the method (II) in First Embodiment.

Patent Literature 6 discloses that in order to reduce moiré generated between a regular pattern of pixels in a liquid crystal panel and a regular pattern of groove sequences etc. of a light guide body for illuminating the liquid crystal panel, the pixel pitch P1 of the liquid crystal panel and the groove pitch P2 of the light guide plate are set to meet a relation 1.3P1<P2<1.7P1 or 0.6P1<P2<0.8P1.

Patent Literature 7 discloses formation of an optical control sheet designed to meet an expression $$P11/(P12 \times \cos \theta) = n + k$$

where P11 indicates the pitch of pixels in a liquid crystal cell, P12 indicates the pitch of concavities and convexities formed on the surface of the optical control sheet between a light guide plate for emitting light from a light source and the liquid crystal cell, θ indicates an angle between a longitudinal direction of the matrix of the liquid crystal cell (longitudinal axis of the liquid crystal cell) and an edge line direction of the concavities and convexities on the optical control sheet, θ=0°-45°, k=0.4-0.6, and n is any positive integer.

As described above, the cause for generation of moiré that has been a conventional problem is interference between the regular pattern of pixels and the regular pattern of groove sequences of a light guide body serving as an illumination light source, a prism sheet etc.

That is, the periodic structure having been a problem in these conventional techniques is the regular pattern of the groove columns on a surface of the light guide body of an illumination device or a prism sheet which surface is parallel to a display surface. Conventionally, the pitch for the regular pattern of the groove columns on the light guide body of the illumination device, the prism sheet etc. is adjusted in order that one of the regular pattern of pixels and the regular pattern of the groove columns is a half-integer multiple of the other. In other words, the pitch of grooves of a mold for producing the light guide body etc. is adjusted in order to meet the above relation.

<Method for Overcoming Moiré>

As described above, the conventional technique and the present invention have different causes for generation of moiré and different periodic structures that are problematic. Accordingly, in order to improve moiré, initially, it is necessary to specify the cause for generation of moiré and the periodic structure that is problematic.

Figure 24:
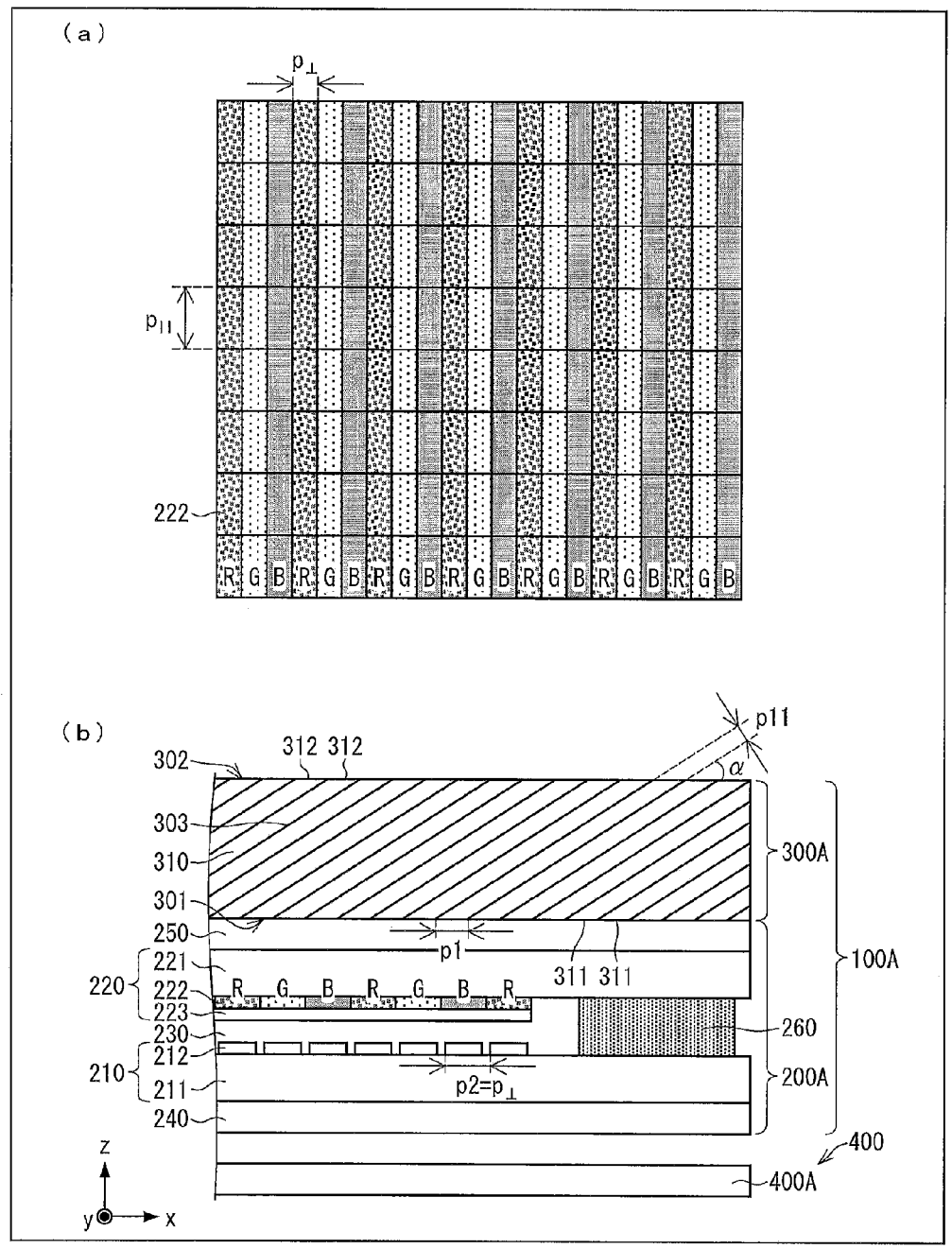
FIG. 24(a) of FIG. 24 is a plan view showing an alignment pattern of a color filter layer in a liquid crystal display device in accordance with Fifth Embodiment of the present invention. (b) of FIG. 24 is a cross sectional view schematically showing a configuration of a main part of the liquid crystal display device in a case where pattern columns of light guide sections are parallel to pattern columns of color filter layers of individual colors on a plan view.

(a) of FIG. 24 is a plan view showing an alignment pattern of a color filter layer 222 in a liquid crystal display device 100A in accordance with the present embodiment. (b) of FIG. 24 is a cross sectional view schematically showing a configuration of a main part of the liquid crystal display device 100A in accordance with the present embodiment in a case where pattern columns of light guide sections 310 are parallel to pattern columns of color filter layers 222 of individual colors on a plan view.

Also in the present embodiment, a liquid crystal panel 200A and a liquid crystal panel 200B have an identical structure. Furthermore, the liquid crystal display device 100A and a liquid crystal display device 100B have identical members. Accordingly, also in the present embodiment, structures of the liquid crystal display device 100A and the liquid crystal display device 100B are explained using the structure of the liquid crystal display device 100A as an example.

The inventors of the present invention have discussed the cause for generation of moiré which is a problem in the present invention (here, the cause for generation of moiré on the front surface of the liquid crystal display device 100A) and found that the cause is interference between the regular pattern of pixels 201 in the liquid crystal panel 200A and the regular pattern of a light guide element 300A as described above.

In the present invention, a part of light emitted from a display region 202 of the liquid crystal panel 200A is guided by the light guide element 300A toward above the frame region 203 so that a displayed image is elongated above the frame region 203.

For this purpose, as shown in (b) of FIG. 24, light guide sections 310 of the light guide element 300A extend not in a direction normal to the pixels 201 but in a direction other than the normal direction.

Accordingly, initially, with respect to the two periodic structures, it is to be determined what pitch the pitch of the regular pattern of the light guide element 300A is.

In the present embodiment as well as in the First Embodiment, laminate films are laminated to form a large block, and the light guide element 300A is cut out from the block in such a manner that interfaces of individual layers of the light guide element 300A are inclined with respect to an incident surface 301 and an emission surface 302 of the light guide element 300A.

Since the light guide element 300A consists of the light guide sections 310 aligned (laminated) with a pitch (thickness) of p11 in a skew direction, the pitch of the periodic structure is p11.

Table 1 shows the result of observation by naked eyes of moiré from a direction normal to a display surface of the liquid crystal display device 100A (i.e. emission surface 301 of the light guide element 300A) and from a position 30 cm away from the display surface in a case where the pixel pitch p2=40μ.

In the present embodiment, the plate-shaped light guide element 300A is provided on the whole display surface of the liquid crystal panel 200A, and a borderline between the light guide sections 310 of the light guide element 300A on a plan view are parallel to the outer edge of the light guide element 300A as shown in (a) of FIG. 7. That is, the direction of a borderline between adjacent light guide sections 310 on the incident surface 301 and the emission surface 302 of the light guide element 300A forms an angle θ of approximately 0° with the direction in which the pixels 201 adjacent to a frame region 203 on which an image is to be displayed are aligned.

On the cross section of the light guide element 300A (cross section in a normal direction of the light guide element 300A), an acute angle between a surface parallel to the display surface of the liquid crystal panel 200A and the borderline between adjacent light guide sections 310 is referred to as an inclination angle α. In this case, α is set to 55°. The inclination angle α is equal to a depression angle between an interface 303 of the light guide section 310 and the incident surface 301 of the light guide element 300A.

TABLE 1

| PET | Adhesive layer | Metal layer | Total (=P11) | Moiré |
|---|---|---|---|---|
| 75 μm | 3 μm | 0.1 μm | 78 μm | None |
| 100 μm | 3 μm | 0.1 μm | 103 μm | Observed |
| 125 μm | 3 μm | 0.1 μm | 128 μm | Observed |

As shown in Table 1, in a case where the pixel pitch p2=40 μm, setting the pitch p11 to be 78 μm for example allows preventing generation of moiré.

However, as a result of further study by the inventors of the present invention, it was found that the light guide elements 300A having the light guide sections 310 with the same periodic structure exhibit different states in terms of moiré when the inclination angle of the interface 303 with respect to the incident surface 301 and the emission surface 302 differs. This can be found from the experiment result shown in Table 2.

Furthermore, as a result of analysis on what pitch moiré is actually generated at, it was found that the pitch p1 of the light guide section 310 on the incident surface 301 of the light guide element 300A, i.e. the pitch p1 of an incident surface 311 of the light guide section 310 is important. The pitch p1 is a distance between interfaces 303 of adjacent light guide sections 310 on the incident surface 301 of the light guide element 300A, and is equal to the pitch of the width on a cross section of a sheet laminate.

That is, even when the light guide element 300A is cut out from the same block, whether the light guide element 300A causes moiré depends on what direction the light guide element 300A is cut out in (what angle the light guide element 300A is cut out at). Accordingly, it is necessary to design the light guide element 300A in consideration of not only the pitch of the periodic structure but also the inclination angle of the light guide section 310 with respect to the incident surface 301 and the emission surface 302 of the light guide element 300A.

Table 2 shows the inclination angle α of the light guide section 310, thicknesses of individual layers of the sheet laminate 320 used as the light guide element 300A, the total of the thicknesses (i.e. pitch p11 of the light guide section 310), the pitch p1 of the light guide section 310 on the incident surface 301 of the light guide element 300A, the pixel pitch p2, and whether moiré was generated or not. Also in Table 2, the pixel pitch p2 is set to 40 μm, and moiré was observed by naked eyes from a direction normal to a display surface of the liquid crystal display device 100A (i.e. emission surface 301 of the light guide element 300A) and from a position 30 cm away from the display surface.

TABLE 2

| PET | Adhesive layer | Metal layer | Total (=P11) | α | p1 | Moiré |
|---|---|---|---|---|---|---|
| 75 μm | 3 μm | 0.1 μm | 78 μm | 45° | 110 μm | Observed |
| 75 μm | 3 μm | 0.1 μm | 78 μm | 55° | 95 μm | None |
| 75 μm | 3 μm | 0.1 μm | 78 μm | 65° | 86 μm | Observed |

As described above, it was found that the two periodic structures (pitches) that are causes for generation of moiré in the present invention are the pixel pitch p2 that is a pitch between pixels 201 adjacent to the frame region 203 where an image is to be displayed (i.e. pitch between pixels 201 parallel to a long side direction of the frame region 203 where an image is to be displayed) and the pitch p1 of the light guide section 310 on the incident surface 301 of the light guide element 300A (i.e. pitch of the incident surface 311 of the light guide section 310).

As described above, when the pitch between pixels 201 adjacent to the frame region 203 where an image is to be displayed (pixel pitch) is p2 is aligned and the pitch (width) of the light guide section 310 on the incident surface 301 of the light guide element 300A is p1, one of the pitches p1 and p2 is required to be a half-integer multiple of the other in order to overcome moiré.

As conditions for overcoming moiré, relational expressions (1) and (2) below must be met. m is a natural number (m=1, 2, 3 . . . ).

In case of P1>P2, $$(m+0.3)<p1/p2<(m+0.7) \tag{1}$$

In case of P1<P2, $$(m+0.3)<p2/p1<(m+0.7) \tag{2}$$

For example, in the case of P1>P2, a relation such as 1.3<p1/p2<1.7 and 2.3<p1/p2<2.7 is a condition for overcoming moiré. m is a magnification of the pitch p1 with respect to the pixel pitch p2, and when p1=p2, m=1.

Here, a relational expression (3) below is met among the pitch p1, the pitch p11, and the inclination angle α.

$$P11 = p1 \times \sin\alpha \quad (3)$$

Application of the relational expression (3) to the relational expressions (1) and (2) gives relational expressions (4) and (5) below.

In case of P1>P2, $$(m+0.3) < p11/(p2 \times \sin\alpha) < (m+0.7) \quad (4)$$

In case of P1<P2, $$(m+0.3) < (p2 \times \sin\alpha)/p11 < (m+0.7) \quad (5)$$

Therefore, in order to produce the light guide element 300A that does not generate moiré, the light guide element 300A should be designed to meet the relational expressions (4) and (5).

Furthermore, transformation of the relational expressions (4) and (5) gives relational expressions (6) and (7) below.

In case of P1>P2, $$(m+0.3) \times p2 \times \sin\alpha < p11 < (m+0.7) \times p2 \times \sin\alpha \quad (6)$$

In case of P1<P2, $$p2 \times \sin\alpha/(m+0.7) < p11 < p2 \times \sin\alpha/(m+0.3) \quad (7)$$

Therefore, in order to prevent generation of moiré, the pitch p11 of the light guide section 310 should be determined to meet the relational expressions (6) and (7).

Depending on how the color filter layers 222 of individual colors are aligned with respect to a long side direction of the frame region 203 where an image is to be displayed, there are two patterns for the pixel pitch p2: a pitch parallel to sequences of the color filter layers 222 of individual colors and a pitch perpendicular to sequences of the color filter layers 222 of individual colors.

Here, assume that a pitch of pixels parallel to sequences of color filter layers 222 of individual colors is p∥ and a pitch of pixels perpendicular to sequences of color filter layers 222 of individual colors is p⊥. In general, three pixels of RGB constitute a square, and accordingly p∥=3 p⊥.

As described above, when the pitch p11 meets the relational expression (6) or (7), it is possible to prevent generation of moiré. However, when the pitch p11 is large, there is a case where blurring appears in a displayed image. On the other hand, when the pitch p11 is small, resolution can be kept high, but production efficiency drops. Therefore, it is desirable in terms of display quality and production efficiency that the pitch 11 is set to be large within a range that allows keeping high resolution.

Accordingly, the following discusses what conditions are desirable for the pitch p11 in cases where p2=p⊥ and p2=p∥, respectively.

<Case where p2=p⊥>

Initially, the following discusses desirable conditions for the pitch p11 in the case where p2=p⊥, that is, in the case where the pattern columns of the light guide section 310 are parallel to pattern columns of the color filter layers 222 of individual colors on a plan view as shown in (b) of FIG. 24.

Conditions for avoiding moiré are shown as the relational expressions (6) and (7).

For example, assume that the pixel pitch p2=40 μm and the inclination angle α=55°. Desirable conditions for the cases of p1>p2 and p2>p1, respectively, are as shown in Table 3.

TABLE 3

| | p1 > p2 | | | p1 < p2 | | |
|---|---|---|---|---|---|---|
| m | m + 0.3 | m + 0.5 | m + 0.7 | m + 0.3 | m + 0.5 | m + 0.7 |
| 1 | 43 | 49 | 56 | 25 | 22 | 19 |
| 2 | 75 | 82 | 88 | 14 | 13 | 12 |
| 3 | 108 | 115 | 121 | 9.9 | 9.4 | 8.9 |
| 4 | 141 | 147 | 154 | 7.6 | 7.3 | 7.0 |
| 5 | 174 | 180 | 187 | 6.2 | 6.0 | 5.7 |
| 6 | 206 | 213 | 220 | 5.2 | 5.0 | 4.9 |
| 7 | 239 | 246 | 252 | 4.5 | 4.4 | 4.3 |
| 8 | 272 | 279 | 285 | 3.9 | 3.9 | 3.8 |

The most desirable pitch p11 of the light guide section 310 is as follows.

$$p11 = (m+0.5) \times p2 \times \sin\alpha$$

In Table 3, the value in the column of (m+0.3) is the lower limit of the pitch p11 at respective values of m, the value in the column of (m+0.5) is the optimal value of the pitch p11 at respective values of m, and the value in the column of (m+0.7) is the upper limit of the pitch p11 at respective values of m.

For example, in the case of p1>p2, when m=1, the most preferable pitch p11 is 49 μm in the column of (m+0.5) which is a half-integer multiple of m. Moiré can be improved when the pitch p11 is in a range from 43 μm to 56 μm at the value of m=1.3 to 1.7.

Next, an explanation is made as to the result of studying a desirable value for m.

In a case where the color filter layers 222 of individual colors of RGB correspond to the pixels 201, respectively, as shown in (a) and (b) of FIG. 24, one picture element consists of three pixels 201 of individual colors of RGB.

Consequently, in the case where p1>p2, when m≥3, image information of one picture element is mixed with image information of adjacent picture elements, resulting in a blurred image. For example, when m=3, the optimal value is (3+0.5)=3.5, so that the pixels 201 and the light guide sections 310 cannot correspond to each other one by one. This causes a little blurring of an image.

For this reason, in the case where p1>p2, it is preferable that m<3. If a little blurring of an image is allowed, m may be smaller than 6. The above condition does not depend on the pixel pitch p2.

On the other hand, in the case where p1<p2, the value of m changes depending on the pixel pitch p2. That is, the pitch p11 cannot be smaller than processing limits of films used in the light guide section 310, particularly a processing limit of the transmissive layer. For example, assume that the transmissive layer is made of a PET (polyethylene terephthalate) film as described above. The processing limit of a general PET is approximately 10 μm. Accordingly, when the pixel pitch p2 is 40 μm, if m>3, the pixel pitch p11 is not enabled. Therefore, in this case, the value of m is preferably m≤3, and more preferably m<3.

<Case where P2=p∥>

Figure 25:
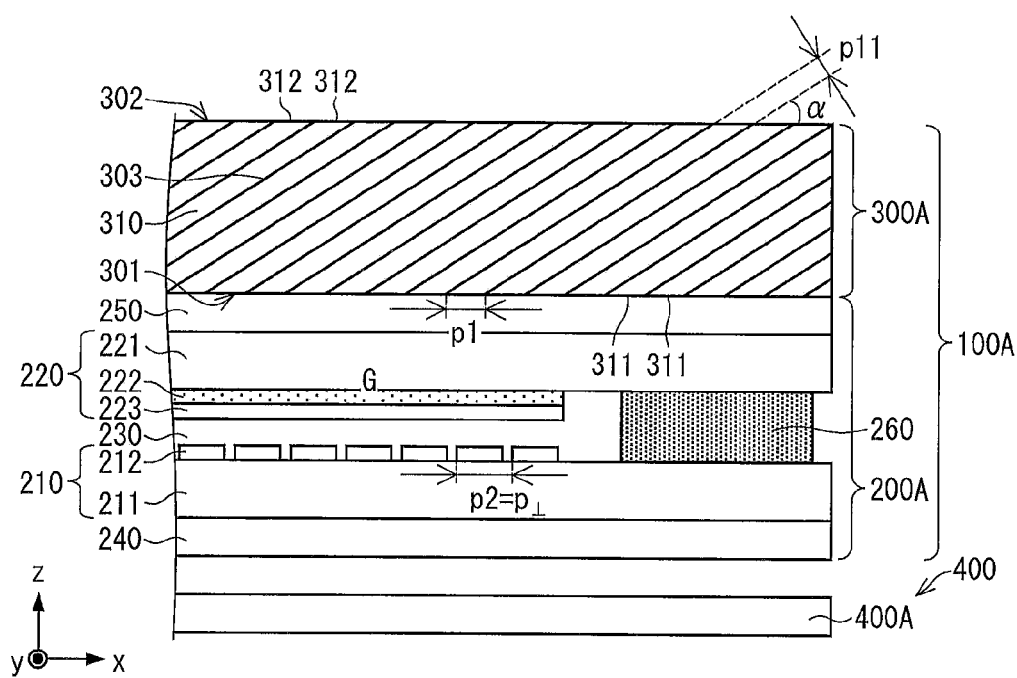
FIG. 25 is a cross sectional view schematically showing a configuration of a main part of the liquid crystal display device in accordance with Fifth Embodiment of the present invention in a case where pattern columns of light guide sections are perpendicular to pattern columns of color filter layers of individual colors on a plan view.

Next, the following discusses desirable conditions for the pitch p11 in the case where p2=p∥, that is, in the case where the pattern columns of the light guide section 310 are perpendicular to pattern columns of the color filter layers 222 of individual colors on a plan view as shown in FIG. 25.

FIG. 25 is a cross sectional view schematically showing a configuration of a main part of the liquid crystal display device 100A in accordance with the present embodiment in a case where the pattern columns of the light guide section 310 are perpendicular to pattern columns of the color filter layers 222 of individual colors on a plan view.

Also with respect to the liquid crystal display device 100A shown in FIG. 25, conditions for avoiding moiré are those shown as the relational expressions (6) and (7).

In the case where p2=p∥, for example, assume that the pixel pitch p2=120 μm and the inclination angle α=55°. Desirable conditions for the cases of p1>p2 and p2>p1, respectively, are as shown in Table 4.

TABLE 4

|   | p1 > p2 | | | p1 < p2 | | |
|---|---|---|---|---|---|---|
| m | m + 0.3 | m + 0.5 | m + 0.7 | m + 0.3 | m + 0.5 | m + 0.7 |
| 1 | 128 | 147 | 167 | 76 | 66 | 58 |
| 2 | 226 | 246 | 265 | 43 | 39 | 36 |
| 3 | 324 | 344 | 364 | 29.8 | 28.1 | 26.6 |
| 4 | 423 | 442 | 462 | 22.9 | 21.8 | 20.9 |
| 5 | 521 | 541 | 560 | 18.5 | 17.9 | 17.2 |
| 6 | 619 | 639 | 659 | 15.6 | 15.1 | 14.7 |
| 7 | 718 | 737 | 757 | 13.5 | 13.1 | 12.8 |
| 8 | 816 | 836 | 855 | 11.8 | 11.6 | 11.3 |
| 9 | 914 | 934 | 953 | 10.6 | 10.3 | 10.1 |
| 10 | 1012 | 1032 | 1052 | 9.5 | 9.4 | 9.2 |

Also in Table 4, the value in the column of (m+0.3) is the lower limit of the pitch p11 at respective values of m, the value in the column of (m+0.5) is the optimal value of the pitch p11 at respective values of m, and the value in the column of (m+0.7) is the upper limit of the pitch p11 at respective values of m.

Next, an explanation is made as to the result of studying a desirable value for m.

As described above, a relation $p_\parallel = 3p_\perp$ is met between p∥ and p⊥. Consequently, in the case where p2=p∥ and p1>p2, even when m=1, image information of one picture element is mixed with image information of adjacent picture elements, resulting in a blurred image. If a little blurring of an image is allowed, m may be 1 or 2. The above condition does not depend on the pixel pitch p2.

On the other hand, in the case where p1<p2, the value of m changes depending on the pixel pitch p2. That is, the pitch p11 cannot be smaller than processing limits of films used in the light guide section 310, particularly a processing limit of the transmissive layer. For example, assume that the transmissive layer is made of a PET film as described above. The processing limit of a general PET is approximately 10 μm. Accordingly, if m≥10, the pixel pitch p11 is not enabled as seen from Table 4. Therefore, in a case where the pixel pitch p2 is 120 μm, the value of m is preferably m<10.

Next, an explanation is made as to a desirable angle of the inclination angle α.

Figure 26:
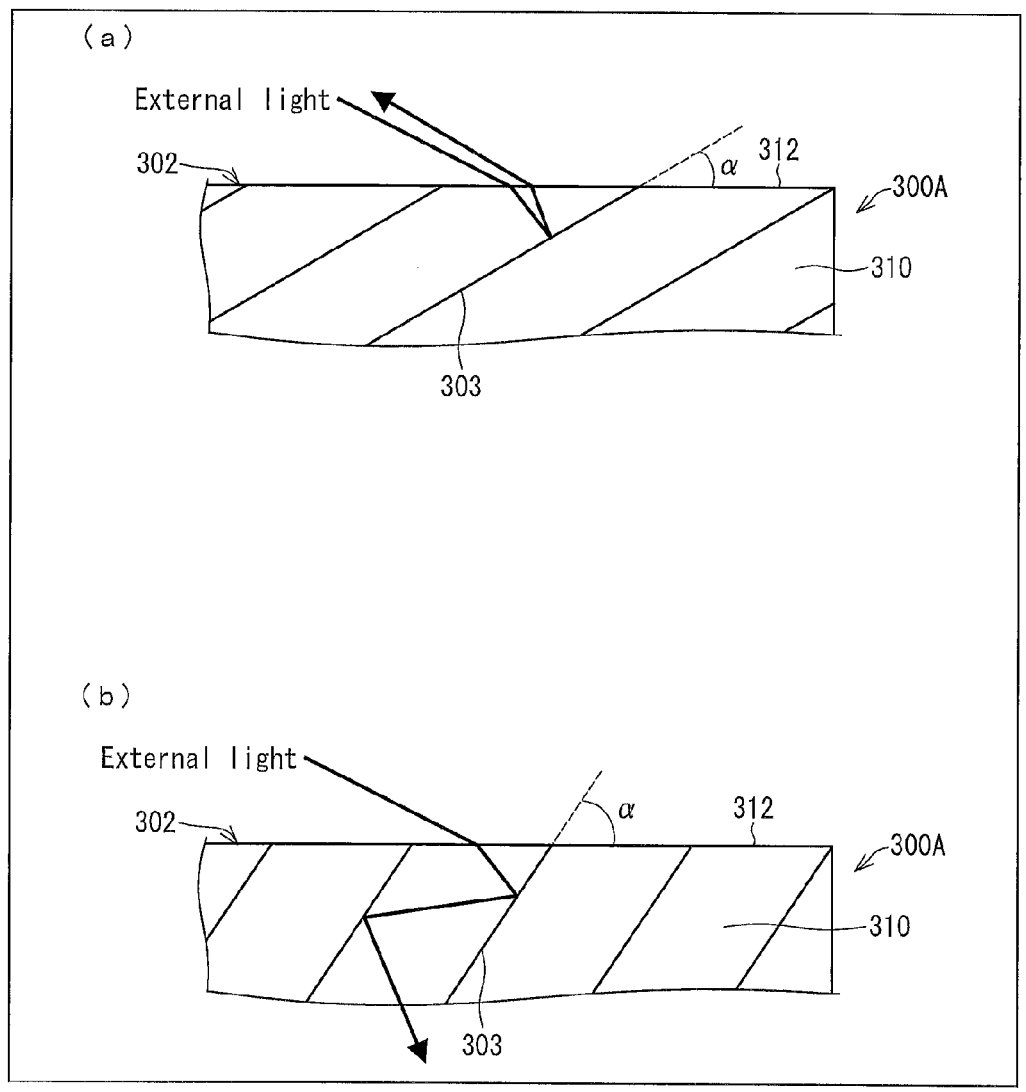
FIG. 26(a) and (b) of FIG. 26 are views showing relationships between an inclination angle α and how external light incident to a light guide element is reflected.

(a) and (b) of FIG. 26 are views showing relationships between the inclination angle α and how external light incident to the light guide element 300A is reflected. (a) of FIG. 26 shows a case where the inclination angle α is relatively small. (b) of FIG. 26 shows a case where the inclination angle α is relatively large.

In the case where the inclination angle α is small as shown in (a) of FIG. 26, there is a case where light incident with a small angle is reflected by a reflective portion of the light guide section 310 and is emitted from the emission surface 302 to the outside, causing damage to display such as decrease in contrast.

In contrast thereto, in the case where the inclination angle α is large as shown in (b) of FIG. 26, external light incident to the light guide element 300A is reflected by the reflective portion of the light guide section 310 and is propagated in the transmissive layer and therefore is not emitted from the emission surface 302 to the outside, causing no damage to display.

Specifically, when the inclination angle α is larger than the critical angle of the transmissive layer in the light guide section 310, external light does not leak to the outside.

Figure 27:
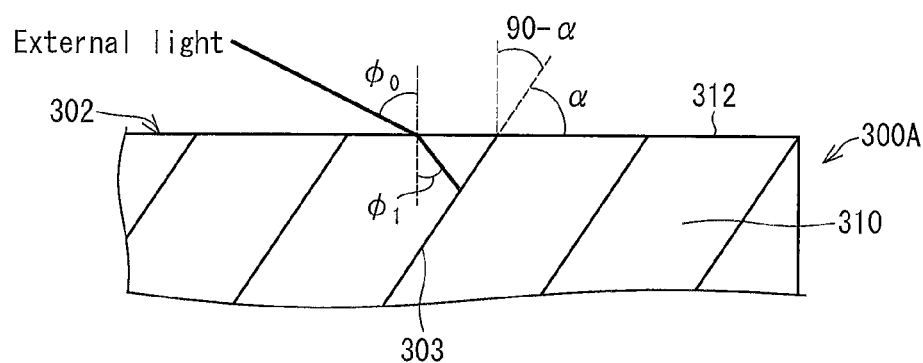
FIG. 27 is a cross sectional view explaining an incident angle and a refractive angle of light at a light guide element.

With reference to FIG. 27, the following explains under what condition external light does not leak to the outside.

FIG. 27 is a cross sectional view explaining an incident angle and a refractive angle of light at the light guide element 300A.

Assume that a relative refractive index of the transmissive layer with respect to an absolute refractive index $n_0$ ($n_0=1$) of the air layer is $n_1$, an incident angle of external light with respect to the transmissive layer is $\Phi_0$, and a refractive angle (emission angle) of the external light with respect to the transmissive layer is $\Phi_1$. Based on the Snell's law, an equation below is met.

$$n_0 \sin \Phi_0 = n_1 \sin \Phi_1$$

Since the critical angle is $\Phi_1$ at $\Phi_0=90°$, the critical angle due to the refractive index of the transmissive layer is represented by an equation below.

$$\text{Critical angle} = \sin^{-1}(n_0/n_1)$$

When the inclination angle α is larger than the critical angle, reflective light derived from the external light is confined inside the light guide element 300A.

This light is finally absorbed by the transmissive layer and the reflective layer or polarization films (optical film sections 240 and 250) etc. of the liquid crystal display device 100A.

That is, it is preferable that the inclination angle α meets a relational expression (8) below.

$$\alpha > \sin^{-1}(n_0/n_1) \quad (8)$$

This condition does not change when a plate-shaped member such as a protective plate and a touch panel is provided between the air layer and the transmissive layer.

Table 5 shows examples of transparent resin usable for the transmissive layer in the light guide section 310 (e.g. transparent film used for the sheet laminates 320 and 330) and refractive indices $n_1$, critical angles, and lower limits of optimal inclination angles of the respective examples of the transparent resin.

In Table 5, PMMA indicates polymethyl methacrylate (acrylic resin), COP indicates cycloolefin resin, PET indicates polyethylene terephthalate, and PC indicates polycarbonate.

TABLE 5

| Material | Refractive index | Critical angle | Desirable inclination angle α (lower limit) |
|---|---|---|---|
| PMMA | 1.49 | 42.2 | 42.2 |
| COP | 1.53 | 40.8 | 40.8 |
| PET | 1.57 | 39.6 | 39.6 |
| PC | 1.59 | 39.0 | 39.0 |

By setting the inclination angle α as above, it is possible to create good display without leakage of external light to the outside.

Modification Examples

The above condition is not limited to the present embodiment. That is, in the liquid crystal display device 100A in accordance with any of First to Fifth Embodiments, by setting the inclination angle α to meet the relational expression (8), it is possible to create good display without leakage of external light to the outside.

For that matter, when the absolute refractive index of the air layer is $n_0$ and the relative refractive index of the transmissive layer of the light guide section 310 with respect to the air layer is $n_1$, if an acute angle between the incident surface 301 of the light guide element 300A on the cross section of the light guide element 300A in a normal direction (i.e. plane parallel to the display surface of the liquid crystal panel 200A) and a borderline between adjacent light guide sections 310, which angle corresponds to the inclination angle α, is larger than $\sin^{-1}(n_0/n_1)$, it is possible to create good display without leakage of external light to the outside.

As described above, in the present embodiment, an explanation was made as to an example in which the plate-shaped light guide element 300A is provided on the whole of the display surface of the liquid crystal panel 200A. However, the present invention is not limited to this. For example, the triangular prism-shaped light guide element 300A may be provided only on the frame region 203 of the liquid crystal panel 200A and on portions in the vicinity of the frame region 203.

The principle of interference between the pitch p1 of the light guide section 310 on the incident surface 301 of the light guide element 300A and the pixel pitch p2 is common between the plate-shaped light guide element 300A and the triangular prism-shaped light guide element 300A. Accordingly, in the case where the triangular prism-shaped light guide element 300A is provided only on the frame region 203 of the liquid crystal panel 200A and on portions in the vicinity of the frame region 203 as well as in the case where the plate-shaped light guide element 300A is provided on the whole of the display surface of the liquid crystal panel 200A, by setting the pitch p11 of the light guide section 310 to meet the relational expressions (6) and (7), it is possible to prevent generation of moiré.

In the present embodiment, an explanation was made as to an example in which the angle θ between a direction of a borderline between adjacent light guide sections 310 on a plan view and a direction in which pixels 201 adjacent to the frame region 203 on which an image is to be displayed are aligned is θ≈0. However, the present embodiment is not limited to this example.

For example, the borderline between the light guide sections 310 of the light guide element 300A on a plan view may be inclined by a range of 5°<θ<85° with respect to the outer edge of the light guide element 300A.

In the present embodiment, it is possible to overcome moiré regardless of the angle θ. However, needless to say, the aforementioned technique may be combined with the techniques described in First to Fourth Embodiments. That is, also in the present embodiment, the direction of the borderline between adjacent light guide sections 310 on a plan view may be inclined with respect to the direction in which the pixels 201 adjacent to the frame region 203 on which an image is to be displayed are aligned, just like the configurations detailed in First and Fourth Embodiments. If this configuration causes image displacement, the image displacement can be overcome, needless to say, by image correction using software as shown in Third and Fourth Embodiments and by physical image correction using hardware as shown in First and Second Embodiments.

In general, a display panel has a rectangular shape. In the display panel having a rectangular shape, the pixels 201 are formed in such a manner as to be parallel to the outer edge of the display panel. Accordingly, regardless of whether the light guide elements 300A and 300B have a plate shape or a triangular prism shape, by overlapping the light guide elements 300A and 300B on the display surface of the display panel in such a manner as to bridge the boundary between the display region and the frame region of the display panel, it is possible to guide a part of light emitted from the display region of the display panel toward above the frame region of the display panel. Consequently, an image on the display region can be displayed above the frame region of the display panel, and any of the above configurations of the light guide elements 300A and 300B can prevent generation of moiré.

<Program and Computer-Readable Storage Medium>

Individual means (blocks) of the display control circuit 500 may be realized by way of hardware logic or software as executed by a CPU (Central Processing Unit) or a MPU (Micro Processing Unit) as follows. Individual means of the display control circuit 500 may be realized by way of software in such a manner that a computer is caused to function as the means by a program. Furthermore, individual steps of the display control method explained in Third and Fourth Embodiments may be carried out by way of software in such a manner that a computer is caused to carry out the steps by a program.

The display control circuit 500 includes a CPU or a MPU for executing instructions in programs realizing individual functions (steps), a ROM (Read Only Memory) in which the programs are stored, a RAM (Random Access Memory) for developing the programs into executable forms, a storage device (storage medium) such as a memory in which the programs and various data are stored, and the like.

The object of the present invention can be realized in such a manner that individual means of the display control circuit 500 are provided with a computer-readable storage medium for storing program codes (such as executable program, intermediate code program, and source program) of programs of individual means of the display control circuit 500 which programs serve as software for realizing the functions (steps), and a computer (alternatively, CPU or MPU) reads out and executes the program codes stored in the storage medium.

The storage medium from which the program codes are supplied to the display control circuit 500 is not limited to one with a particular structure or of a particular kind. The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Furthermore, the object of the present invention can be realized by arranging the display control circuit 500 to be connectable to a communication network. In this case, the program codes are supplied to the display control circuit 500 via the communication network. The communication network is not limited to one of a particular kind or with a particular form as long as the communication network can supply the program codes to the display control circuit 500. Examples of the communication network include the Internet, intranet, extranet, LAN, ISDN, VAN, CATV communication network, virtual private network, telephone network, mobile communication network, and satellite communication network.

A transmission medium that constitutes the communication network is not limited to a particular configuration or a particular kind and may be any transmission medium as long as it can transmit a program code. Examples of the transmission medium include (i) wired lines such as IEEE 1394, USB (Universal Serial Bus), power-line carrier, cable TV lines, telephone lines, and ADSL (Asymmetric Digital Subscriber Line) and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

<Essential Points>

As described above, a display device of the present invention is a display device, including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned.

As described above, by the light guide element guiding a part of light emitted from the display region of the display panel toward above the frame region, it is possible to create display on the frame region of the display panel which region is a non-display region when the display device is seen from above the light guide element.

In this configuration, when the plurality of light guide sections are designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region, and a relation $5°<\theta<85°$ is met, where $\theta$ indicates an angle between a direction of a borderline between adjacent ones of the plurality of light guide sections on the incident surface and the emission surface of the light guide element and a direction in which pixels adjacent to the frame region are aligned, it is possible to create display above the frame region and to prevent moiré.

It is preferable to arrange the display device such that a relation $\alpha > \sin^{-1}(n_0/n_1)$ is met, where $n_0$ indicates an absolute refractive index of an air layer, $n_1$ indicates a relative refractive index of the transmissive layer of each of the plurality of light guide sections which is relative to the absolute refractive index of the air layer, and $\alpha$ indicates an inclination angle which is an acute angle between a plane parallel to the display surface of the display panel and a borderline between adjacent ones of the plurality of light guide sections on a cross section of the light guide element taken along a direction normal to the light guide element.

By setting the inclination angle $\alpha$ as above, it is possible to create satisfactory display without leakage of external light to the outside.

Furthermore, as described above, a display system of the present invention is a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are line-symmetrical with respect to a boundary between said adjacent ones of the plurality of display devices.

Since the display system includes the display devices, the display system can create display above the frame region and prevent moiré.

In this configuration, when the direction of a borderline between adjacent light guide sections on the emission surface of one light guide element and the direction of a borderline between adjacent light guide sections on the emission surface of another light guide element are line-symmetrical with respect to a boundary between adjacent display devices, images are shifted in the same direction. Consequently, display can be created without displacement of images between adjacent display devices, so that frames of individual display devices at the boundary between the display devices are hardly to be seen.

Furthermore, as described above, a display system of the present invention is a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, and said adjacent ones of the plurality of display devices being staggered from each other in the direction in which pixels adjacent to the frame region are aligned, so that displacements of images displayed on said adjacent ones of the plurality of display devices, respectively, seen by a viewer through the light guide element, cancel each other.

It is preferable to arrange the display system such that when an angle between a direction of a borderline between adjacent ones of the plurality of light guide sections on a plan view and a direction in which pixels adjacent to the frame region above which an image on the display region is to be displayed are aligned is θ and a length of the frame region in a direction perpendicular to the direction in which pixels adjacent to the frame region are aligned is L, said adjacent ones of the plurality of display devices are staggered from each other by 2×L×tan θ in the direction in which pixels adjacent to the frame region are aligned.

By arranging the display devices as above, it is possible to create display without image displacement between adjacent display devices even when on a plan view, a direction of a borderline between adjacent light guide sections in a light guide element in one of adjacent display devices is equal to a direction of a borderline between adjacent light guide sections in a light guide element in the other. Consequently, frames at the boundary between the display devices can be hardly seen.

Furthermore, as described above, a display system of the present invention is (A) a display system, including a plurality of display devices aligned on a single plane, each of the plurality of display devices being the aforementioned display device, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, and the display system further comprising a driving control device for controlling driving of the plurality of display panels, the display control device causing images displayed on the display panels in said adjacent ones of the plurality of display devices, respectively, to be shifted from each other in the direction in which pixels adjacent to the frame region are aligned, so that displacements of images displayed on said adjacent ones of the plurality of display devices, respectively, seen by a viewer through the light guide element, cancel each other.

Furthermore, it is preferable to arrange the display system of the present invention such that (B) when an angle between a direction of a borderline between adjacent ones of the plurality of light guide sections on a plan view and a direction in which pixels adjacent to the frame region above which an image on the display region is to be displayed are aligned is θ and a length of the frame region in a direction perpendicular to the direction in which pixels adjacent to the frame region are aligned is L, the driving control device causes the images displayed on the display panels in said adjacent ones of the plurality of display devices, respectively, to be shifted from each other by 2×L×tan θ in the direction in which pixels adjacent to the frame region are aligned.

It is preferable to arrange the display system of the present invention such that (C) the driving control device includes a data signal division section for dividing a data signal corresponding to one line of an input image source into data signals in the number of the plurality of display devices, and a timing signal generation section for generating a timing signal for causing the data signals obtained in the data signal division section to be outputted to respective display panels with different timings, so that displacements of displayed images between the plurality of display devices cancel each other.

Furthermore, it is preferable to arrange the display system of the present invention such that (D) the timing signal generation section generates a timing signal for causing the data signals obtained in the data signal division section to be outputted to respective display panels in the plurality of display devices with respective timings different from each other by a time corresponding to 2×L×tan θ in the direction in which pixels adjacent to the frame region are aligned, so that displacements of displayed images between the plurality of display devices cancel each other.

Even when on a plan view, a direction of a borderline between adjacent ones of the plurality of light guide sections in a light guide element in one of adjacent ones of the plurality of display devices is equal to a direction of a borderline between adjacent ones of the plurality of light guide sections in a light guide element in the other, the display system having the configurations (A)-(D) can cause individual display panels to display images whose shift amounts have been corrected by software beforehand, thereby cancelling displacement of actually visible images.

Furthermore, as described above, a display system of the present invention is a display system, including the aforementioned display device, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display system further comprising a driving control device for controlling driving of the display panel, the driving control device causing an image displayed on the display region overlapping the incident surface of the light guide element in the display panel to be shifted in a direction in which pixels adjacent to the frame region are aligned, in accordance with a position of the displayed image between an end of the incident surface of the light guide element which end is closer to the display region of the display panel and an end of the incident surface which end is farther from the display region, so that displacement of a displayed image at a region where the light guide element is provided, seen by a viewer through the light guide element, is cancelled.

By using the light guide element having a triangular pillar shape as above, it is possible to reduce the weight of the display device compared with when a light guide element is provided on the whole of the display surface of the display panel for example, and costs for manufacturing the display device can be reduced.

However, in the case where the light guide element having a triangular pillar shape is used, the shift amount varies depending on a pixel position. Accordingly, it is necessary to change the shift amount depending on a pixel position.

With the arrangement, the display system can cause individual display panels to display images whose shift amounts have been corrected by software beforehand with respect to each pixel position, thereby cancelling displacement of actually visible images.

The shift amount may be changed by using a look-up table or the shift amount may be calculated on each occasion with respect to each pixel position.

The display system can overcome the image displacement by being arranged such that (E) the driving control device includes a storage section for storing a look-up table in which a shift amount of a displayed image in accordance with the position of the displayed image between an end of the incident surface of the light guide element which end is closer to the display region of the display panel and an end of the incident surface which end is farther from the display region is related to a corresponding position of a pixel on the display panel, and a timing signal generation section for generating a timing signal for causing a data signal displayed on the region where the light guide element is provided on the display panel to be outputted to the display panel with a shifted timing corresponding to the shift amount by referring to the look-up table, so that a displacement amount of the displayed image on the region where the light guide element is provided is cancelled.

Furthermore, the display system of the present invention may be arranged such that (F) the driving control device includes a shift amount calculation section for calculating a shift amount of a displayed image along the direction in which pixels adjacent to the frame region are aligned, with respect to each position of a pixel on the display panel, by using the angle between the direction of a borderline between adjacent ones of the plurality of light guide sections on a plan view and the direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, and a timing signal generation section for generating a timing signal for causing a data signal displayed on the region where the light guide element is provided on the display panel to be outputted to the display panel with a shifted timing corresponding to the shift amount calculated by the shift amount calculation section, so that a displacement amount of the displayed image on the region where the light guide element is provided is cancelled.

The display system of the present invention may be arranged such that (G) the light guide element has a triangular pillar shape whose cross section in a direction perpendicular to the direction in which pixels adjacent to the frame region are aligned is a right triangle, and the driving control device includes a shift amount calculation section for calculating a shift amount of a displayed image along the direction in which pixels adjacent to the frame region are aligned, with respect to each position of a pixel on the display panel, in accordance with the position of the displayed image between an end of the incident surface of the light guide element which end is closer to the display region of the display panel and an end of the incident surface which end is farther from the display region, based on a linear function which exhibits 0 at the end of the incident surface of the light guide element which end is closer to the display region of the display panel and exhibits $L \times \tan \theta$ at an end of the frame region above which an image on the display region is to be displayed, the end of the frame region being farther from the display region, where $\theta$ indicates an angle between a direction of a borderline between adjacent ones of the plurality of light guide sections on a plan view and a direction in which pixels adjacent to the frame region above which an image on the display region is to be displayed are aligned and L indicates a length of the frame region in a direction perpendicular to the direction in which pixels adjacent to the frame region are aligned, and a timing signal generation section for generating a timing signal for causing a data signal displayed on the region where the light guide element is provided on the display panel to be outputted to the display panel with a shifted timing corresponding to the shift amount calculated by the shift amount calculation section, so that a displacement amount of the displayed image on the region where the light guide element is provided is cancelled.

The display system having any one of the configurations (E)-(G) can cancel the image displacement as described above.

Furthermore, it is preferable to arrange the display system of the present invention so as to further include an image process section for carrying out a thinning-out process for thinning out, from data signals of an input image source, a data signal corresponding to a predetermined pixel position.

There is a case where use of the triangular prism-shaped light guide element elongates a displayed image. In such a case, by thinning out a data signal corresponding to a predetermined pixel position, it is possible to display an image while the image is downsized on a region where the light guide element is provided (laminated region).

Furthermore, as described above, a display system of the present invention is a display system, including a plurality of display devices aligned on a single plane, each of the plurality of display devices being the aforementioned display device, the light guide element in each of the plurality of display devices being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, the light guide element is provided on a part of the display region of the display panel and on the frame region above which an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are line-symmetrical with respect to a boundary between said adjacent ones of the plurality of display devices, the display system further comprising a driving control device for controlling driving of the plurality of display panels, the driving control device causing an image displayed on the display region overlapping the incident surface of the light guide element in each of the plurality of display panels to be shifted in a direction in which pixels adjacent to the frame region are aligned in each of the plurality of display panels, in accordance with a position of the displayed image between an end of the incident surface of the light guide element which end is closer to the display region of each of the plurality of display panels and an end of the incident surface which end is farther from the display region, so that displacement of a displayed image at a region where the light guide element is provided, seen by a viewer through the light guide element in each of the plurality of display devices, is cancelled.

In a case where the triangular prism-shaped light guide element is used as described above, the shift amount differs depending on where a pixel is positioned. Therefore, it is necessary to change the shift amount depending on where a pixel is positioned.

With the arrangement, the display system can cause individual display panels to display images whose shift amounts have been corrected by software beforehand with respect to each pixel position, thereby cancelling displacement of actually visible images.

In this configuration, the display system of the present invention may be arranged such that (H) the driving control device includes a data signal division section for dividing a data signal corresponding to one line of an input image source into data signals in the number of the plurality of display devices, a storage section for storing a look-up table in which a shift amount of a displayed image in accordance with a position of the displayed image between an end of the incident surface of the light guide element provided in each of the plurality of display devices which end is closer to the display region of the display panel and an end of the incident surface which end is farther from the display region is related to a corresponding position of a pixel on the display panel, and a timing signal generation section for generating a timing signal for causing a data signal which is obtained in the data signal division section and which is to be displayed on the region where the light guide element is provided on the display panel to be outputted to the display panel with a shifted timing corresponding to the shift amount by referring to the look-up table, so that a displacement amount of the displayed image on the region where the light guide element is provided is cancelled.

Furthermore, the display system of the present invention may be arranged such that (I) the driving control device includes a data signal division section for dividing a data signal corresponding to one line of an input image source into data signals in the number of the plurality of display devices, a shift amount calculation section for calculating a shift amount of a displayed image along the direction in which pixels adjacent to the frame region are aligned, with respect to each position of a pixel on the display panel, by using the angle between a direction of a borderline between adjacent ones of the plurality of light guide sections on a plan view of each of the plurality of display devices and a direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, a timing signal generation section for generating a timing signal for causing a data signal which is obtained in the data signal division section and which is to be displayed on the region where the light guide element is provided on the display panel to be outputted to the display panel with a shifted timing corresponding to the shift amount calculated by the shift amount calculation section, so that a displacement amount of the displayed image on the region where the light guide element is provided is cancelled.

The display system of the present invention may be arranged such that (J) the light guide element has a triangular pillar shape whose cross section in a direction perpendicular to the direction in which pixels adjacent to the frame region are aligned is a right triangle, and the driving control device includes a data signal division section for dividing a data signal corresponding to one line of an input image source into data signals in the number of the plurality of display devices, a shift amount calculation section for calculating a shift amount of a displayed image along the direction in which pixels adjacent to the frame region are aligned, with respect to each position of a pixel on the display panel, in accordance with the position of the displayed image between an end of the incident surface of the light guide element which end is closer to the display region of the display panel and an end of the incident surface which end is farther from the display region, based on a linear function which exhibits 0 at the end of the incident surface of the light guide element which end is closer to the display region of the display panel and exhibits L×tan $\theta$ at an end of the frame region above which an image on the display region is to be displayed, the end of the frame region being farther from the display region, where $\theta$ indicates an angle between a direction of a borderline between adjacent ones of the plurality of light guide sections on a plan view and a direction in which pixels adjacent to the frame region above which an image on the display region is to be displayed are aligned and L indicates a length of the frame region in a direction perpendicular to the direction in which pixels adjacent to the frame region are aligned, and a timing signal generation section for generating a timing signal for causing a data signal which is obtained in the data signal division section and which is to be displayed on the region where the light guide element is provided on the display panel to be outputted to the display panel with a shifted timing corresponding to the shift amount calculated by the shift amount calculation section, so that a displacement amount of the displayed image on the region where the light guide element is provided is cancelled.

The display system having any one of the configurations (H)-(J) can cancel the image shifts.

Furthermore, in these configurations, it is preferable to arrange the display system of the present invention so as to further include an image process section for carrying out a thinning-out process for thinning out, from each of divided data signals, a data signal corresponding to a predetermined pixel position. The reason is already explained above.

Furthermore, as described above, a display device of the present invention is a display device, including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and when a distance between interfaces of adjacent ones of the plurality of light guide sections on the incident surface of the light guide element is referred to as a pitch p1, a distance between interfaces of adjacent ones of the plurality of light guide sections in a direction perpendicular to an optical transmission direction is referred to as a pitch p11, a pitch between pixels adjacent to the frame region above which an image on the display region is to be displayed is referred to as a pitch p2, an acute angle between a plane parallel to the display surface of the display panel and a borderline between adjacent ones of the plurality of light guide sections on a cross section of the light guide element in a normal direction is referred to as an inclination angle α, and m is a natural number, in a case of P1>P2, a relation $(m+0.3) \times p2 \times \sin \alpha < p11 < (m+0.7) \times p2 \times \sin \alpha$ being met, and in a case of P1<P2, a relation $p2 \times \sin \alpha/(m+0.7) < p11 < p2 \times \sin \alpha/(m+0.3)$ being met.

Also with the above arrangement, it is possible to prevent moiré, and to create satisfactory display. When employing the above arrangement, θ is not particularly limited.

Furthermore, it is preferable to arrange the display device such that a relation below is met, $\alpha > \sin^{-1}(n_0/n_1)$ where $n_0$ indicates an absolute refractive index of an air layer and $n_1$ indicates a relative refractive index of the transmissive layer in the light guide section with respect to the absolute refractive index of the air layer.

By setting the inclination angle α as above, it is possible to create satisfactory display without leakage of external light to the outside.

The display device of the present invention may be arranged such that (1) the light guide element has a plate shape and covers a whole of the display region of the display panel and at least a part of the frame region above which part an image on the display region is to be displayed or that (2) an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is a right triangle, and the light guide element covers a part of the display region of the display panel and at least a part of the frame region above which an image on the display region is to be displayed.

In this case, use of the configuration (2) allows reducing the weight of the display device and costs for manufacturing the display device.

Furthermore, as described above, the display system of the present invention includes a plurality of display devices arranged on a single plane.

Accordingly, the display system can display an image above the frame region and prevent deterioration in display quality due to moiré.

It is preferable that an electronic device of the present invention includes the aforementioned display system and is foldable at an interface section between adjacent display devices.

Furthermore, as described above, a display control method of the present invention is (K) a display control method for a display system including a plurality of display devices aligned on a single plane, each of the plurality of display devices including:
a display panel including a display region in which pixels are aligned in at least one direction and a frame region which is a non-display region positioned outside the display region; and
a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation 5°<θ<85° is met, where θ indicates an angle between a direction of a borderline between adjacent ones of the plurality of light guide sections on a plan view and a direction in which pixels adjacent to the frame region above which an image on the display region is to be displayed are aligned, the light guide element in each of the plurality of display devices being designed such that the light guide element has a plate shape and covers a whole of the display region of the display panel and at least a part of the frame region above which part an image on the display region is to be displayed, and the light guide element is positioned such that, on a plan view, a direction of a borderline between adjacent ones of the plurality of light guide sections in one of adjacent ones of the plurality of display devices and a direction of a borderline between adjacent ones of the plurality of light guide sections in the other are identical, the display control method comprising the steps of:

(i) dividing a data signal corresponding to one line of an input image source into data signals in the number of the plurality of display devices, and (ii) generating a timing signal for causing the data signals obtained in the step (i) to be outputted to respective display panels with different timings, so that displacements of displayed images between the plurality of display devices cancel each other.

Specifically, the display control method is arranged such that (L) in the step (ii), there is generated a timing signal for causing the data signals obtained in the step (i) to be outputted to respective display panels in the plurality of display devices with respective timings different from each other by a time corresponding to 2×L×tan θ in the direction in which pixels adjacent to the frame region are aligned, so that displacements of displayed images between the plurality of display devices cancel each other.

Furthermore, as described above, a display control method of the present invention is (M) a display control method for a display system including a display device, the display device including:
a display panel including a display region in which pixels are aligned in at least one direction and a frame region which is a non-display region positioned outside the display region; and
a light guide element, positioned on a display surface of the display panel, for guiding a part of light emitted from the display region toward above the frame region so that an image on the display region is displayed above the frame region,
the light guide element including a plurality of light guide sections each including a transmissive layer and being parallel to each other,
the plurality of light guide sections being designed such that
an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and
a relation 5°<θ<85° is met, where θ indicates an angle between a direction of a borderline between adjacent ones of the plurality of light guide sections on a plan view and a direction in which pixels adjacent to the frame region above which an image on the display region is to be displayed are aligned,
the light guide element in the display device being designed such that
an incident surface is parallel to the display surface of the display panel and an emission surface is inclined with respect to the display surface of the display panel in such a manner that a thickness of the light guide element is reduced toward an end of the incident surface which end is closer to the display region of the display panel,
the light guide element has a triangular pillar shape whose cross section in a direction perpendicular to the direction in which pixels adjacent to the frame region are aligned is triangular, and
the light guide element covers a part of the display region of the display panel and at least a part of the frame region above which an image on the display region is to be displayed,
the display control method comprising the step of generating a timing signal for causing a data signal displayed on the region where the light guide element is provided on the display panel to be outputted to the display panel with a shifted timing corresponding to the shift amount by referring to a look-up table, so that a displacement amount of the displayed image on the region where the light guide element is provided is cancelled, said look-up table being a look-up table in which a shift amount of a displayed image in accordance with a position of the displayed image between an end of the incident surface of the light guide element which end is closer to the display region of the display panel and an end of the incident surface which end is farther from the display region is related to a corresponding position of a pixel on the display panel.

Furthermore, as described above, a display control method of the present invention is (N) a display control method for a display system including a display device, the display device including:
a display panel including a display region in which pixels are aligned in at least one direction and a frame region which is a non-display region positioned outside the display region; and
a light guide element, positioned on a display surface of the display panel, for guiding a part of light emitted from the display region toward above the frame region so that an image on the display region is displayed above the frame region,
the light guide element including a plurality of light guide sections each including a transmissive layer and being parallel to each other,
the plurality of light guide sections being designed such that
an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and
a relation 5°<θ<85° is met, where θ indicates an angle between a direction of a borderline between adjacent ones of the plurality of light guide sections on a plan view and a direction in which pixels adjacent to the frame region above which an image on the display region is to be displayed are aligned,
the light guide element in the display device being designed such that
an incident surface is parallel to the display surface of the display panel and an emission surface is inclined with respect to the display surface of the display panel in such a manner that a thickness of the light guide element is reduced toward an end of the incident surface which end is closer to the display region of the display panel,
the light guide element has a triangular pillar shape whose cross section in a direction perpendicular to the direction in which pixels adjacent to the frame region are aligned is triangular, and
the light guide element covers a part of the display region of the display panel and at least a part of the frame region above which an image on the display region is to be displayed,
the display control method comprising the steps of:
(i) calculating a shift amount of a displayed image along the direction in which pixels adjacent to the frame region are aligned, with respect to each position of a pixel on the display panel, by using the angle between the direction of a borderline between adjacent ones of the plurality of light guide sections on a plan view and the direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, and (ii) generating a timing signal for causing a data signal displayed on the region where the light guide element is provided on the display panel to be outputted to the display panel with a shifted timing corresponding to the shift amount calculated in the step (i), so that a displacement amount of the displayed image on the region where the light guide element is provided is cancelled.

Furthermore, as described above, a display control method of the present invention is (O) a display control method for a display system including a display device, the display device including:
  a display panel including a display region in which pixels are aligned in at least one direction and a frame region which is a non-display region positioned outside the display region; and
  a light guide element, positioned on a display surface of the display panel, for guiding a part of light emitted from the display region toward above the frame region so that an image on the display region is displayed above the frame region,
  the light guide element including a plurality of light guide sections each including a transmissive layer and being parallel to each other,
  the plurality of light guide sections being designed such that
    an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and
    a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned,
  the light guide element in the display device being designed such that
    an incident surface is parallel to the display surface of the display panel and an emission surface is inclined with respect to the display surface of the display panel in such a manner that a thickness of the light guide element is reduced toward an end of the incident surface which end is closer to the display region of the display panel,
    the light guide element has a triangular pillar shape whose cross section in a direction perpendicular to the direction in which pixels adjacent to the frame region are aligned is a right triangle, and
    the light guide element covers a part of the display region of the display panel and at least a part of the frame region above which an image on the display region is to be displayed,
  the display control method comprising the steps of:
  (i) calculating a shift amount of a displayed image in accordance with a position of the displayed image between an end of the incident surface of the light guide element which end is closer to the display region of the display panel and an end of the incident surface which end is farther from the display region, with respect to each position of a pixel on the display panel, based on a linear function which exhibits 0 at the end of the incident surface of the light guide element which end is closer to the display region of the display panel and exhibits $L \times \tan\theta$ at an end of the frame region above which an image on the display region is to be displayed, the end of the frame region being farther from the display region, and
  (ii) generating a timing signal for causing a data signal displayed on the region where the light guide element is provided on the display panel to be outputted to the display panel with a shifted timing corresponding to the shift amount calculated in the step (i), so that a displacement amount of the displayed image on the region where the light guide element is provided is cancelled.

Furthermore, it is preferable to arrange the display control method of the present invention so as to (P) further include, prior to the step (ii), the step of carrying out a thinning-out process for thinning out, from data signals of an input image source, a data signal corresponding to a predetermined pixel position.

Furthermore, as described above, a display control method of the present invention is (Q) a display control method for a display system including a plurality of display devices aligned on a single plane, each of the plurality of display devices including:
  a display panel including a display region in which pixels are aligned in at least one direction and a frame region which is a non-display region positioned outside the display region; and
  a light guide element, positioned on a display surface of the display panel, for guiding a part of light emitted from the display region toward above the frame region so that an image on the display region is displayed above the frame region,
  the light guide element including a plurality of light guide sections each including a transmissive layer and being parallel to each other,
  the plurality of light guide sections being designed such that
    an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and
    a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned,
  the light guide element in the display device being designed such that
    an incident surface is parallel to the display surface of the display panel and an emission surface is inclined with respect to the display surface of the display panel in such a manner that a thickness of the light guide element is reduced toward an end of the incident surface which end is closer to the display region of the display panel,
    the light guide element has a triangular pillar shape whose cross section in a direction perpendicular to the direction in which pixels adjacent to the frame region are aligned is triangular, and
    the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, and (ii) generating a timing signal for causing a data signal which is obtained in the step (i) and which is to be displayed on the region where the light guide element is provided on the display panel to be outputted to the display panel with a shifted timing corresponding to the shift amount by referring to a look-up table, so that a displacement amount of the displayed image on the region where the light guide element is provided is cancelled, the look-up table being a look-up table in which a shift amount of a displayed image in accordance with a position of the displayed image between an end of the incident surface of the light guide element provided in each of the plurality of display devices which end is closer to the display region of the display panel and an end of the incident surface which end is farther from the display region is related to a corresponding position of a pixel on the display panel.

Furthermore, as described above, a display control method of the present invention is (R) a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is triangular, and the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, (ii) calculating a shift amount of a displayed image along the direction in which pixels adjacent to the frame region are aligned, with respect to each position of a pixel on the display panel, by using the angle between a direction of a borderline between adjacent ones of the plurality of light guide sections on a plan view of each of the plurality of display devices and a direction in which pixels adjacent to the frame region above which an image on the display region is to be displayed are aligned and the position of the displayed image between an end of the incident surface of the light guide element which end is closer to the display region of the display panel and an end of the incident surface which end is farther from the display region, in accordance with that position, and (iii) generating a timing signal for causing a data signal which is obtained in the step (i) and which is to be displayed on the region where the light guide element is provided on the display panel to be outputted to the display panel with a shifted timing corresponding to the shift amount calculated in the step (ii), so that a displacement amount of the displayed image on the region where the light guide element is provided is cancelled.

Furthermore, as described above, a display control method of the present invention is (S) a display control method for a display system including a plurality of display devices aligned on a single plane, each of the plurality of display devices including:

a display panel including a display region in which pixels are aligned in at least one direction and a frame region which is a non-display region positioned outside the display region; and a light guide element, positioned on a display surface of the display panel, for guiding a part of light emitted from the display region toward above the frame region so that an image on the display region is displayed above the frame region, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and a relation $5°<\theta<85°$ is met, where $\theta$ indicates an angle between a direction of a borderline between adjacent ones of the plurality of light guide sections on a plan view and a direction in which pixels adjacent to the frame region above which an image on the display region is to be displayed are aligned, the light guide element in the display device being designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is a right triangle, and the light guide element covers a part of the display region of the display panel and at least a part of the frame region above which an image on the display region is to be displayed, the display control method comprising the steps of:

(i) dividing a data signal corresponding to one line of an input image source into data signals in the number of the plurality of display devices, (ii) calculating a shift amount of a displayed image in accordance with a position of the displayed image between the end of the incident surface of the light guide element which end is closer to the display region of the display panel and an end of the incident surface which end is farther from the display region, with respect to each position of a pixel on the display panel, based on a linear function which exhibits 0 at the end of the incident surface of the light guide element which end is closer to the display region of the display panel and exhibits L×tan θ at an end of the frame region above which an image on the display region is to be displayed, the end of the frame region being farther from the display region, and (iii) generating a timing signal for causing a data signal which is obtained in the step (i) and which is to be displayed on the region where the light guide element is provided on the display panel to be outputted to the display panel with a shifted timing corresponding to the shift amount calculated in the step (ii), so that the shift amount of the displayed image on the region where the light guide element is provided is cancelled.

With each of the aforementioned methods (K)-(S), individual display panels display images whose shift amounts have been corrected as above, so that displacement of actually visible images can be cancelled.

Furthermore, it is preferable to arrange the display control method of the present invention so as to further include, prior to the step (iii), the step of carrying out a thinning-out process for thinning out, from each of the data signals obtained in the step (i), a data signal corresponding to a predetermined pixel position in each display panel.

The steps of the display control method carried out by the display system may be realized by a computer. In that case, a computer carries out the steps of the display control method according to a program. Accordingly, a program for causing a computer to realize the display control method is also encompassed in the present invention. Furthermore, a computer-readable storage medium in which the program is stored is also encompassed in the present invention.

Furthermore, as described above, a light guide element of the present invention is a light guide element for guiding a part of light emitted from a display region of a display panel toward above a frame region of the display panel, so that an image on the display region is displayed above the frame region, the light guide element being rectangular on a plan view and, out of an incident surface and an emission surface, at least the incident surface being flat, the light guide element including a plurality of light guide sections each including a transmissive layer and being parallel to each other, the plurality of light guide sections being designed such that an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and an angle between a direction of a borderline between adjacent ones of the plurality of light guide sections on a plan view and an outer edge of the light guide element falling within not less than 5° and less than 85°.

In general, a display panel has a rectangular shape. In the display panel having a rectangular shape, pixels are formed in such a manner as to be parallel to the outer edge of the display panel. Accordingly, by overlapping the light guide element having the above configuration on the display surface of the display panel in such a manner as to bridge the boundary between the display region and the frame region of the display panel, it is possible to guide a part of light emitted from the display region of the display panel toward above the frame region of the display panel. Consequently, an image on the display region can be displayed above the frame region, and the above configuration of the light guide element can prevent generation of moiré. Therefore, the light guide element having the above configuration is suitable for the display device of the present invention.

Furthermore, it is preferable to arrange the light guide element of the present invention such that the light guide element is a laminate in which transmissive layers and metal layers are laminated in parallel with each other.

In a case where the light guide element utilizes metal reflection by metal layers as above, the light guide element can guide all light regardless of its incident direction.

Total reflection occurs only when light is incident to a clad from a core with an angle larger than a critical angle, whereas metal reflection occurs regardless of an incident angle. Accordingly, the light guide element with the above configuration has high utilization efficiency of light.

Furthermore, in a case of utilizing total reflection, a material that increases a ratio in refractive index of one transmissive layer to another is limited, whereas in a case of utilizing metal reflection, a transmissive layer is only required to be transparent, and may have any refractive index. Accordingly, the above configuration is advantageous in that it provides a wider selection of a material for the transmissive layer.

Furthermore, it is preferable to arrange the light guide element of the present invention such that the light guide element is a laminate in which at least two kinds of transmissive layers with different refractive indices are laminated in parallel with each other.

It should be noted that in the case of utilizing metal reflection, there is slight absorption of light by the metal layer. However, in the case where the light guide element utilizes total reflection, 100% of light which is incident with an angle larger than a critical angle can be reflected.

Furthermore, it is preferable to arrange the light guide element of the present invention such that when an absolute refractive index of an air layer is $n_0$ and a relative refractive index of a transmissive layer in each of the plurality of light guide sections with respect to the absolute refractive index of the air layer is $n_1$, an acute angle between the incident surface of the light guide element and the borderline between adjacent ones of the plurality of light guide sections on a cross section of the light guide element in a normal direction is larger than $\sin^{-1}(n_0/n_1)$.

As described above, in the light guide element, out of an incident surface and an emission surface, at least the incident surface is flat. Accordingly, when the acute angle between the incident surface of the light guide element and the borderline between adjacent ones of the plurality of light guide sections on a cross section of the light guide element in a normal direction (the acute angle corresponds to the inclination angle α) is set as above, it is possible to create satisfactory display without leakage of light to the outside.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is preferably applicable to various kinds of direct-view type display devices, display systems etc.

REFERENCE SIGNS LIST

1 Liquid crystal display system (display system)
2 Hinge
3 Boundary
100A Liquid crystal display device (display device)
100B Liquid crystal display device (display device)
200A Liquid crystal panel (display panel)
200B Liquid crystal panel (display panel)
201 Pixel
202 Display region
203 Frame region
210 Array substrate
211 Insulating substrate
212 Pixel electrode
220 Counter electrode
222 Color filter layer
230 Liquid crystal layer
240 Optical film section
250 Optical film section
300A Light guide element
300B Light guide element
301 Incident surface
302 Emission surface
303 Interface
304 Side
310 Light guide section
311 Incident surface
312 Emission surface
320 Sheet laminate
321 Metal layer
322 Transmissive layer
323 Adhesive layer
330 Sheet laminate
331 Transmissive layer
332 Transmissive layer
340 Adhesive layer
340A Adhesive layer
340B Adhesive layer
350 Transmissive sheet
350A Transmissive cover sheet
350B Transmissive cover sheet
400 Backlight device
400A Backlight
400B Backlight
500 Display control circuit
510 Image division section (data signal division section)
520 RAM
521 First memory
522 Second memory
530 Timing signal generation section
540 Address storage section
550 Image process section
560 LUT storage section
570 Shift amount calculation section
600A Source driver
600B Source driver
700A Gate driver
700B Gate driver
800A Common electrode driving circuit
800B Common electrode driving circuit
900 Driving control circuit

The invention claimed is:

1. A display device, comprising:
a display panel including a display region in which pixels are aligned in at least one direction and a frame region which is a non-display region positioned outside the display region; and
a light guide element, positioned on a display surface of the display panel, for guiding a part of light emitted from the display region toward above the frame region so that an image on the display region is displayed above the frame region,
the light guide element including a plurality of light guide sections each including a transmissive layer and being parallel to each other,
the plurality of light guide sections being designed such that
an interface between adjacent ones of the plurality of light guide sections is inclined with respect to an incident surface and an emission surface of the light guide element so that an incident surface of at least a part of the plurality of light guide sections overlaps a part of the display region and an emission surface of said at least a part of the plurality of light guide sections overlaps at least a part of the frame region above which an image on the display region is to be displayed, and
when a distance between interfaces of adjacent ones of the plurality of light guide sections on the incident surface of the light guide element is referred to as a pitch p1, a distance between interfaces of adjacent ones of the plurality of light guide sections in a direction perpendicular to an optical transmission direction is referred to as a pitch p11, a pitch between pixels adjacent to the frame region above which an image on the display region is to be displayed is referred to as a pitch p2, an acute angle between a plane parallel to the display surface of the display panel and a borderline between adjacent ones of the plurality of light guide sections on a cross section of the light guide element in a normal direction is referred to as an inclination angle α, and m is a natural number,
in a case of P1>P2, a relation $$(m+0.3) \times p2 \times \sin\alpha < p11 < (m+0.7) \times p2 \times \sin\alpha$$

being met, and
in a case of P1<P2, a relation $$p2 \times \sin\alpha/(m+0.7) < p11 < p2 \times \sin\alpha/(m+0.3)$$

being met.

2. The display device as set forth in claim 1, wherein a relation below is met, $$\alpha > \sin^{-1}(n_0/n_1)$$

where $n_0$ indicates an absolute refractive index of an air layer and $n_1$ indicates a relative refractive index of the transmissive layer in the light guide section which is relative to the absolute refractive index of the air layer.

3. The display device as set forth in claim 1, wherein the light guide element has a plate shape and covers a whole of the display region of the display panel and at least a part of the frame region above which part an image on the display region is to be displayed.

4. A display system, comprising a plurality of display devices aligned on a single plane, each of the plurality of display devices being a display device as set forth in claim 3.

5. An electronic device, comprising a display system as set forth in claim 4, being foldable at an interface section between adjacent display devices.

6. The display device as set forth in claim 3, wherein the light guide element in the display device is designed such that an incident surface is parallel to the display surface of the display panel and an emission surface is inclined with respect to the display surface of the display panel in such a manner that a thickness of the light guide element is reduced toward an end of the incident surface which end is closer to the display region of the display panel, the light guide element has a triangular pillar shape whose cross section in a direction perpendicular to the direction in which pixels adjacent to the frame region are aligned is a right triangle, and the light guide element covers a part of the display region of the display panel and at least a part of the frame region above which an image on the display region is to be displayed.

7. A display system, comprising a plurality of display devices aligned on a single plane, each of the plurality of display devices being a display device as set forth in claim 6.

8. An electronic device, comprising a display system as set forth in claim 7, being foldable at an interface section between adjacent display devices.

* * * * *